(12) United States Patent
Yasui et al.

(10) Patent No.: US 8,332,113 B2
(45) Date of Patent: *Dec. 11, 2012

(54) BRAKE CONTROL APPARATUS FOR VEHICLE

(75) Inventors: Yoshiyuki Yasui, Nagoya (JP); Hiroaki Aizawa, Anjo (JP); Motoshi Suzuki, Nagoya (JP)

(73) Assignee: Advics Co., Ltd, Kariya, Aichi-Pref. (JP)

( * ) Notice: Subject to any disclaimer, the term of this patent is extended or adjusted under 35 U.S.C. 154(b) by 1076 days.

This patent is subject to a terminal disclaimer.

(21) Appl. No.: 12/100,217

(22) Filed: Apr. 9, 2008

(65) Prior Publication Data

US 2008/0255744 A1    Oct. 16, 2008

(30) Foreign Application Priority Data

| Apr. 16, 2007 | (JP) | 2007-106642 |
| Apr. 20, 2007 | (JP) | 2007-111512 |
| Apr. 27, 2007 | (JP) | 2007-118038 |
| Apr. 27, 2007 | (JP) | 2007-118103 |

(51) Int. Cl.
G06F 19/00    (2006.01)

(52) U.S. Cl. ............. 701/70; 701/78; 701/82; 180/197; 188/358; 188/345

(58) Field of Classification Search ............... 303/113, 303/116.1, 114.3, 901, 156, 186, 191; 180/197; 188/358, 345; 701/70–72, 78–79, 82–83

See application file for complete search history.

(56) References Cited

U.S. PATENT DOCUMENTS

| 6,027,184 A | 2/2000 | Yonemura et al. |
| 6,193,331 B1 | 2/2001 | Yonemura et al. |
| 6,522,968 B1 | 2/2003 | Ito et al. |

(Continued)

FOREIGN PATENT DOCUMENTS

DE    199 55 094 A1    5/2001

(Continued)

OTHER PUBLICATIONS

Extended European Search Report dated Jul. 15, 2011, issued by the European Patent Office in corresponding European Patent Application No. 09 01 5386.

(Continued)

Primary Examiner — Thomas Black
Assistant Examiner — Luke Huynh
(74) Attorney, Agent, or Firm — Buchanan Ingersoll & Rooney PC

(57) ABSTRACT

A brake control apparatus for a vehicle includes four wheel braking apparatuses, a first hydraulic pressure generating apparatus, a front-wheel hydraulic circuit connecting the hydraulic pressure generating apparatus to the two of the wheel braking apparatuses, a rear-wheel hydraulic circuit connecting the hydraulic pressure generating apparatus to the other two of the wheel braking apparatuses, a second hydraulic pressure generating apparatus generating an auxiliary pressure, a braking operation variable detecting means, a reference amount determining means for determining a reference amount of auxiliary hydraulic pressure, an obtaining means for obtaining at least one of state quantities indicating a load condition, a driving condition and slipperiness of wheel, a target amount determining means determining a target amount of auxiliary hydraulic pressure of each hydraulic circuit to be equal to or greater than the corresponding reference amount of auxiliary hydraulic pressure, and a pressure regulating means for regulating the auxiliary hydraulic pressure.

19 Claims, 35 Drawing Sheets

U.S. PATENT DOCUMENTS

| | | |
|---|---|---|
| 6,895,317 B2 | 5/2005 | Yasui et al. |
| 7,255,407 B2 | 8/2007 | Hamada et al. |
| 2002/0038977 A1* | 4/2002 | Nitta et al. .................... 303/138 |
| 2008/0255732 A1* | 10/2008 | Yasui et al. ..................... 701/48 |

FOREIGN PATENT DOCUMENTS

| | | |
|---|---|---|
| DE | 102 48 079 A1 | 4/2003 |
| DE | 697 22 704 T2 | 4/2004 |
| DE | 60 2004 000 378 T2 | 10/2006 |
| JP | 1994-16117 A | 1/1994 |
| JP | 8-108841 A | 4/1996 |
| JP | 09-290731 A | 11/1997 |
| JP | 9-309420 A | 12/1997 |
| JP | 10-119744 A | 5/1998 |
| JP | 10-203333 A | 8/1998 |
| JP | 10-217928 A | 8/1998 |
| JP | 10-250565 A | 9/1998 |
| JP | 11-034831 A | 2/1999 |
| JP | 2000-203409 A | 7/2000 |
| JP | 2001-133390 A | 5/2001 |
| JP | 2002-347590 A | 12/2002 |
| JP | 2003-312465 A | 11/2003 |

OTHER PUBLICATIONS

English Language translation of Japanese Office Action dated Dec. 27, 2011 issued in the corresponding Japanese Patent Application No. JP2007-106642.

English Language translation of Japanese Office Action dated Nov. 22, 2011 issued in the corresponding Japanese Patent Application No. JP2007-118038.

English Language translation of Japanese Office Action dated Dec. 27, 2011 issued in the corresponding Japanese Patent Application No. JP2007-118103.

* cited by examiner

F I G. 24
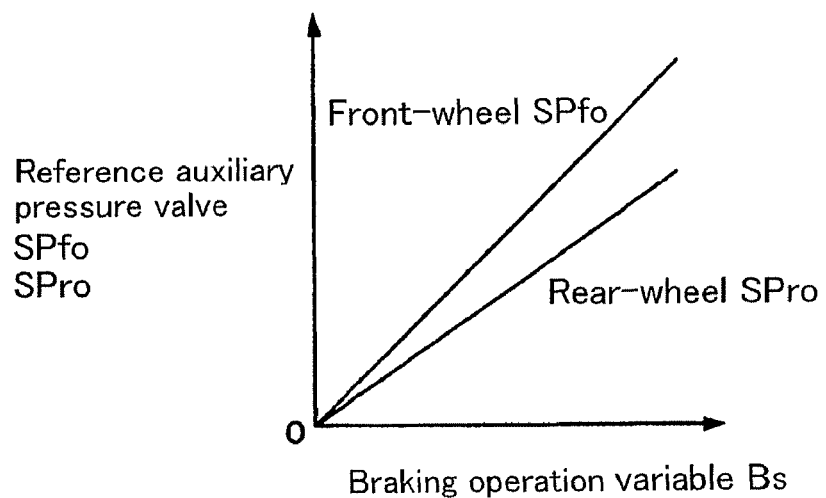
F I G. 25
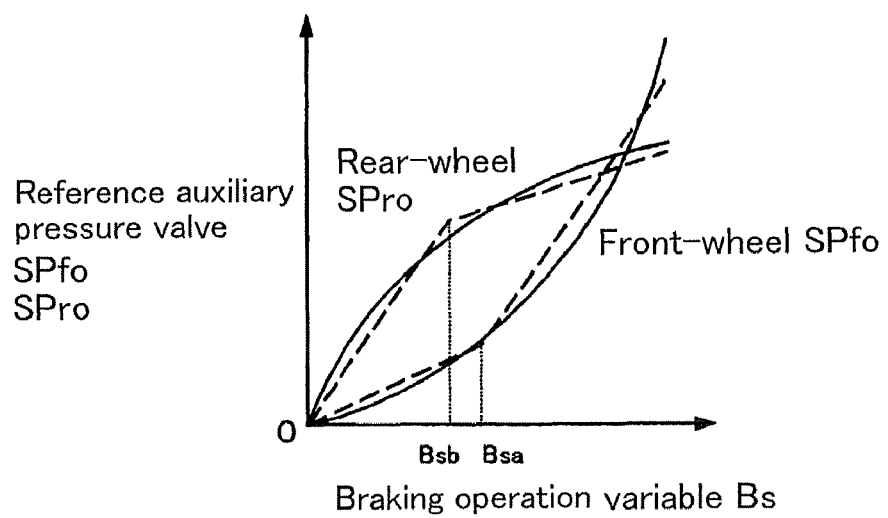

Turning state quantity Tc (or Tco)
[wheel state quantity Py**]

Pressure increasing gradient
upper limit value(Zu**)

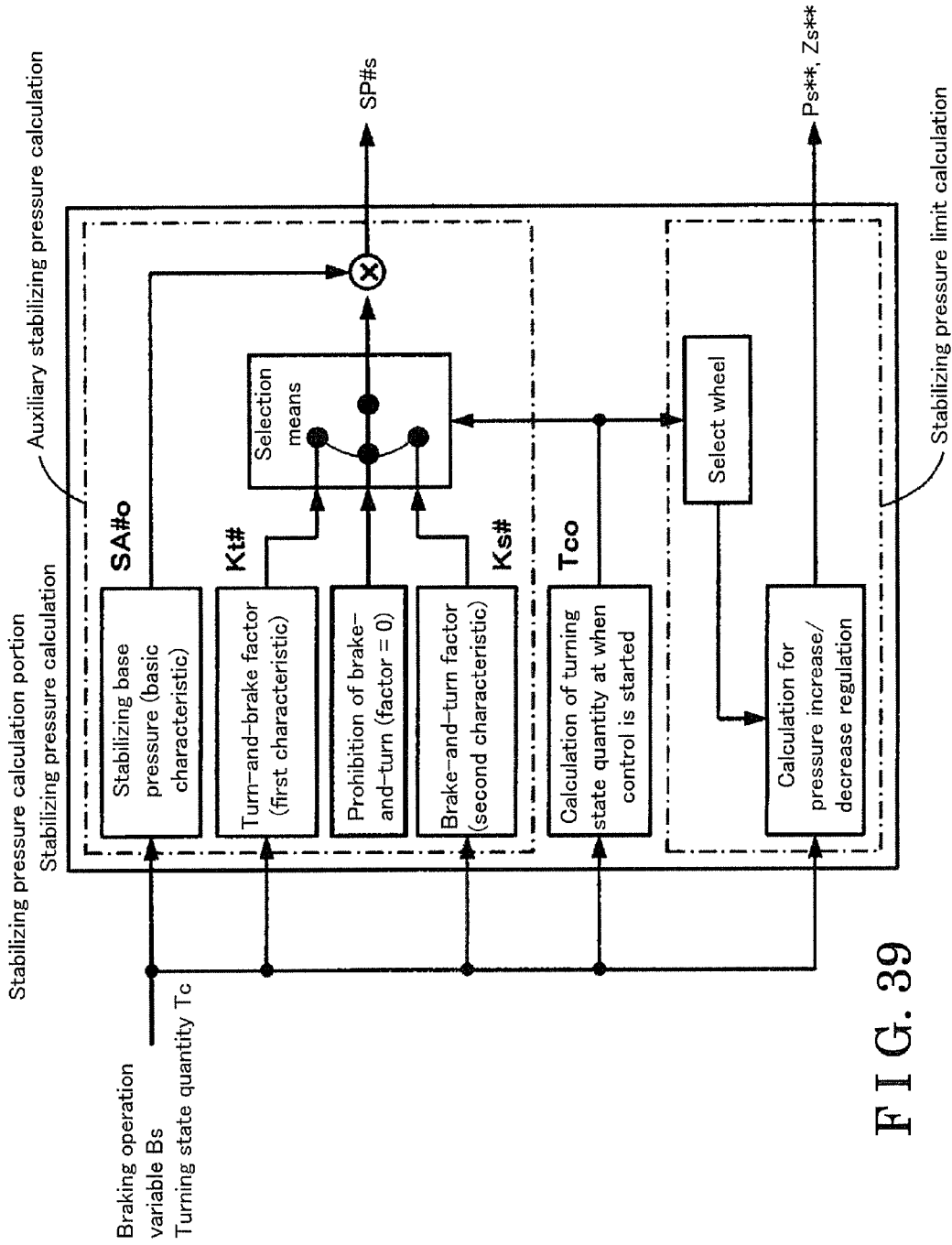
F I G. 39

BRAKE CONTROL APPARATUS FOR VEHICLE

CROSS REFERENCE TO RELATED APPLICATIONS

This application is based on and claims priority under 35 U.S.C. §119 to Japanese Patent Application 2007-106642, filed on Apr. 16, 2007, Japanese Patent Application 2007-111512, filed on Apr. 20, 2007, Japanese Patent Application 2007-118038, filed on Apr. 27, 2007, and Japanese Patent Application 2007-118103, filed on Apr. 27, 2007, the entire contents of which are incorporated herein by reference.

FIELD OF THE INVENTION

The present invention relates to a brake control apparatus for a vehicle.

BACKGROUND

A brake apparatus for a vehicle disclosed in JP1997290731A includes a first hydraulic circuit having a first and a second wheel cylinders and a second hydraulic circuit having a third and a fourth wheel cylinders. The brake apparatus for the vehicle disclosed in JP1997290731A regulates braking pressure distribution between the first and the second hydraulic circuits depending on a driving condition of the vehicle.

Specifically, the brake apparatus for the vehicle disclosed in JP1997290731A is provided with a hydraulic pressure pump at one of the first and the second hydraulic circuits for generating auxiliary hydraulic pressure that is added to a master cylinder pressure. When a driver conducts a brake operation while the vehicle is moving in a straight manner, the same level of pressure as the master cylinder pressure is applied to each of the first and the second hydraulic circuits. On the other hand, when the driver conducts the brake operation under a state where a steering angle is large (i.e., vehicle turning state), the hydraulic pressure pump is actuated in order to apply a larger braking hydraulic pressure than the master cylinder pressure to the one of the first and the second hydraulic circuits.

As a result, according to the brake apparatus for the vehicle disclosed in JP1997290731A, a larger braking force is generated when the driver conducts the brake operation while the vehicle turns, comparing to the braking force generated when the driver conducts the brake operation while the vehicle travels straight. However, this means that an increasing characteristic of deceleration of the vehicle with respect to a braking operation variable (i.e., a relationship between the braking operation variable and the vehicle deceleration) differs between a case where the driver conducts the brake operation while the vehicle turns and a case where the driver conducts the brake operation while the vehicle travels in the straight manner.

Generally, it is considered preferable that an increasing characteristic of the vehicle deceleration with respect to the braking operation variable is maintained constant even though the braking hydraulic pressure distribution between the two hydraulic circuits is varied. Further, it may be preferable that the distribution of the braking hydraulic pressure between the two hydraulic circuits is regulated so as to ensure directional stability of the vehicle, in a state where the vehicle is apt to be deflected due to a load condition of the vehicle, the vehicle driving condition and the like.

A need thus exists to provide a brake control apparatus for a vehicle which is not susceptible to the drawback mentioned above.

Additionally, when the driver conducts the brake operation while the vehicle turns, a vertical load applied to each of inner turning wheels is reduced due to a load shift occurring outwardly in a turning radius. Therefore, the brake apparatus for the vehicle disclosed in JP1997290731A may have difficulties in ensuring the directional stability of the vehicle, because cornering force of the inner cornering wheels is unlike to be ensured. In the aforementioned state, it is conceivable that the directional stability of the vehicle is ensured by regulating an increase of the braking hydraulic pressures applied to each of the inner cornering wheels (i.e., an increase of the braking force (longitudinal force)), and preventing a decrease of a limit value of the cornering force (lateral force) generated at the inner cornering wheels.

A need thus exists to provide the brake control apparatus for the vehicle which is not susceptible to the drawback mentioned above.

Furthermore, vehicle behavior differs between a case where the driver conducts the brake operation while the vehicle turns (hereinafter referred to as turn-and-brake operation) and a case where the vehicle turns while the driver conducts the brake operation (hereinafter referred to as brake-and-turn operation). The different vehicle behaviors in the aforementioned cases will be described below with reference to FIG. 51.

Force (frictional force) is generated by a pneumatic tire, which is simply referred to as a tire or a wheel, causing friction against a load surface. More specifically, the tire generates the force (frictional force) by the tire slipping against the road surface. The longitudinal force of the tire is generated by the tire slipping in a tire moving direction (in a longitudinal direction). Additionally, slip of the tire in the tire moving direction is a longitudinal slip and is expressed by slip ratio. The lateral force of the tire (i.e., the cornering force relative to a vehicle body) is generated by the tire slipping in a tire lateral direction. Additionally, slip of the tire in the tire lateral direction is lateral slip and is expressed by a slip angle that is an angle between the tire moving direction and a tire pointing direction.

While the driver conducts a steady turn at a constant speed, the slip angle is generated at front and rear wheels, which results in balancing the cornering force generated at the front wheels and the cornering force generated at the rear wheels. Hence, the sum of cornering force generated at each wheel is balanced against centrifugal force acting on the vehicle. As a result, the vehicle is driven along a turning circle.

When the vehicle speed is reduced by the brake operation while the driver conducts the steady turn at a constant speed (turn-and-brake operation), a vertical load shift from the rear wheels to the front wheels occurs. As a result, the cornering force of the front wheels is increased, and the cornering force of the rear wheels is decreased. An imbalance between the cornering force of the front and the rear wheels generates yawing moment inwardly in the turning direction, which results in the vehicle being moved inward in the turning circle (i.e., occurrence of an oversteering tendency). Referring to FIG. 51, this case corresponds to a shift of a vehicle motional state from a point Yo to a point A by the brake operation.

A case where the vehicle turns while the driver conducts the brake operation (brake-and-turn operation) will be described below. For example, the case where the vehicle turns while a brake control for a translatory moving vehicle is executed corresponds to a shift of the vehicle motional state from a point Xo to a point A by a turning operation. While the longitudinal slip occurs at tires after the brake operation is conducted, the lateral force of the tires is still lower than a case where the brake operation is not conducted, even if the slip angle is generated at the tires. Hence, the cornering force generated by applying the slip angle at the steering wheels by a steering operation is lower than the cornering force generated while the brake operation is not conducted. Therefore, turn-in ability of the vehicle (i.e., response characteristics of the vehicle changing the moving direction) is not sufficient.

As mentioned above, the vehicle behavior occurring when the driver conducts the brake operation while the vehicle turns differs from the vehicle behavior occurring when the vehicle turns while the driver conducts the brake operation. Therefore, stability of the vehicle needs to be enhanced for the turn-and-brake operation. On the other hand, the turn-in ability of the vehicle needs to be enhanced for the brake-and-turn operation.

A need thus exists to provide the brake control apparatus for the vehicle which is not susceptible to the drawback mentioned above.

SUMMARY OF THE INVENTION

According to an aspect of the present invention, a brake control apparatus for a vehicle includes four wheel braking apparatuses for applying a braking torque to front-right, front-left, rear-right, and rear-left wheels respectively in response to a braking hydraulic pressure supplied to each of wheel cylinders at respective wheels, a first hydraulic pressure generating apparatus including two hydraulic pressure generating chambers each generating a hydraulic pressure in response to a braking operation by a driver of a vehicle, a front-wheel hydraulic circuit hydraulically connecting one of the hydraulic pressure generating chambers to the two of the wheel braking apparatuses corresponding to the front-right wheel and the front-left wheel respectively, a rear-wheel hydraulic circuit hydraulically connecting the other one of the hydraulic pressure generating chambers to the other two of the wheel braking apparatuses corresponding to the rear-right wheel and the rear-left wheel respectively, a second hydraulic pressure generating apparatus being power driven and generating an auxiliary hydraulic pressure that is added to the hydraulic pressure in each of the front-wheel hydraulic circuit and rear-wheel hydraulic circuit generated by the first hydraulic pressure generating apparatus, a detecting means for detecting a braking operation variable in response to the braking operation by the driver, a reference amount determining means for determining a reference amount of auxiliary hydraulic pressure of each of the front-wheels in the front-wheel hydraulic circuit and a reference amount of auxiliary hydraulic pressure of each of the rear-wheels in the rear-wheel hydraulic circuit on the basis of the detected braking operation variable, an obtaining means for obtaining at least one of a state quantity indicating a load condition of the vehicle, a state quantity indicating a driving condition of the vehicle and a state quantity indicating slipperiness of wheel, a target amount determining means for determining, on the basis of the determined amounts of front-wheel and the rear-wheel reference amount of auxiliary hydraulic pressures and the obtained state quantity, an amount of auxiliary hydraulic pressure of each of the front-wheel in the front-wheel hydraulic circuit to be equal to or greater than the reference amount of auxiliary hydraulic pressure of each of the front-wheel and an amount of auxiliary hydraulic pressure of each of the rear-wheel in the rear-wheel hydraulic circuit to be equal to or lower than the reference amount of auxiliary hydraulic pressure of each of the rear-wheels, and a pressure regulating means for regulating the auxiliary hydraulic pressure in each of the front-wheel hydraulic circuit and the rear-wheel hydraulic circuit so as to correspond to respective target amount of auxiliary hydraulic pressures of the front-wheel and the rear-wheel.

According to another aspect of the present invention, a brake control apparatus for a vehicle includes four wheel braking apparatuses for applying a braking torque to front-right, front-left, rear-right, and rear-left wheels respectively in response to a braking hydraulic pressure supplied to each of wheel cylinders at respective wheels, a first hydraulic pressure generating apparatus including two hydraulic pressure generating chambers each generating a hydraulic pressure in response to a braking operation by a driver of a vehicle, a first hydraulic circuit hydraulically connecting one of the hydraulic pressure generating chambers to the two of the wheel braking apparatuses corresponding to the front-left wheel and the rear-right wheel respectively, a second hydraulic circuit hydraulically connecting the other one of the hydraulic pressure generating chambers to the other two of the wheel braking apparatuses corresponding to the front-right wheel and the rear-left wheel respectively, a second hydraulic pressure generating apparatus being power driven and generating an auxiliary hydraulic pressure that is added to the hydraulic pressure in each of the first hydraulic circuit and second hydraulic circuit generated by the first hydraulic pressure generating apparatus, a detecting means for detecting a braking operation variable in response to the braking operation by the driver, a reference amount determining means for determining a first reference amount of auxiliary hydraulic pressure in the first hydraulic circuit and a second reference amount of auxiliary hydraulic pressure in the second hydraulic circuit on the basis of the detected braking operation variable, an obtaining means for obtaining at least one of a state quantity indicating a load condition of the vehicle, a state quantity indicating a driving condition of the vehicle and a state quantity indicating slipperiness of wheel, a target amount determining means for determining, on the basis of the determined amounts of first and the second reference amount of auxiliary hydraulic pressures and the obtained state quantity, when the vehicle is in a turning state, a first target amount of auxiliary hydraulic pressure in one of the first and the second hydraulic circuits corresponding to a turning outer front-wheel and a turning inner rear-wheel to be equal to or greater than one of the first and the second reference amount of auxiliary hydraulic pressures corresponding to the one of the first and the second hydraulic circuits corresponding to the turning outer front-wheel and the turning inner rear-wheel, and a second target amount of auxiliary hydraulic pressure in the other one of the first and the second hydraulic circuits to be equal to or lower than the other one of the first and the second reference amount of auxiliary hydraulic pressures, and a pressure regulating means for regulating the auxiliary hydraulic pressure in each of the first hydraulic circuit and the second hydraulic circuit so as to correspond to respective first target amount of auxiliary hydraulic pressure and the second target amount of auxiliary pressure.

According to a further aspect of the present invention, a brake control apparatus for a vehicle includes four wheel braking apparatuses for applying a braking torque to front-right, front-left, rear-right, and rear-left wheels respectively in response to a braking hydraulic pressure supplied to each of wheel cylinders at respective wheels, a first hydraulic pressure generating apparatus including two hydraulic pressure generating chambers each generating a hydraulic pressure in response to a braking operation by a driver of a vehicle, a first hydraulic circuit hydraulically connecting one of the hydraulic pressure generating chambers to the two of the wheel braking apparatuses corresponding to the front-right wheel and the front-left wheel respectively, or to the two of the wheel braking apparatuses corresponding to the front-left wheel and the rear-right wheel respectively, a second hydraulic circuit hydraulically connecting the other one of the hydraulic pressure generating chambers to the other two of the wheel braking apparatuses corresponding to the rear-right wheel and the rear-left wheel respectively, or to the two of the wheel braking apparatuses corresponding to the front-right wheel and the rear-left wheel respectively, a second hydraulic pressure generating apparatus being power driven and generating an auxiliary hydraulic pressure that is added to the hydraulic pressure in each of the first hydraulic circuit and second hydraulic circuit generated by the first hydraulic pressure generating apparatus, a braking operation variable detecting means for detecting a braking operation variable in response to the braking operation by the driver, a state quantity obtaining means for obtaining a turning state quantity representing a turning motion of the vehicle, a pressure increase regulating control means selecting at least one of a turning inner front wheel and a turning inner rear-wheel as a selected wheel on the basis of the obtained turning state quantity, and executing an pressure increase regulating control by which the braking hydraulic pressure applied to the wheel braking apparatus corresponding to the selected wheel is maintained lower than a pressure level within the corresponding hydraulic pressure circuit, a reference amount determining means for determining a first reference amount of auxiliary hydraulic pressure in the first hydraulic circuit and a second reference amount of auxiliary hydraulic pressure in the second hydraulic circuit on the basis of the detected braking operation variable, a target amount determining means for determining, on the basis of the determined amounts of first and the second reference amount of auxiliary hydraulic pressures and the gained turning state quantity, a first target amount of auxiliary hydraulic pressure in the first hydraulic circuit to be equal to or greater than the first reference amount of auxiliary hydraulic pressure, and/or a second target amount of auxiliary hydraulic pressure in the second hydraulic circuit to be equal to or greater than the second reference amount of auxiliary hydraulic pressure, and a pressure regulating means for regulating the auxiliary hydraulic pressure in each of the first hydraulic circuit and the second hydraulic circuit to correspond to respective first target amount of auxiliary hydraulic pressure and the second target amount of auxiliary hydraulic pressure.

According to a further aspect of the present invention, a brake control apparatus for a vehicle includes four wheel braking apparatuses for applying a braking torque to front-right, front-left, rear-right, and rear-left wheels respectively in response to a braking hydraulic pressure supplied to each of wheel cylinders at respective wheels, a first hydraulic pressure generating apparatus including two hydraulic pressure generating chambers each generating a hydraulic pressure in response to a braking operation by a driver of a vehicle, a first hydraulic circuit hydraulically connecting one of the hydraulic pressure generating chambers to the two of the wheel braking apparatuses corresponding to the front-right wheel and the front-left wheel respectively, or to the two of the wheel braking apparatuses corresponding to the front-left wheel and the rear-right wheel respectively, a second hydraulic circuit hydraulically connecting the other one of the hydraulic pressure generating chambers to the other two of the wheel braking apparatuses corresponding to the rear-right wheel and the rear-left wheel respectively, or to the two of the wheel braking apparatuses corresponding to the front-right wheel and the rear-left wheel respectively, a second hydraulic pressure generating apparatus being power driven and generating an auxiliary hydraulic pressure that is added to the hydraulic pressure in each of the first hydraulic circuit and second hydraulic circuit generated by the first hydraulic pressure generating apparatus, a braking operation variable detecting means for detecting a braking operation variable in response to the braking operation by the driver, a turning state quantity detecting means for detecting a turning state quantity representing a turning motion of the vehicle, a reference amount of auxiliary hydraulic pressure determining means for determining a first reference amount of auxiliary hydraulic pressure in the first hydraulic circuit and a second reference amount of auxiliary hydraulic pressure in the second hydraulic circuit on the basis of the detected braking operation variable, a state determining means for detecting a first state when a turning state quantity detected at a start of the braking operation conducted by the driver as the turning state quantity is equal to or greater than a first predetermined value, and a second state when the turning state quantity detected at the start of the braking operation conducted by the driver is lower than a second predetermined value which is equal to or lower than the first predetermined value, a target amount of auxiliary hydraulic pressure determining means for determining, on the basis of the detected turning state quantity, when the first state is detected, a first target amount of auxiliary hydraulic pressure in one of the first and the second brake-circuits connected to the two of the wheel braking apparatuses corresponding to the front-right and front-left wheels respectively or to the two of the wheel braking apparatuses corresponding to a turning outer front-wheel and a turning inner rear-wheel respectively to be equal to or greater than one of the determined first reference amount of auxiliary hydraulic pressure and the second reference amount of auxiliary hydraulic pressure corresponding to the said one of the first and the second brake-circuits and determining a second target amount of auxiliary hydraulic pressure in the other one of the first and the second brake-circuits to be equal to or lower than the other one of the determined first reference amount of auxiliary hydraulic pressure and the second reference amount of auxiliary hydraulic pressure, and the target amount of auxiliary hydraulic pressure determining means determining, on the basis of the detected turning state quantity, when the second state is detected, the first target amount of auxiliary hydraulic pressure to be equal to or lower than the said one of the determined first reference amount of auxiliary hydraulic pressure and the second reference amount of auxiliary hydraulic pressure and determining the second target amount of auxiliary hydraulic pressure to be equal to or greater than the said other one of the determined first reference amount of auxiliary hydraulic pressure and the second reference amount of auxiliary hydraulic pressure, and a pressure regulating means for regulating the auxiliary hydraulic pressure in each of the said one of the first and the second hydraulic circuits and the said other one of the first and the second hydraulic circuits so as to correspond to respective determined first target amount of auxiliary hydraulic pressure and the second target amount of auxiliary hydraulic pressure.

According to a further aspect of the present invention, a brake control apparatus for a vehicle, includes four wheel braking apparatus for applying a braking torque to front-right, front-left, rear-right, and rear-left wheels respectively in response to a braking hydraulic pressure supplied to each of wheel cylinders at respective wheels, a first hydraulic pressure generating apparatus including two hydraulic pressure generating chambers each generating a hydraulic pressure in response to a braking operation by a driver of a vehicle, a first hydraulic circuit hydraulically connecting one of the hydraulic pressure generating chambers to the two of the wheel braking apparatuses corresponding to the front-right wheel and the front-left wheel respectively, or to the two of the wheel braking apparatuses corresponding to the front-left wheel and the rear-right wheel respectively, a second hydraulic circuit hydraulically connecting the other one of the hydraulic pressure generating chambers to the other two of the wheel braking apparatuses corresponding to the rear-right wheel and the rear-left wheel respectively, or to the two of the wheel braking apparatuses corresponding to the front-right wheel and the rear-left wheel respectively, a second hydraulic pressure generating apparatus being power driven and generating an auxiliary hydraulic pressure that is added to the hydraulic pressure in each of the first hydraulic circuit and second hydraulic circuit generated by the first hydraulic pressure generating apparatus, a braking operation variable detecting means for detecting a braking operation variable in response to the braking operation by the driver, a turning state quantity detecting means for detecting a turning state quantity representing a turning motion of the vehicle, a reference amount of auxiliary hydraulic pressure determining means for determining a first reference amount of auxiliary hydraulic pressure in the first hydraulic circuit and a second reference amount of auxiliary hydraulic pressure in the second hydraulic circuit on the basis of the detected braking operation variable, a state determining means for detecting a first state when a turning state quantity detected at a start of the braking operation conducted by the as the turning state quantity is equal to or greater than a first predetermined value, and a second state when the turning state quantity detected at the start of the braking operation conducted by the driver is lower than the first predetermined value, a target amount of auxiliary hydraulic pressure determining means for determining, on the basis of the detected turning state quantity, when the first state is detected, a first target amount of auxiliary hydraulic pressure in one of the first and the second brake-circuits connected to the two of the wheel braking apparatuses corresponding to the front-right and front-left wheels respectively or to the two of the wheel braking apparatuses corresponding to a turning outer front-wheel and a turning inner rear-wheel respectively to be equal to or greater than one of the determined first reference amount of auxiliary hydraulic pressure and the second reference amount of auxiliary hydraulic pressure corresponding to the said one of the first and the second brake-circuits and determining a second target amount of auxiliary hydraulic pressure in the other one of the first and the second brake-circuits to be equal to or lower than the other one of the determined first reference amount of auxiliary hydraulic pressure and the second reference amount of auxiliary hydraulic pressure, and the target amount of auxiliary hydraulic pressure determining means determining, when the second state is detected, each of the first target amount of auxiliary hydraulic pressure and the second target amount of auxiliary hydraulic pressure to be a value equal to corresponding the said one of the first and the second reference amount of auxiliary hydraulic pressures and the said other one of the first and the second reference amount of auxiliary hydraulic pressures, and a pressure regulating means for regulating the auxiliary hydraulic pressure in each of the said one of the first and the second hydraulic circuits and the said other one of the first and the second hydraulic circuits so as to correspond to respective determined first target amount of auxiliary hydraulic pressure and the second target amount of auxiliary hydraulic pressure.

BRIEF DESCRIPTION OF THE DRAWINGS

The foregoing and additional features and characteristics of the present invention will become more apparent from the following detailed description considered with the reference to the accompanying drawings, wherein:

FIG. 24 is a graph showing a table specifying a relationship between the braking operation variable and the reference auxiliary pressure value in a case where a front-rear split brake system is employed;

FIG. 25 is a graph showing a table specifying a relationship between the braking operation variable and the reference auxiliary pressure value in the case where a front-rear split brake system is employed;

FIG. 39 is a functional bloc diagram illustrating a stabilizing pressure calculating portion illustrated in FIG. 38;

DETAILED DESCRIPTION

Embodiments of a brake control apparatus for a vehicle according to the present invention will be described below with reference to the attached drawings. The brake control apparatus for the vehicle (hereinafter referred to simply as a brake control apparatus) of a first embodiment has a front-rear split brake system. The brake control apparatus of a second embodiment has a diagonal split brake system.

First Embodiment

Entire Configuration of the Brake Control Apparatus

Figure 1:
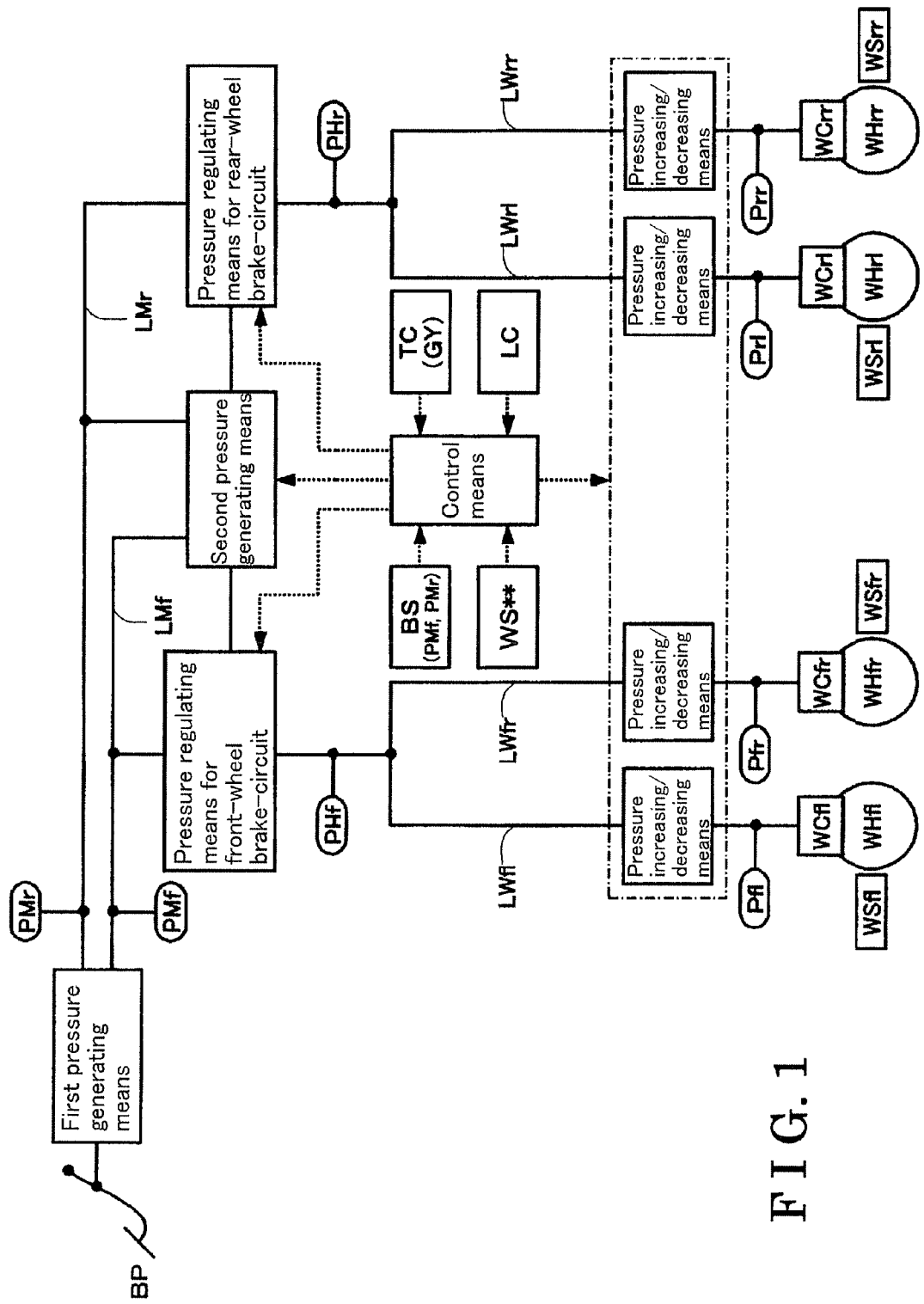
FIG. 1 is a diagram illustrating an entire configuration of a brake control apparatus for a vehicle associated with a first embodiment.
Figure 2:
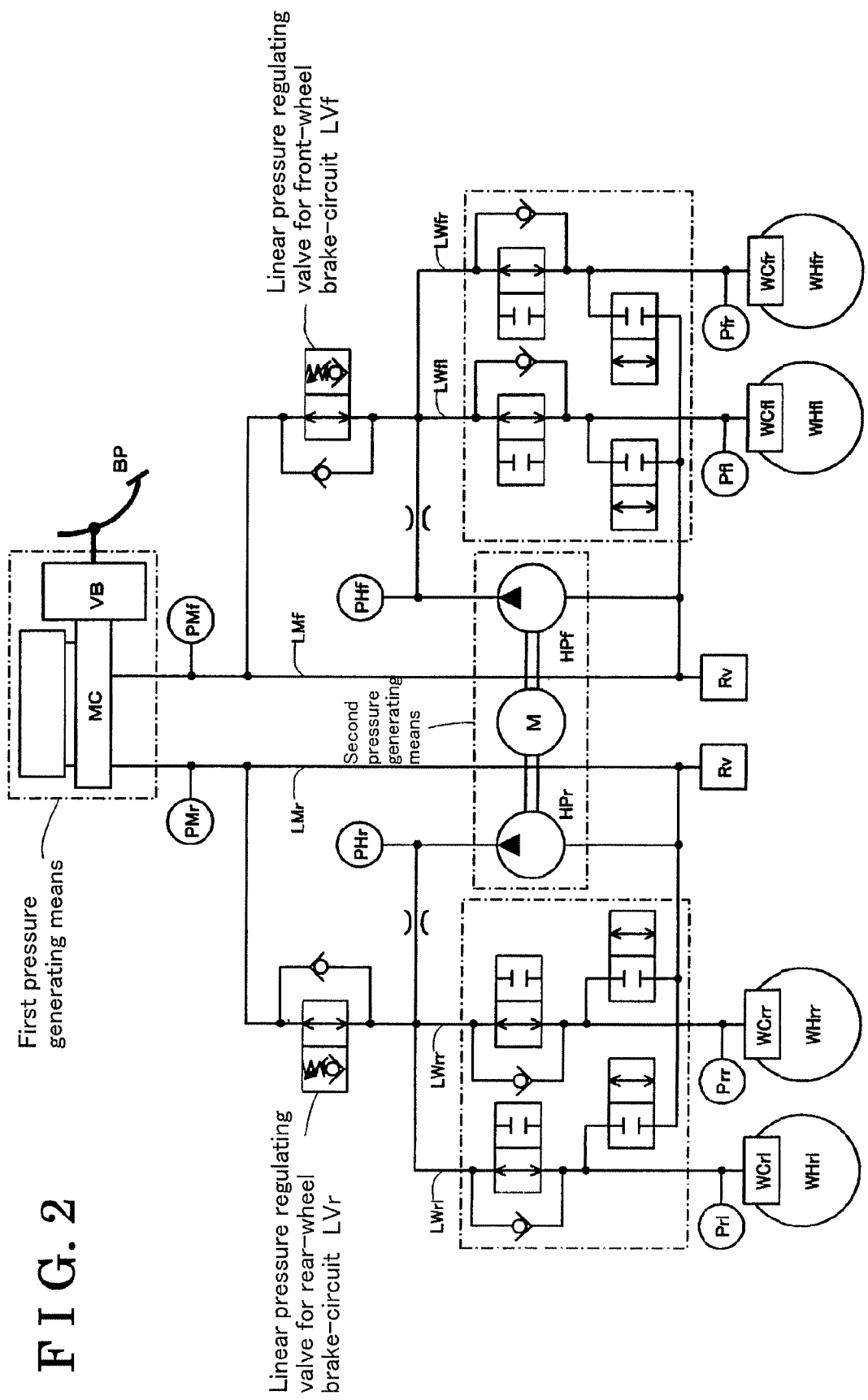
FIG. 2 is a diagram illustrating details of brake hydraulic circuits in the entire configuration of the brake control apparatus illustrated in FIG. 1.

An entire configuration of the brake control apparatus associated with the first embodiment will be described below in accordance with FIGS. 1 and 2. A first pressure generating means, which corresponds to a first hydraulic pressure generating apparatus, is a master cylinder MC. The master cylinder MC includes two hydraulic pressure generating chambers (not shown). The master cylinder MC generates braking pressure (hydraulic pressure) in response to a driver's operation of a brake pedal BP (brake operation). In other words, the master cylinder MC generates the braking pressure by using force (power) generated by the driver as a power source. Further, in order to reduce brake pedal operating force, the master cylinder MC may be provided with a vacuum booster VB, which is also referred to as a negative pressure booster or a brake booster.

A second pressure generating means, which corresponds to a second hydraulic pressure generating apparatus (M and HP#), is a hydraulic pump HP# (hereinafter referred to simply as a pump HP#) driven by an electric motor M. The pump HP# generates the braking pressure by a power source (e.g., an electric power source) other than the power generated by the driver. The pump HP# sucks some of fluid discharged from the master cylinder MC and discharges the sucked fluid to a wheel cylinder WC. A wheel braking apparatus includes the wheel cylinder WC, a rotor, a caliper, a pad and the like.

A symbol "#" indicates each brake-circuit in a dual-braking circuit (hydraulic circuit). When the front-rear split brake system is employed, alphabet "f" indicates a front-wheel brake-circuit LMf (a front-wheel hydraulic circuit), and alphabet "r" indicates a rear-wheel brake-circuit LMr (a rear-wheel hydraulic circuit). On the other hand, when the diagonal split brake system is employed, number 1 indicates a first brake-circuit LM1 (a first hydraulic circuit), and number 2 indicates a second brake-circuit LM2 (a second hydraulic circuit). The same definitions are applied to other embodiments. Additionally, symbols "**" indicate each wheel, specifically, "fl" indicates a front-left wheel, "fr" indicates a front-right wheel, "rl" indicates a rear-left wheel and "rr" indicates a rear-right wheel.

The pump HP# sucks fluid from a conduit portion LM# and discharges the sucked fluid to a conduit portion LW**. Therefore, movement of fluid is generated, which further generates auxiliary braking pressure in addition to the braking pressure generated by the master cylinder MC. Each of the brake-circuits includes two conduit portions.

A detecting means BS detects braking operation variable Bs corresponding to an operation of a brake-operation member (e.g., the brake pedal BP) conducted by the driver. Specifically, the detecting means BS detects the braking pressures (i.e., master cylinder pressure Pm#) in two brake-circuits (front-wheel hydraulic circuit and rear-wheel hydraulic circuit) connected to the master cylinder MC or to the respective two hydraulic pressure generating chambers of the master cylinder MC. Hence, the master cylinder pressure Pm# may be used as the braking operation variable Bs. Further, the detecting means BS may be configured to detect at least one of a displacement amount (stroke) of the brake pedal BP and operating force applied to the brake pedal BP in order to use the detected value (brake pedal stroke or the brake pedal operating force and the like) as the braking operation variable Bs.

A pressure regulating means is, for example, a linear pressure regulating valve LV# which is also referred to as a linear solenoid valve or a linear control valve. The pressure regulating means regulates pressure generated by the second pressure generating means (i.e., the electric motor and the pump) based on an after-mentioned target auxiliary pressure value SP#t. Then, the braking pressure generated by the second pressure generating means (the electric motor M and the pump HP#) is added to the braking pressure generated by the first pressure generating means (the master cylinder MC), and the total braking pressure (the braking pressure generated by the first pressure generating means and the braking pressure generated by the second pressure generating means) is applied to the wheel cylinder WC**. Rotational speed of the electric motor M is controlled so as to generate necessary and appropriate pressure for the brake operation. Then, the linear solenoid valve LV# completes the adjustment of the pressure.

<<Configuration of the Brake Control>>

A configuration of the brake control executed by the brake control apparatus associated with the first embodiment will be described below in accordance with FIG. 3.

<Calculation of Reference Auxiliary Pressure Value SP#o>

A reference value of the pressure (i.e., pressure added to the braking pressure) supplementing (assisting) the braking pressure generated by the first pressure generating means (i.e., the master cylinder MC) is calculated on the basis of an operation variable of the brake member (i.e., the brake pedal BP) generated by the driver. The operation variable of the brake member is hereinafter referred to as the braking operation variable Bs. The braking operation variable Bs is calculated on the basis of the detection results of the detecting means BS for detecting the braking operation variable. More specifically, the braking operation variable Bs is calculated on the basis of the detection results of at least one of a brake pedal stroke sensor, a brake pedal depression sensor and a master cylinder pressure sensor.

The level of the braking pressure generated by the master cylinder MC is the same level as the pressure within the conduit portion LM#. The purpose of the driver conducting the brake operation is to decelerate the vehicle (vehicle body). The brake control apparatus presses brake pads to the corresponding brake rotors by braking pressure. Then, the brake control apparatus generates braking force to the wheels by friction force generated by pressing the brake pads to the corresponding brake rotors. Hence, the pressure (pressure of fluid within the wheel cylinders) is targeted for the brake control. Therefore, it may be preferable to use the master cylinder pressure Pm# as the braking operation variable Bs, because the master cylinder pressure PM# has the same physical quantity as the pressure of the wheel cylinders WC**.

The reference value of the auxiliary pressure (which corresponds to an reference amount of auxiliary hydraulic pressure) is calculated on the basis of the braking operation variable Bs generated by the driver according to specifications which serve as references of the vehicle. The reference value of the auxiliary pressure is hereinafter referred to also as a reference value SP#o. The standard specifications of the vehicle are represented by values of vehicle weight Ms, center of gravity point, a wheelbase L and the like. The aforementioned values vary depending on conditions of passenger carriage, loading and the like. However, through the embodiments, the values are set in assuming a specific condition, such as a set number of passengers and a set mass of loading.

Figure 4:
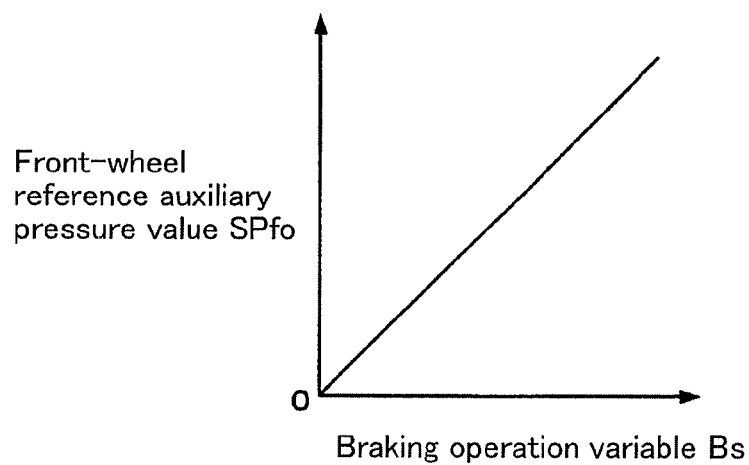
FIG. 4A is a graph showing a table specifying a relationship between braking operation variable and a front-wheel reference auxiliary pressure value.
FIG. 4B is a graph showing a table specifying a relationship between the braking operation variable and a rear-wheel reference auxiliary pressure value.
Figure 4:
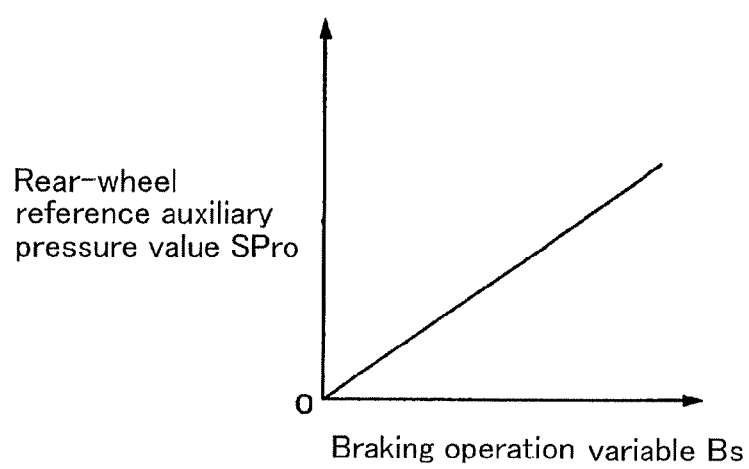

The reference auxiliary pressure value SP#o is calculated on the basis of ideal braking force distribution or on the basis of a characteristic of braking force distribution similar to the ideal braking force distribution. The ideal braking force distribution is achieved when the braking force applied to the front and rear wheels is distributed so as to be proportional to load applied to each of the front and rear wheels by taking into account the load shift occurring during the brake operation. FIG. 4A is a table (map) specifying a relationship between the braking operation variable Bs and a front-wheel reference auxiliary pressure value SPfo. FIG. 4B is a table (map) specifying a relationship between the braking operation variable Bs and a rear-wheel reference auxiliary pressure value SPro. As shown in FIG. 4B, the reference auxiliary pressure value SP#o proportionally (linearly) increases from value zero (0) in accordance with increase of the braking operation variable Bs from value zero (0). The front-wheel reference auxiliary pressure value SPfo may be set to be the same level as the rear-wheel reference auxiliary pressure value SPro, or the front-wheel reference auxiliary pressure value SPfo may be set to differ from the rear-wheel reference auxiliary pressure value SPro.

Figure 5A:
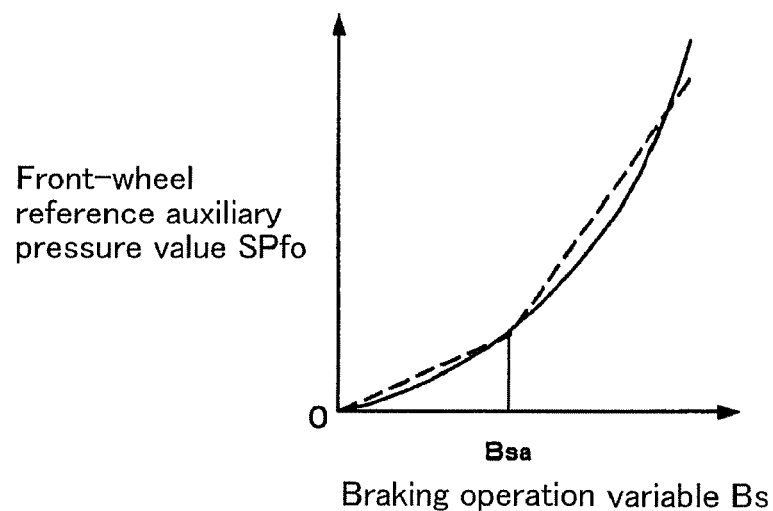
FIG. 5A is a graph showing an another example of the tables specifying the relationship between the braking operation variable and the front-wheel reference auxiliary pressure value.

As illustrated in FIG. 5A, the front-wheel reference auxiliary pressure value SPfo may be set to increase from the value zero (0) so as to downwardly curve (a downwardly convex characteristic) in accordance with the increase of the braking operation variable Bs from the value zero (0) (see a full line in FIG. 5A). Alternatively, the front-wheel reference auxiliary pressure value SPfo may be set so as to increase from the value zero (0) along a dashed line having a characteristic approximate to the downwardly convex characteristic. As illustrated in FIG. 5A, the dashed line is formed with plural straight lines each of whose slopes increase in accordance with the increase of the braking operation variable Bs from the value zero (0).

Figure 5B:
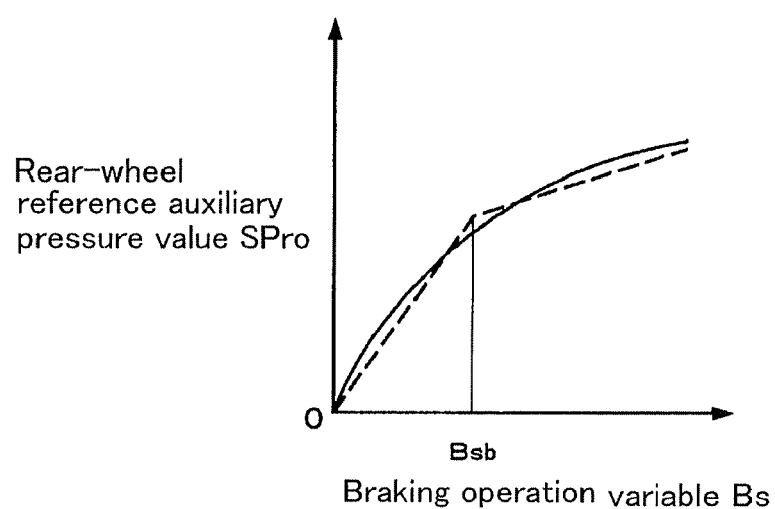
FIG. 5B is a graph showing an another example of the tables specifying relationship between the braking operation variable and the rear-wheel reference auxiliary pressure value.

As illustrated in FIG. 5B, the rear-wheel reference auxiliary pressure value SPro may be set to increase from the value zero (0) so as to upwardly curve (an upwardly convex characteristic) in accordance with the increase of the braking operation variable Bs from the value zero (0) (see a full line in FIG. 5B). Alternatively, the rear-wheel reference auxiliary pressure value SPro may be set to increase from the value zero (0) along a dashed line having a characteristic approximate to the upwardly convex characteristic. As illustrated in FIG. 5B, the dashed line is formed with plural straight lines each of whose slopes decrease in accordance with the increase of the braking operation variable Bs from the value zero (0). By combining the front-wheel and the rear-wheel reference auxiliary pressure values SPfo and SPro, the braking force distribution between the front wheels and the rear wheels becomes close to the ideal braking force distribution.

In setting of the auxiliary pressure, any desired braking operation variable may be set as a starting point for applying the auxiliary pressure. However, it may be preferable that infinitesimal braking operation variable including zero (0) (zero or infinitesimal value approximate to zero) is set as the starting point for applying the auxiliary pressure. Application of the auxiliary pressure changes an operating characteristic of the brake pedal BP. However, by setting the infinitesimal braking operation variable including zero (0) as the starting point for applying the auxiliary pressure, the driver may feel less discomfortable.

Additionally, when the master cylinder MC is provided with the vacuum booster VB which has jump-in characteristics, a braking operation variable at which jump-in occurs may be set as the starting point for applying the auxiliary pressure. The jump-in characteristics, which are also referred to as jumping characteristics, indicate a sudden rise (stepwise increase) of the assist force of the vacuum booster VB from the value 0. By adjusting the starting point for applying the auxiliary point to the braking operation variable at which the jump-in of the vacuum booster VB occurs, the driver feels less discomfortable.

The auxiliary pressure may be set on the basis of an estimated vertical load applied to each wheel. In this case, a target vehicle body deceleration (a target vehicle body deceleration rate) is determined on the basis of the braking operation variable Bs. Then, total braking force for generating the target vehicle body deceleration is calculated. The total braking force is distributed to each wheel on the basis of the vertical load applied thereto. The vertical load applied to each wheel is estimated on the basis of the detection results of a longitudinal acceleration sensor GX, or on the basis of vehicle body deceleration Gx gained by differentiating vehicle body speed Vx, and the standard specifications of the vehicle. Even in this case, the reference auxiliary pressure value SP#o is calculated on the basis of the braking operation variable Bs. A means for determining the reference auxiliary pressure value SP#o corresponds to a reference amount determining means.

<Calculation of Target Auxiliary Pressure Value SP#t>

A target value of the auxiliary pressure (which is hereinafter referred to also as a target value SP#t) is a final target value gained by adjusting the reference value SP#o on the basis of an adjustment value (modification factor). The adjustment value, which will be described below, is determined on the basis of vehicle state quantity, driving state quantity and wheel state quantity. The second pressure generating means and the pressure regulating means are controlled on the basis of the target auxiliary pressure value SP#t. Adjustment of the reference value SP#o in the first embodiment is executed for each case where the vehicle turns and the vehicle travels in a straight manner.

The following equation is satisfied:

$$SPft = Kf \cdot Fnc(Bs)$$

where Kf is a front-wheel modification factor. The front-wheel modification factor is calculated on the basis of a formula: $Kf = Kvhf \cdot Kdcf \cdot Kpyf$ where at least one of Kvhf, Kdcf and Kpyf, which are described below, is omittable. Additionally, Fnc(Bs) is a table or a function indicating the front-wheel reference auxiliary pressure value SPfo with the braking operation variable Bs being used as an argument, and Fnc(Bs) has characteristics shown in, for example, FIG. 4 or FIG. 5.

The following equation is satisfied:

$$SPrt = Kr \cdot Gnc(Bs)$$

where Kr is a rear-wheel modification factor. The rear-wheel modification factor is calculated on the basis of a formula: $Kr = Kvhr \cdot Kdcr \cdot Kpyr$ where at least one of Kvhr, Kdcr and Kpyr, which are described below, is omittable. Additionally, Gnc(Bs) is a table or a function indicating the rear-wheel reference auxiliary pressure value SPro with the braking operation variable Bs being used as the argument, and Gnc(Bs) has characteristics shown in, for example, FIG. 4 or FIG. 5.

<Calculation of Adjustment Value (Modification Factor)>

Firstly, a calculation of the adjustment value (modification factor) Kvh# on the basis of the vehicle condition will be described below. The vehicle state quantity is a value indicating a load condition (static load condition) or a value which varies depending on the load condition. For example, the vehicle state quantity is expressed as a ratio of a load applied to a front-wheel axle relative to the vehicle weight (front-wheel distribution ratio Jh), a ratio of load applied to a rear-wheel axle relative to the vehicle weight (rear-wheel distribution ration (1-Jh)), difference of applied load in a lateral direction of the vehicle (hereinafter referred to as a imbalanced load Hk), or the height of center of gravity Hg variable depending on the load condition. The adjustment value (the modification factor) Kvh# is calculated on the basis of at least one of the front-wheel distribution ratio Jh, the imbalanced load HK and the height of center of gravity Hg.

The vehicle weight used for calculating the load distribution ratio Jh (front-wheel distribution ration Jh) is gained on the basis of the detection results of a load sensor, which is provided at least one of the wheels, an air pressure sensor for an air spring, and a height sensor. Alternatively, the load distribution ratio Jh (front-wheel distribution ration Jh) is calculated on the basis of a relationship between an acceleration operation (driving force applied to the vehicle) and vehicle acceleration, or a relationship between the brake operation (braking force applied to the vehicle) and vehicle deceleration.

The imbalanced load Hk is gained by calculating the load applied to the right wheels and the load applied to the left wheels on the basis of the detection results of, for example, the load sensor, and the air pressure sensor for the air spring and the height sensor. Alternatively, the imbalanced load Hk is calculated on the basis of the detection results of a seat belt sensor, an occupant sensor for air bag and an occupant physical attribute sensor. The height of center of gravity Hg is gained on the basis of the vehicle weight. Alternatively, the height of center of gravity Hg is gained on the basis of a relationship between a turning state and rolling motion, or a relationship between a deceleration state and pitching motion. A means for obtaining a property of the load condition of the vehicle serves as a part of an obtaining means (a load state quantity detecting means LC).

For example, the adjustment value (the modification factor) Kvh# is expressed in the following equation:

$$Kvh\# = Kjh\# \cdot Khk\# \cdot Khg\#$$

where Kjh# is a modification factor based on the front-wheel distribution ratio Jh, Khk# is a modification factor based on the imbalanced load Hk and Khg# is a modification factor based on the height of center of gravity Hg. At least one of Kjh#, Khk# and Khg# is omittable in the calculation of Kvh#.

Figure 6:
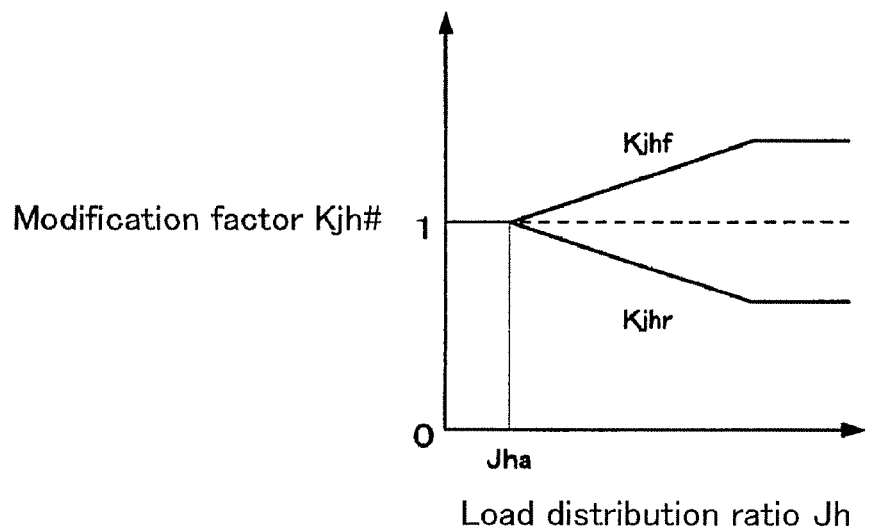
FIG. 6 is a graph showing a table specifying a relationship between a load distribution ratio and a modification factor.

The modification factor Kjh# based on the front-wheel distribution ratio Jh will be explained below. The modification factor Kjh# is set on the basis of the load distribution ratio Jh (the front-wheel distribution ratio), as shown in FIG. 6. Specifically, when the front-wheel distribution ratio Jh is lower than a predetermined value Jha, each of the front-wheel modification factor Kjhf and the rear-wheel modification factor Kjhr is set to one (1). On the other hand, when the front-wheel distribution ratio Jh is equal to or greater than the predetermined value Jha, the front-wheel modification factor Kjhf is increased from one (1) and the rear-wheel modification factor Kjhr is reduced from one (1) in accordance with an increase of the front-wheel distribution ratio Jh.

In this case, an increasing amount (an increasing rate) of the front-wheel modification factor Kjhf from one (1) and a decreasing amount (an increasing rate) of the rear-wheel modification factor Kjhr from one (1) are set so that an increasing characteristic of vehicle deceleration with respect to the braking operation variable Bs (the relationship between the braking operation variable and the vehicle deceleration) is maintained substantially constant. That is to say, the modification factor Kjh# is set with consideration of a brake effectiveness factor, a brake effective radius, a pressure receiving area of the wheel cylinder and the like so that the amount of the braking force with respect to the increasing amount of the front-wheel modification factor Kjhf mostly corresponds to a decreasing amount of the braking factor with respect to the decreasing amount of the rear-wheel modification factor Kjhr.

Additionally, when the modification factor is one, the reference auxiliary pressure value itself is calculated as the target auxiliary pressure value. The modification factor being zero indicates that the auxiliary pressure is not provided (auxiliary pressure=0). The same definition is applicable to other modification factors.

By setting the front-wheel modification factor Kjhf and the rear-wheel modification factor Kjhr on the basis of the front-wheel distribution ratio Jh, the braking force distribution between the front and rear wheels becomes close to the ideal distribution. Hence, the rear-wheel braking force is effectively utilized.

Figure 7:
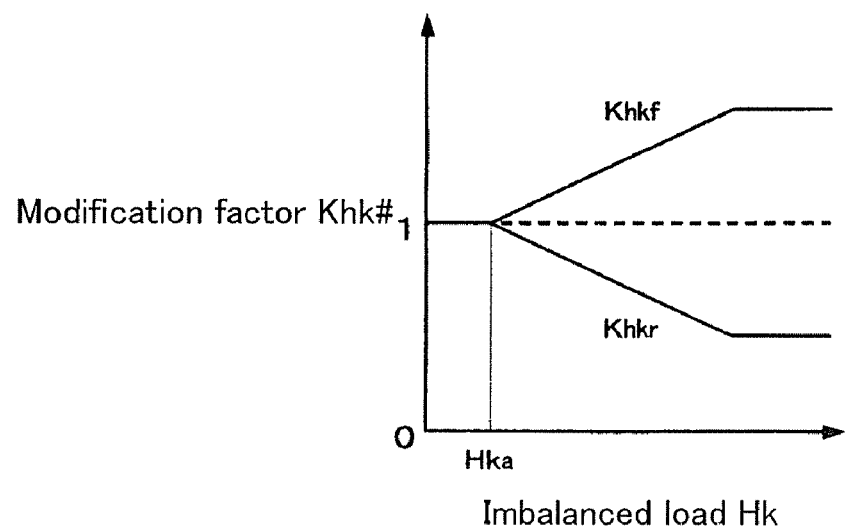
FIG. 7 is a graph showing a relationship between an imbalanced load and the modification factor.

The modification factor Khk# based on the imbalanced load Hk will be described below. When the vertical loads applied to the wheels differ in a right to left direction of the vehicle (i.e., vehicle width direction), the vehicle may be apt to be deflected while the driver conducts the brake operation. Therefore, in order to prevent the above-mentioned drawback, the modification factor Khk# is set on the basis of the imbalanced load Hk, as show in FIG. 7. Specifically, when the imbalanced load Hk is lower than a predetermined value Hka, each of a front-wheel modification factor Khkf and a rear-wheel modification factor Khkr is set to one (1). On the other hand, when the imbalanced load Hk is equal to or greater than the predetermined value Hka, the front-wheel modification factor Khkf is increased from one (1) and the rear-wheel modification factor Khkr is reduced from one (1) in response to an increase of the imbalanced load Hk.

In this case, an increasing amount of the front-wheel modification factor Khkf from one (1) and a decreasing amount of the rear-wheel modification factor Khkr from one (1) are set so that the increasing characteristic of vehicle deceleration with respect to the braking operation variable Bs (the relationship between the braking operation variable and the vehicle deceleration) is maintained substantially constant. That is to say, the modification factor Khk# is set with consideration of the brake effectiveness factor, the brake effective radius, the pressure receiving area of the wheel cylinder and the like so that the increasing amount of the braking force with respect to the increasing amount of the front-wheel modification factor Khkf mostly corresponds to the decreasing amount of the braking factor with respect to the decreasing amount of the rear-wheel modification factor Khkr.

As mentioned above, in response to an increase of the imbalanced load Hk, a front-wheel ratio is increased and a rear-wheel ratio is decreased in the braking force distribution between the front and rear wheels by the modification factor Khk#. Hence, cornering force is securely generated at the rear-wheels. As a result, vehicle stability (directional stability) under braking is enhanced.

Figure 8:
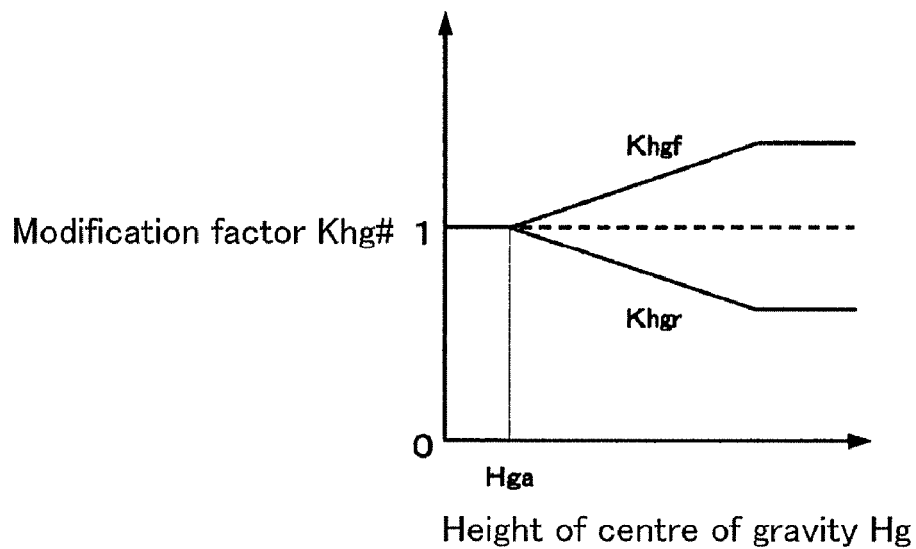
FIG. 8 is a graph showing a table specifying relationship between height of center of gravity and the modification factor.

The modification factor Khg# based on the height of center of gravity Hg will be described below. When the height of center of gravity Hg of the vehicle is set to be higher, the load shift occurring while the vehicle turns or the brake operation being conducted becomes greater. Particularly when the driver conducts the brake operation while the vehicle turns, the vertical load applied to a turning inner rear-wheel is decreased. As a result, the vehicle may have difficulties in securely generating the cornering force at the rear-wheels. Therefore, in order to prevent the above-mentioned drawback, the modification factor Khg# is set on the basis of the height of center of gravity Hg, as shown in FIG. 8. Specifically, when the height of center of gravity Hg is shorter than a predetermined height Hga, each of a front-wheel modification factor Khgf and a rear-wheel modification factor Khgr is set to one (1). On the other hand, when the height of center of gravity Hg is equal to or higher than the predetermined height Hga, the front-wheel modification factor Khgf is increased from one (1) and the rear-wheel modification factor Khgr is reduced from one (1) in response to the increase of the height of center of gravity Hg.

In this case, an increasing amount of the front-wheel modification factor Khgf and a decreasing amount of the rear-wheel modification factor Khgr from one (1) are set so that the increasing characteristic of the vehicle deceleration with respect to the braking operation variable Bs (i.e., the relationship between the braking operation variable and the vehicle deceleration) is maintained substantially constant. That is to say, the modification factor Khg# is set with consideration of the brake effectiveness factor, the brake effective radius, the pressure receiving area of the wheel cylinder and the like so that the increasing amount of the braking force with respect to the increased amount of the front-wheel modification factor Khgf mostly corresponds to the decreasing amount of the braking factor with respect to the decreasing amount of the rear-wheel modification factor Khgr.

As mentioned above, in response to the increase of the height of center of gravity Hg, the front-wheel ratio is increased and the rear-wheel ratio is decreased in the braking force distribution between the front and rear wheels by the modification factor Khg#. Hence, the cornering force is securely generated at the rear-wheels. As a result, the vehicle stability (directional stability) under braking is enhanced.

Secondly, a calculation of the adjustment value (the modification factor) Kdc# on the basis of a driving condition will be described below. The driving state quantity is a value indicating the driving condition of the vehicle. For example, the driving state quantity represents speed of the vehicle body (vehicle speed) Vx or a state quantity Tc indicating a turning motion of the vehicle (turning state quantity Tc). The adjustment value (modification factor) Kdc# is calculated on the basis of at least one of the vehicle body speed Vx and the turning state quantity Tc.

The vehicle body speed Vx is calculated on the basis of the detection result of a wheel speed sensor WS**. The turning state quantity Tc is determined on the basis of the detection result of at least one of a lateral acceleration sensor, a yaw rate sensor, a steering wheel operating angle sensor, a steering angle sensor for steering wheels (a front-right and a front-left wheels), and the like. A means for obtaining a property indicating the vehicle condition (e.g., the vehicle body speed, the turning state of the vehicle and the like) serves as a part of the obtaining means (e.g., turning state quantity detecting means TC).

For example, the adjustment value (modification factor) Kdc# is expressed in the following equation:

$$Kdc\# = Kvx\# \cdot Ktc\#$$

where Kvx# is a modification factor based on the vehicle body speed Vx, and Ktc# is a modification factor based on the turning state quantity Tc. At least one of Kvx#, and Ktc# may be omittable in calculation of Kdc#.

Figure 9:
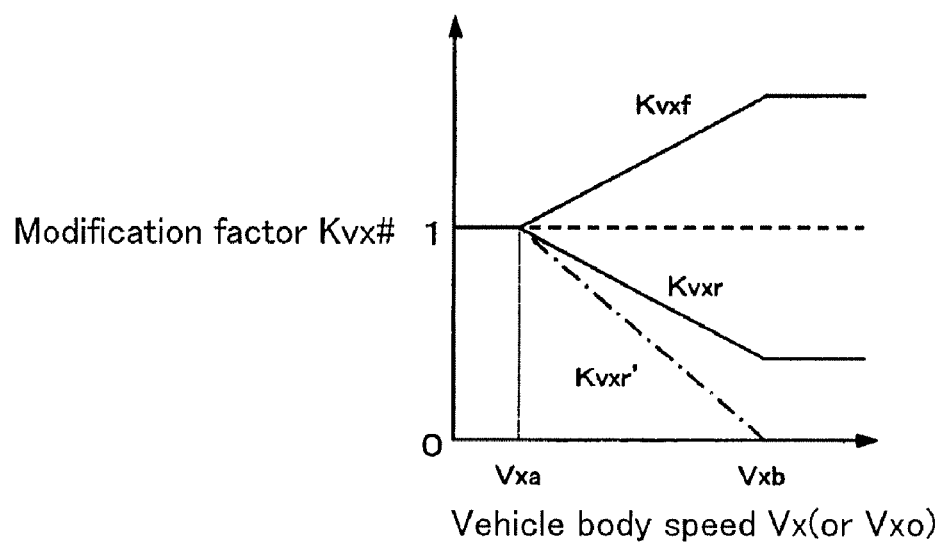
FIG. 9 is a graph showing a table specifying a relationship between vehicle body speed and the modification factor.

The modification factor Kvx# based on the vehicle body speed Vx will be described below. When the vehicle speed is high, the directional stability of the vehicle is assumed to be essential. Therefore, in order to ensure the directional stability of the vehicle, the modification factor Kvx# is set on the basis of the vehicle body speed Vx, as shown in FIG. 9. Specifically, when the vehicle body speed Vx is lower than a predetermined value Vxa, each of a front-wheel modification factor Kvxf and a rear-wheel modification factor Kvxr is set to one (1). On the other hand, when the vehicle body speed Vx is equal to or higher than the predetermined value Vxa, the front-wheel modification factor Kvxf is increased from one (1) and the rear-wheel modification factor Kvxr is reduced from one (1) in response to an increase of the vehicle body speed Vx.

In this case, an increasing mount of the front-wheel modification factor Kvxf and a decreasing amount of the rear-wheel modification factor Kvxr from one (1) are set so that the increasing characteristic of vehicle deceleration with respect to the braking operation variable Bs (i.e., the relationship between the braking operation variable and the vehicle deceleration) is maintained substantially constant. That is to say, the modification factor Kvx# is set with consideration of the brake effectiveness factor, the brake effective radius, the pressure receiving area of the wheel cylinder and the like so that the increasing amount of the braking force with respect to the increasing amount of the front-wheel modification factor Kvxf mostly corresponds to the decreasing amount of the braking factor with respect to the decreasing amount of the rear-wheel modification factor Kvxr.

Alternatively, under the circumstances where the vehicle body speed Vx is equal to or greater than a predetermined value Vxb (>Vxa), the rear-wheel modification factor Kvxr may be set to zero (0) by increasing a decreasing gradient of the rear-wheel modification factor Kvxr with respect to the increase of the vehicle body speed Vx when the vehicle body speed Vx is equal to or greater than the predetermined value Vxa (see Kvxr' in FIG. 9).

As mentioned above, in response to the increase of the vehicle body speed Vx, the front-wheel ratio is increased and the rear-wheel ratio is decreased in the braking force distribution between the front and rear wheels by the modification factor Kvx#. Hence, the cornering force is securely generated at the rear-wheels even if a slight slip angle is generated due to disturbance. As a result, the vehicle stability (directional stability) is enhanced.

The vehicle body speed Vx is a property that changes momentarily by braking. The front-wheel modification factor Kvxf and the rear-wheel modification factor Kvxr may be set on the basis of vehicle body speed Vxo of the brake operation starting point, instead of the vehicle body speed Vx. Even in this case, the cornering force is securely generated at the rear-wheels and the vehicle stability (directional stability) under braking is ensured.

Figure 10:
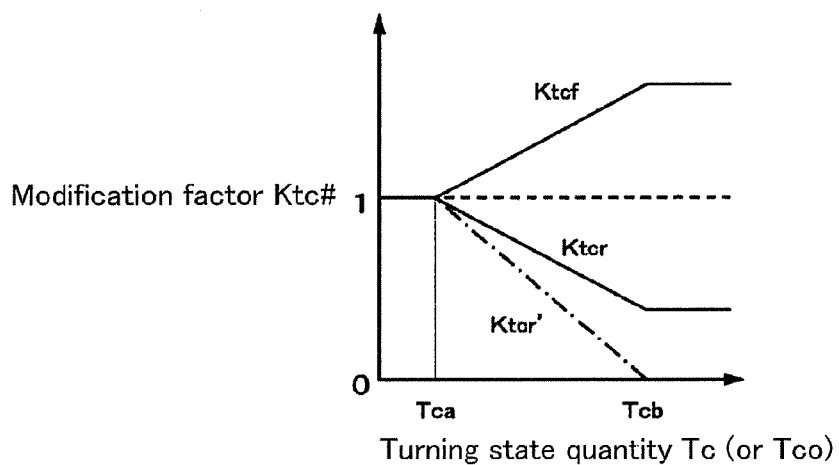
FIG. 10 is a graph showing a table specifying a relationship between turning state quantity and the modification factor.

The modification factor Ktc# based on the turning state quantity Tc will be described below. The load shift occurs in the right-left direction while the vehicle turns, which results in reducing the vertical load applied to the turning inner wheels. Additionally, the load shift occurs in a front-rear direction (longitudinal direction) of the vehicle while the driver conducts the brake operation, which results in reducing the vertical load applied to the turning inner rear-wheel. As a result, the vehicle may have difficulties in securely generating the cornering force at the rear-wheels. Therefore, in order to prevent the above-mentioned drawback, the modification factor Ktc# is set on the basis of the turning state quantity Tc of the vehicle, as shown in FIG. 10. Specifically, when the turning state quantity Tc is lower than a predetermined value Tca, each of a front-wheel modification factor Ktcf and a rear-wheel modification factor Ktcr is set to one (1). On the other hand, when the turning state quantity Tc is equal to or greater than the predetermined value Tca, the front-wheel modification factor Ktcf is increased from one (1) and the rear-wheel modification factor Ktcr is reduced from one (1) in response to an increase of the turning state quantity Tc.

In this case, an increasing amount of the front-wheel modification factor Ktcf from one (1) and a decreasing amount of the rear-wheel modification factor Ktcr from one (1) are set so that the increasing characteristic of vehicle deceleration with respect to the braking operation variable Bs (i.e., the relationship between the braking operation variable and the vehicle deceleration) is maintained substantially constant. In other words, the modification factor Ktc# is set with consideration of the brake effectiveness factor, the brake effective radius, the pressure receiving area of the wheel cylinder and the like so that the increasing amount of the braking force with respect to the increasing amount of the front-wheel modification factor Ktcf mostly corresponds to the decreasing amount of the braking factor with respect to the decreasing amount of the rear-wheel modification factor Ktcr.

Alternatively, under the circumstances where the turning state quantity Tc is greater than a predetermined value Tcb (>Tca), the rear-wheel modification factor Ktcr may be set to zero (0) by increasing a decreasing gradient of the rear-wheel modification factor Ktcr with respect to the increase of the turning state quantity Tc when the turning state quantity Tc is equal to or greater than the predetermined value Tca (see Ktcr' in FIG. 10).

As mentioned above, in response to the increase of the turning state quantity Tc, the front-wheel ratio is increased and the rear-wheel ratio is decreased in the braking force distribution between the front and rear wheels by the modification factor Ktc#. Hence, the cornering force is securely generated at the rear-wheels. As a result, the vehicle stability is ensured.

The turning state quantity Tc is a property that changes momentarily by braking. The front-wheel modification factor Ktcf and the rear-wheel modification factor Ktcr may be set on the basis of the turning state quantity Tco of the brake operation starting point, instead of the turning state quantity Tc. Even in this case, the cornering force is securely generated at the rear-wheels and the vehicle stability under braking is ensured.

The front-wheel modification factor Ktcf and the rear-wheel modification factor Ktcr are set on the basis of estimated vertical load applied to each wheel. The vertical load applied to each wheel is estimated on the basis of the turning state quantity Tc or the turning state quantity Tco. In this case, the target value for the vehicle deceleration rate is determined on the basis of the braking operation variable Bs. Then, the total braking force for generating the target vehicle deceleration rate is calculated. The total braking force is distributed to each wheel based on the vertical load applied thereto. The vertical load applied to each wheel is estimated on the basis of the detection result of a longitudinal acceleration sensor GY, a lateral acceleration Gy estimated on the basis of a steering wheel angle δ sw, or the standard specifications of the vehicle. Even in this case, the front-wheel modification factor Ktcf and the rear-wheel modification factor Ktcr are calculated on the basis of the turning state quantity Tc or the turning state quantity Tco.

Thirdly, a calculation of the adjustment value (modification factor) Kpy# on the basis of the wheel state quantity will be described below. The wheel state quantity Py is a value indicating slipperiness of each wheel. The modification factor Kpy# is set on the basis of at least one of wheel state quantities Py each of which indicates the slipperiness of corresponding wheel. Further, the modification factor Kpy# may be set on the basis of a rear-wheel state quantity Pyr, because the vehicle stability depends largely on the cornering force generated at the rear-wheels. The rear-wheel state quantity Pyr is a property of a rear-wheel which becomes slippery or an average value of wheel properties of the two rear-wheels. Additionally, the rear-wheel state quantity Pyr is calculated on the basis of the wheel state quantity Py** of each wheel.

The wheel state quantity Py** is a wheel slip velocity S1* gained, for example, from differences between the vehicle body speed and wheel speed. Alternatively, a slip ratio Sr gained by subtracting the vehicle body speed from the wheel speed velocity S1 may be used as the wheel state quantity Py. Furthermore, the wheel state quantity Py may be calculated on the basis of a road surface μ gradient (e.g., JP2001133390A corresponding to U.S. Pat. No. 6,522,968) or a wheel grip factor (e.g., JP2003312465A corresponding to U.S. Pat. No. 6,895,317). A means for obtaining a property indicating the slipperiness of wheel corresponds serves as a part of the obtaining means (e.g., wheel speed detecting means WS**).

Figure 11:
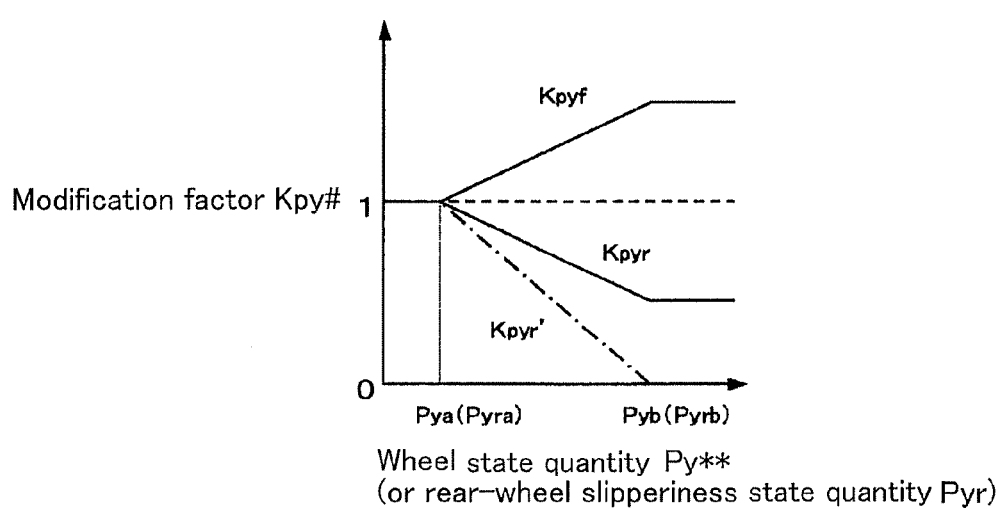
FIG. 11 is a graph showing a table specifying a relationship between wheel state quantity and the modification factor.

When the wheel state quantity Py or the rear-wheel state quantity Pyr is great, in other words, when the corresponding wheel becomes slippery, the directional stability is assumed to be essential. Therefore, in order to ensure the directional stability, the modification factor Kpy# is set on the basis of the wheel state quantity Py of at least one of the wheels or the wear-wheel state quantity Pyr, as shown in FIG. 11. Specifically, when the wheel state quantity Py or the rear-wheel state quantity Pyr is lower than a predetermined value Pya or Pyra, each of a front-wheel modification factor Kpyf and a rear-wheel modification factor Kpyr is set to one (1). On the other hand, when the wheel state quantity Py or the rear-wheel state quantity Pyr is equal to or greater than the predetermined value Pya or Pyra, the front-wheel modification factor Kpyf is increased from one (1) and the rear-wheel modification factor Kpyr is reduced from one (1) in response to an increase of the wheel state quantity Py** or the rear-wheel state quantity Pyr.

In this case, an increasing amount of the front-wheel modification factor Kpyf and a decreasing amount of the rear-wheel modification factor Kpyr from one (1) are set so that the increasing characteristic of vehicle deceleration with respect to the braking operation variable Bs (i.e., the relationship between the braking operation variable and the vehicle deceleration) is maintained substantially constant. That is to say, the modification factor Kpy# is set with consideration of the brake effectiveness factor, the brake effective radius, the pressure receiving area of the wheel cylinder and the like so that the increasing amount of the braking force with respect to the increasing amount of the front-wheel modification factor Kpyf mostly corresponds to the decreasing amount of the braking factor with respect to the decreasing amount of the rear-wheel modification factor Kpyr.

Alternatively, under the circumstances where the wheel state quantity Py is equal to or greater than a predetermined value Pyb (>Pya), the rear-wheel modification factor Kpyr may be set to zero (0) by increasing a decreasing gradient of the rear-wheel modification factor Kpyr with respect to the increase of the wheel state quantity Py when the wheel state quantity Py** is equal to or greater than the predetermined value Pya or Pyra (see Kpyr' in FIG. 11).

As mentioned above, the more the wheel(s) becomes slippery, the more the front-wheel ratio is increased and the rear-wheel ratio is decreased in the braking force distribution between the front and rear wheels by the modification factor Kpy#. Hence, the cornering force is securely generated at the rear-wheels even if slight slip angle is generated due to disturbance and the like. As a result, the vehicle stability (directional stability) is ensured. A means for determining the target auxiliary pressure value SP#t corresponds to a target amount determining means.

<<Driving Means>>

Figure 3:
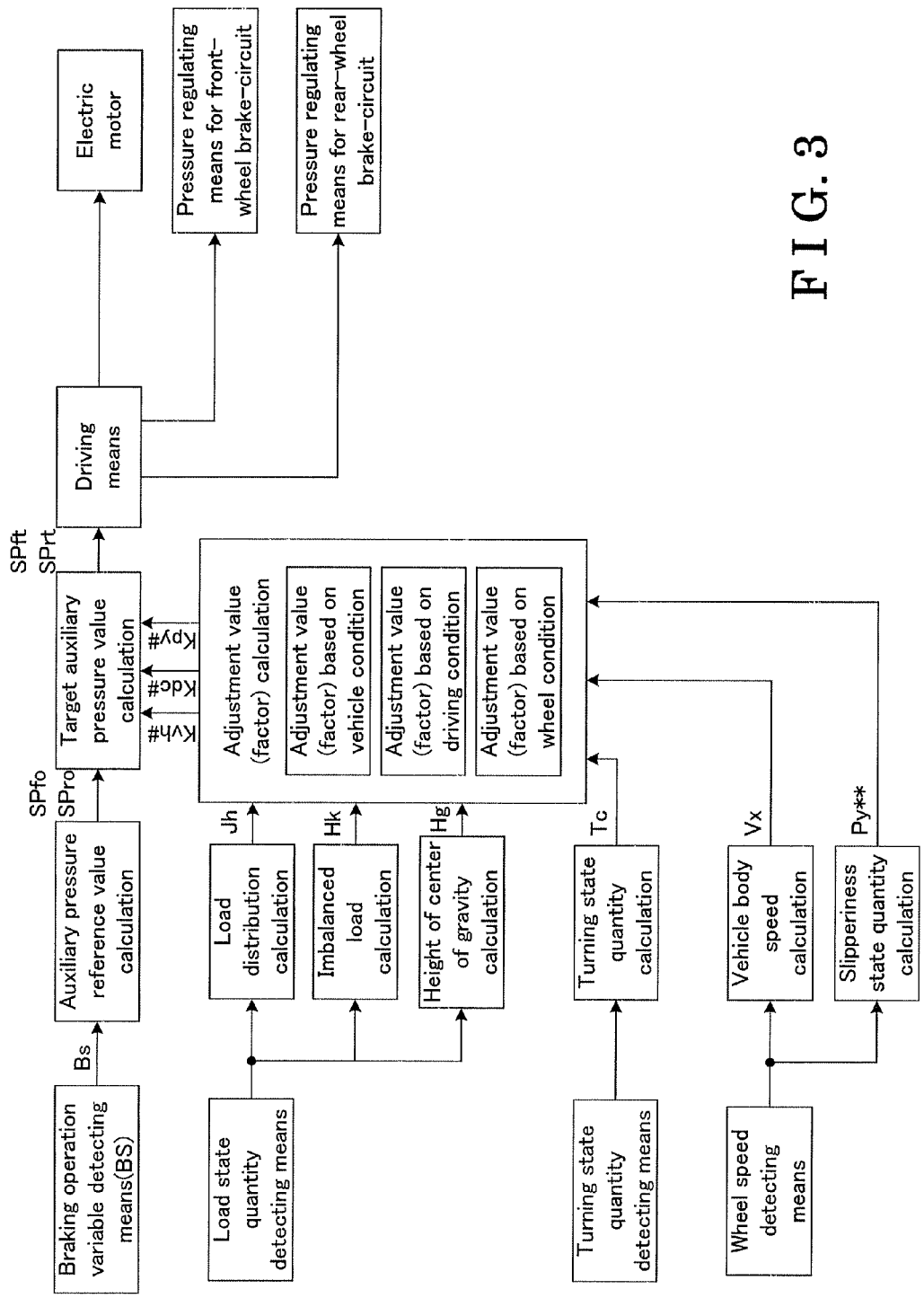
FIG. 3 is a functional block diagram illustrating a brake control executed by the brake control apparatus for the vehicle associated with the first embodiment.

Referring to FIG. 3, a driving means drives and controls the second pressure generating means (i.e., the electric motor and pump) and the pressure regulating means (i.e., the linear solenoid valve LV#) provided at the front-wheel brake-circuit and the rear-wheel brake-circuit so as to control a wheel cylinder pressure Pw** of each wheel by adding the auxiliary pressure to the pressure generated by the first pressure generating means (i.e., the master cylinder MC). More specifically, the driving means controls rotation of the electric motor M and opening/closing state of the linear solenoid valves LV# provided at the corresponding front-wheel and the rear-wheel brake-circuits on the basis of the corresponding target auxiliary pressure values SPft and SPrt calculated in the target auxiliary pressure value calculation.

The electric motor M is controlled so that the pump reaches a predetermined rotational speed to supply the pressure by which the target auxiliary pressure values SPft and SPrt are generated. A target pressure values applied to each of the front-wheel brake-circuit and the rear-wheel brake-circuit is calculated on the basis of the detection results of the detecting means BS (e.g., the master cylinder pressure Pm#) and the front-wheel and rear-wheel target auxiliary pressure values SPft and SPrt. Then, a current value for driving each of the linear solenoid valves LV# is determined on the basis of the target pressure values applied to the corresponding brake-circuit in order to control the linear solenoid valve LV#.

When a pressure sensors P is provided at each of the front-wheel and the rear-wheel brake-circuits, a feedback control is executed in order to control the target pressure value to coincide with the actual pressure detected by the pressure sensors P. The pressure sensors P are excludable. When the pressure sensor P is not provided at each wheel, the actual pressures of the front-wheel and rear-wheel brake-circuits are estimated on the basis of wheel movement (i.e., history of changes in the wheel speed), operating states of the solenoid valves and the like.

Second Embodiment

Figure 12:
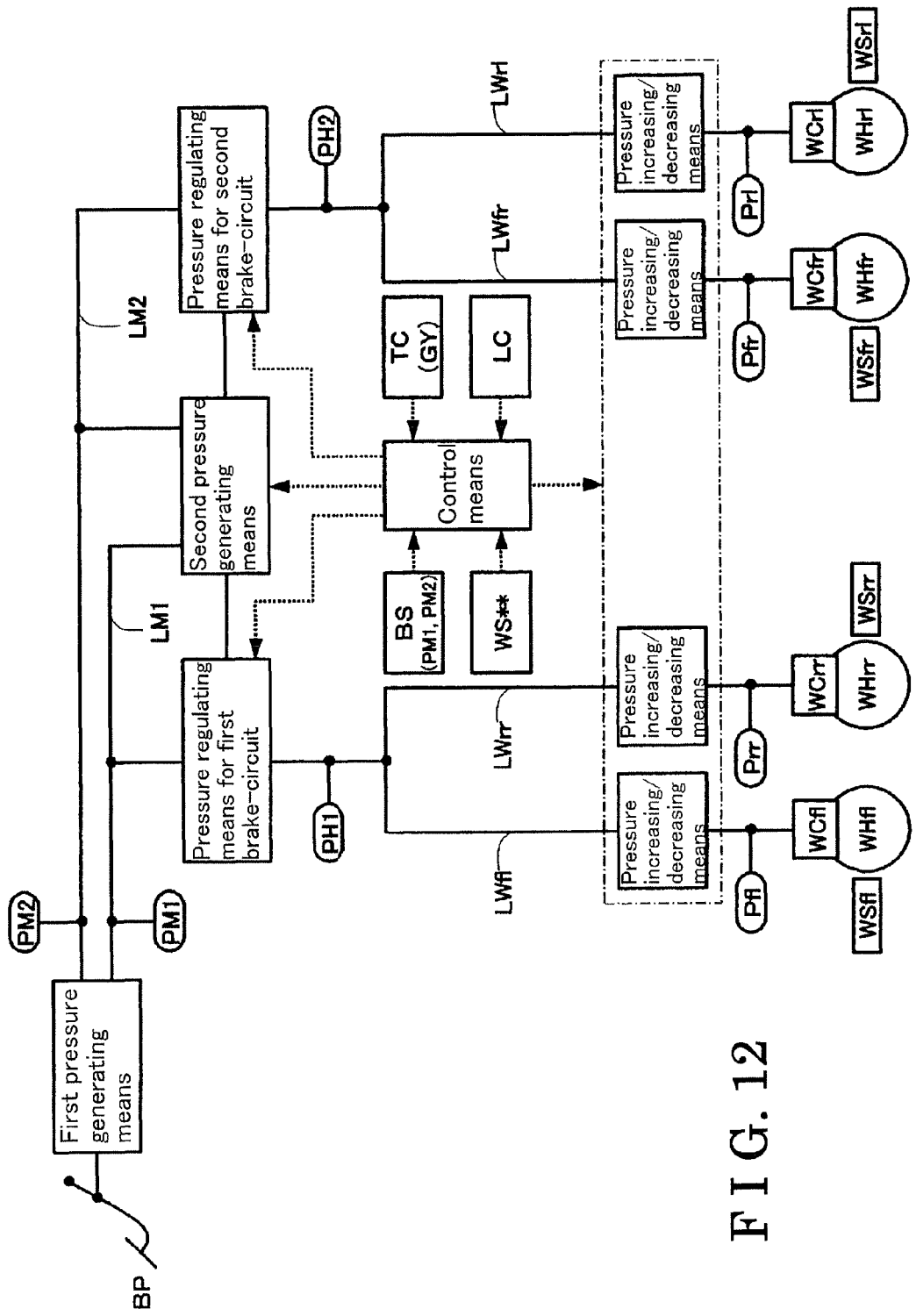
FIG. 12 is a diagram illustrating an entire configuration of the brake control apparatus for the vehicle associated with a second embodiment.
Figure 13:
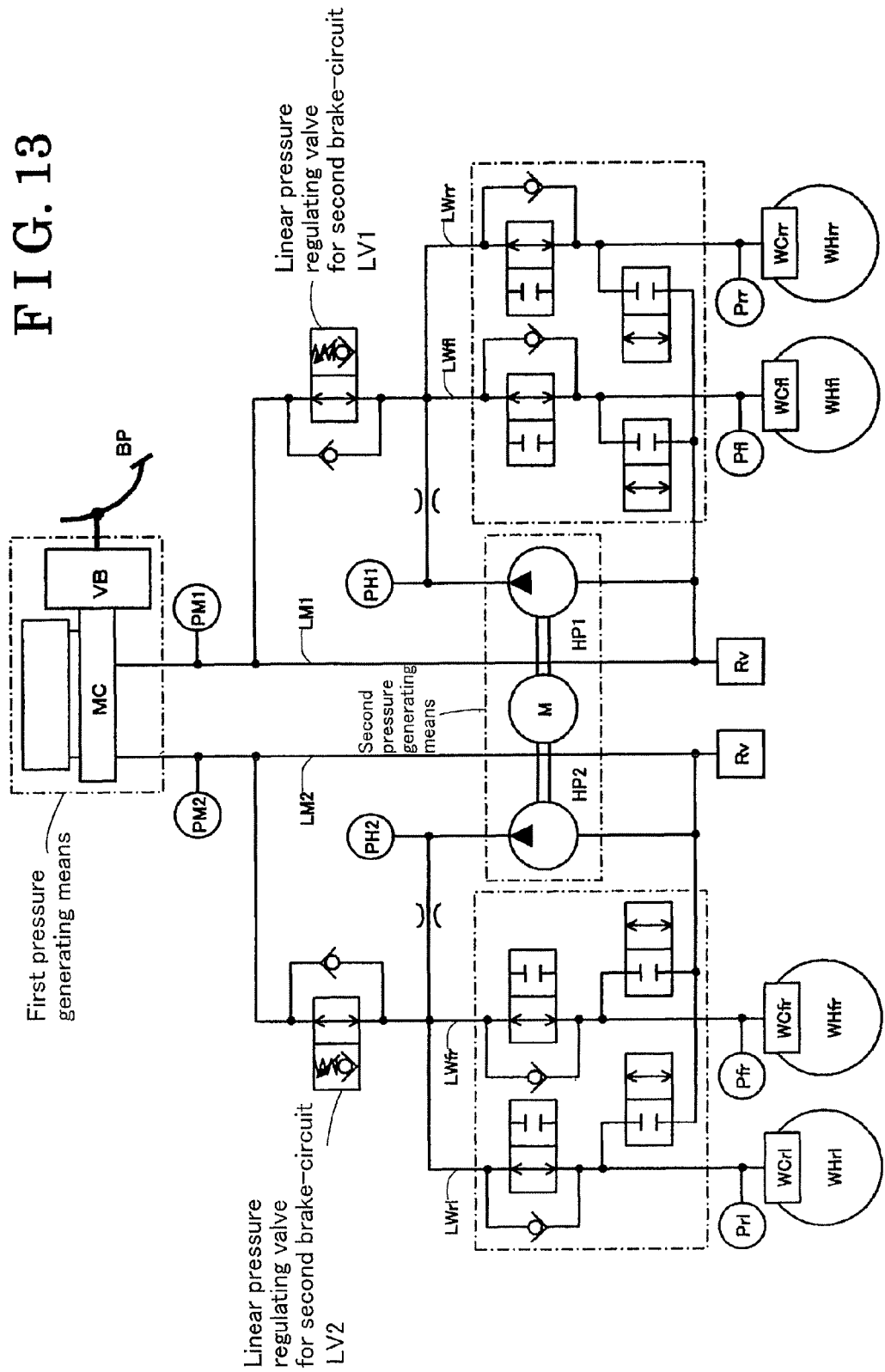
FIG. 13 is a diagram illustrating details of brake fluid circuits in the entire configuration of the brake control apparatus illustrated in FIG. 12.

An entire configuration of the brake control apparatus associated with the second embodiment will be described below. As illustrated in FIGS. 12 and 13, the second embodiment differs from the first embodiment, in which the brake control apparatus includes the front-rear split brake system, in that the brake control apparatus of the second embodiment includes the diagonal split brake system. Specifically, in the second embodiment, a first brake-circuit (i.e., a first hydraulic circuit) related to the front-left wheel and the rear-right wheel and a second brake-circuit (i.e., a second hydraulic circuit) related to the front-right wheel and the rear-left wheel are connected to respective hydraulic pressure generating chambers of the master cylinder MC.

<<Configuration of Brake Control>>

Figure 14:
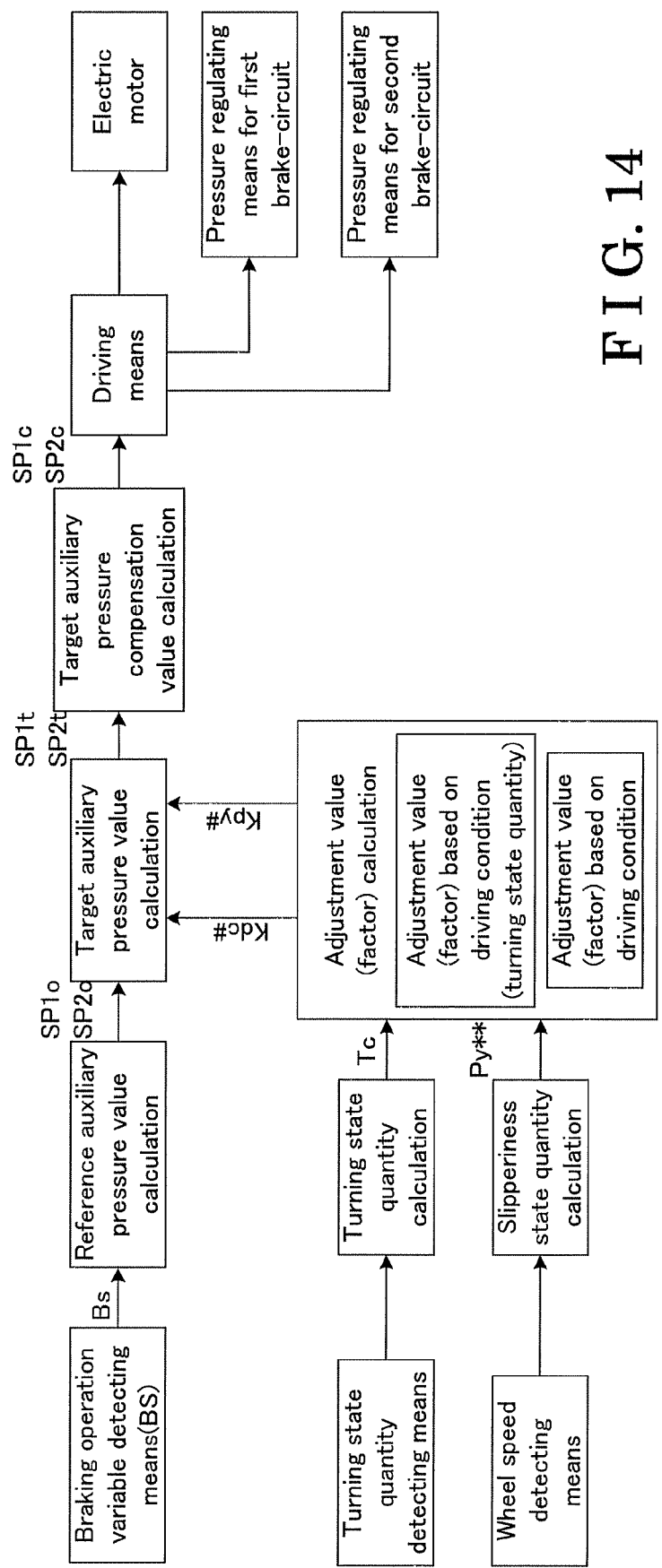
FIG. 14 is a functional block diagram illustrating a brake control executed by the brake control apparatus for the vehicle associated with the second embodiment.
Figure 15:
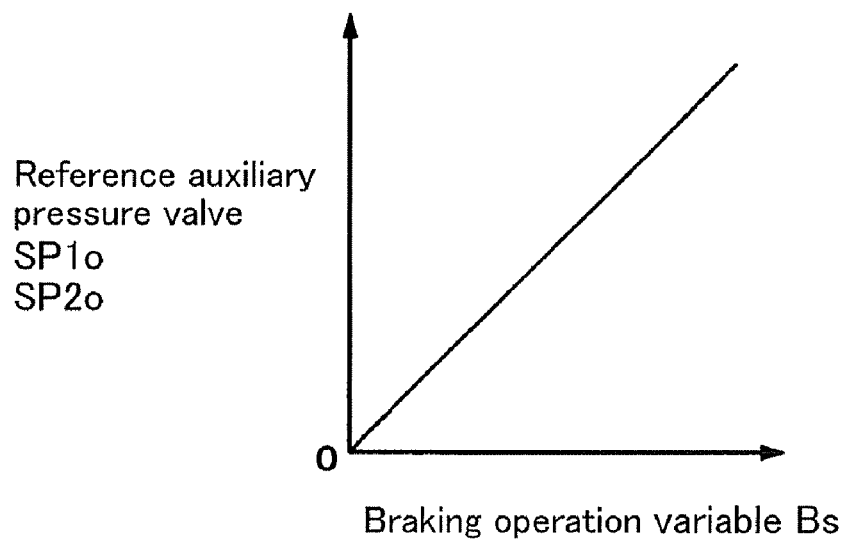
FIG. 15 is a graph showing a table specifying a relationship between the braking operation variable and the reference auxiliary pressure value.

A configuration of the brake control executed by the brake control apparatus associated with the second embodiment will be described below in accordance with FIG. 14.

<Calculation of Reference Auxiliary Pressure Value SP#o>

As mentioned above, when the brake control apparatus includes the front-rear split brake system, a different reference auxiliary pressure value SP#o is set for the front-wheel brake-circuit and the rear-wheel brake-circuit with respect to the braking operation variable Bs. On the other hand, when the diagonal split brake system is employed, reference auxiliary pressure values SP1o and SP2o are calculated by using the identical property to the first and the second brake-circuits. In this case, the reference auxiliary pressure value SP#o proportionally (linearly) increases from value zero (0) in response to the increase of the braking operation variable Bs from value zero (0).

Additionally, the reference auxiliary pressure value SP#o may be set to increase from the value zero (0) so as to downwardly curve (downwardly convex characteristic) in accordance with the increase of the braking operation variable Bs from the value zero (0). Alternatively, the reference auxiliary pressure value SP#o may be set so as to increase having a characteristic similar to the downwardly convex characteristic. A gradient of the increase of the reference auxiliary pressure value SP#o is formed with a plural straight lines whose slopes increase in accordance with the increase of the braking operation variable Bs from the value zero (0).

In setting of the auxiliary pressure, any desired braking operation variable may be set as the starting point for applying auxiliary pressure. However, it may be preferable that the infinitesimal braking operation variable including zero (0) (zero or infinitesimal value approximate to zero) is set as the starting point for applying the auxiliary pressure. Application of the auxiliary pressure changes an operating characteristic of the brake pedal BP. However, by setting the infinitesimal braking operation variable including zero (0) as the starting point for applying the auxiliary pressure, the driver may feel less discomfortable.

Additionally, when the master cylinder MC is provided with the vacuum booster VB which has jump-in characteristics, a braking operation variable at which jump-in occurs may be set as the starting point for applying the auxiliary pressure. The jump-in characteristics, which are also referred to as jumping characteristics, indicate a sudden rise (stepwise increase) of the assist force of the vacuum booster VB from the value zero (0). By adjusting the starting point for applying the auxiliary point to the braking operation variable at which the jump-in of the vacuum booster VB occurs, the driver feels less discomfortable.

<Calculation of Target Auxiliary Pressure Value SP#t>

In a case where the brake control apparatus includes the diagonal split brake system, pressure difference needs to be generated between the two brake-circuits when the vehicle turns. Hence, the turning state quantity Tc is calculated on the basis of the detection results of the turning state quantity detecting means TC. Further, the adjustment value (modification factor) Ktc# is calculated on the basis of the turning state quantity Tc.

Additionally, slipperiness of the wheels (wheel state quantity) changes in response to the load shift generated when the vehicle turns. Therefore, the adjustment value (modification factor) Kpy# may be calculated on the basis of the wheel state quantity Py which is calculated on the basis of the detection results of the wheel speed detecting means WS. In the second embodiment, adjustment of pressure based on the adjustment value (modification factor) is executed only when the vehicle turns.

<Calculation of Adjustment Value (Modification Factor)>

Firstly, a calculation of the adjustment value (modification factor) Kdc# based on the driving state quantity will be described below. The driving state quantity when the diagonal split brake system is employed is a property indicating a turning motion Tc (turning state quantity Tc). The adjustment value (modification factor) Kdc# is calculated on the basis of the turning state quantity Tc.

The load shift in the right-left direction (the vehicle width direction) occurs while the vehicle turns, which results in reducing the vertical load applied to the turning inner wheels. Additionally, the load shift in the front-rear direction of the vehicle (the longitudinal direction) occurs while the driver conducts the brake operation, which results in reducing the vertical load applied particularly to the turning inner rear-wheel. As a result, the vehicle may have difficulties in securely generating the cornering force at the rear-wheels. Without the adequate level of rear-wheel cornering force, the vehicle may be moved inward in the turning direction.

Figure 16:
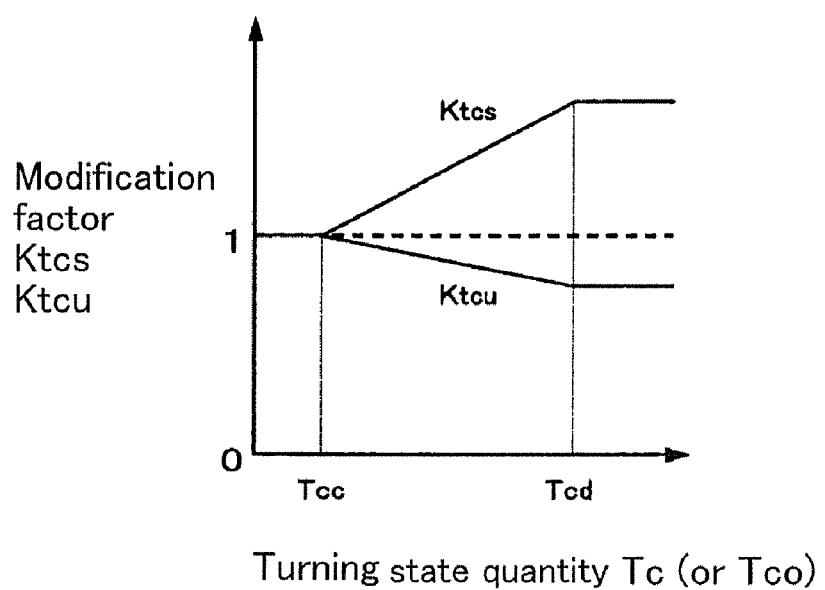
FIG. 16 is a graph showing a table specifying a relationship between the turning state quantity and the modification factor.

Therefore, in order to prevent the above-mentioned drawback, the modification factor Ktc# (=Kdc#) is set on the basis of the turning state quantity Tc of the vehicle, as shown in FIG. 16. Specifically, when the turning state quantity Tc is lower than a predetermined value Tcc, each of modification factors Ktcs and Ktcu is set to one (1). The modification factor Ktcs is a modification factor for the brake-circuit including the turning outer front-wheel. The modification factor Ktcu is a modification factor for the brake-circuit including the turning inner front-wheel. When the turning state quantity Tc is equal to or greater than the predetermined value Tcc, the modification factor Ktcs is increased from one (1) and the modification factor Ktcu is reduced from one (1) in response to the increase of the turning state quantity Tc.

A decreasing amount (decreasing rate) of the modification factor Ktcu may be determined to be lower than an increasing amount of the modification factor Ktcs. The vertical load applied to the front-wheel in the brake-circuit having the turning inner front-wheel is reduced by the load shift occurs when the vehicle turns, but the vertical load applied thereto is increased by the load shift occurs when the driver conducts the brake operation. On the other hand, the vertical load applied to the rear-wheel in the brake-circuit having the turning inner front-wheel is increased by the load shift occurs when the vehicle turns, but the vertical load applied thereto is decreased by the load shift occurs when the driver conducts the brake operation. Therefore, the decreasing amount of the auxiliary pressure need not to be increased in the brake-circuit having the turning inner front-wheel in order to maintain the braking load (i.e., rate of the braking force with respect to the vertical load) applied to each wheel to be equal therebetween and in order to maintain the cornering force to be equal therebetween.

On the other hand, vertical load is reduced the most at the rear wheel (i.e., turning inner rear-wheel) in the brake-circuit having the turning outer front-wheel. Hence, increase of the braking force generated at the turning inner rear-wheel is restricted on the basis of the wheel slip velocity S1 by a pressure increasing/decreasing means (see FIG. 12**) executing a so-called antilock brake system control (ABS control) or an electronic brake force distribution (i.e., EBD control). As a result, the braking force acting on the turning inner rear-wheel is reduced.

Then, the braking force generated at the turning inner front-wheel is increased by increasing the auxiliary pressure in the brake-circuit including the turning inner front wheel. As a result, a relationship between the braking operation variable and the vehicle deceleration becomes substantially constant. Further, because yawing moment acting outward in the turning direction is generated due to braking force differences between the front wheels, the vehicle is prevented from being moved inward in the turning direction.

Secondly, a calculation of the adjustment factor (modification factor) Kpy# based on the wheel state quantity will be described below. As a result of the load shift occurring when the vehicle turns, the wheel state quantity Py indicating slipperiness of each wheel changes. Hence, instead of the turning state quantity Tc, the modification factor Kpy# may be set by using the wheel state quantity Py of each wheel.

Further, the modification factor Kpy# may be set on the basis of a rear-wheel state quantity Pyr because the vehicle stability depends largely on the cornering force generated at the rear-wheels. The rear-wheel state quantity Pyr is the property of the rear-wheel which becomes slippery or the average value of wheel properties of the two rear-wheels. Additionally, the rear-wheel state quantity Pyr is calculated on the basis of the wheel state quantity Py** of each wheel.

Figure 17:
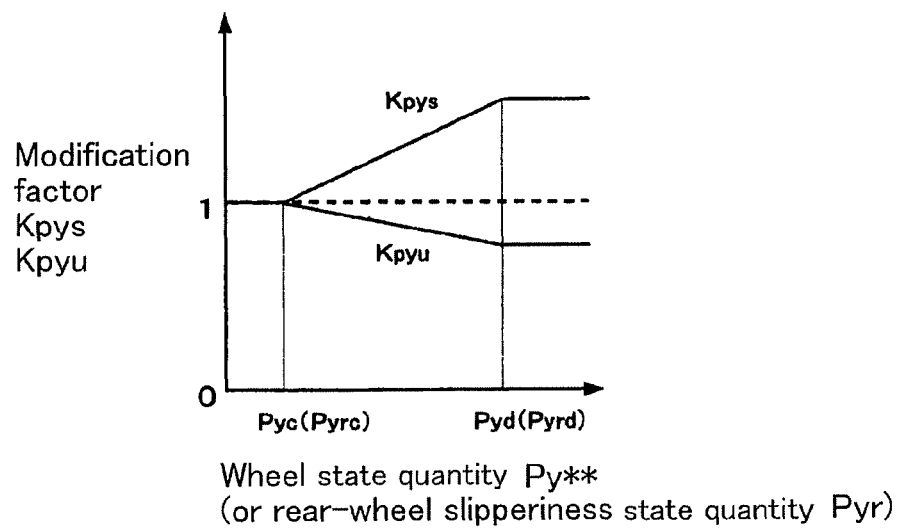
FIG. 17 is a graph showing a table specifying a relationship between the wheel state quantity and the modification factor.

The adjustment value (modification factor) Kpy# based on the wheel state quantity is set as illustrated in FIG. 17. Specifically, when the wheel state quantity Py or the rear-wheel state quantity Pyr is lower than a predetermined value Pyc or Pyrc, each of modification factors Kpys and Kpyu is set to one (1). The modification factor Kpys is a modification factor for the brake-circuit having the turning outer front-wheel. The modification factor Kpyu is a modification factor for the brake-circuit having the turning inner front-wheel. When the wheel state quantity Py or the rear-wheel state quantity Pyr is equal to or greater than the predetermined value Pyc or Pyrc, the modification factor Kpys is increased from one (1) and the modification factor Kpyu is reduced from one (1) in response to the increase of the wheel state quantity Py** or the rear-wheel state quantity Pyr. As a result of setting such adjustment value Kyp#, the identical effects and benefits as the adjustment based on the turning state quantity is enhanced.

<<Effects and Benefits>>

Figure 18:
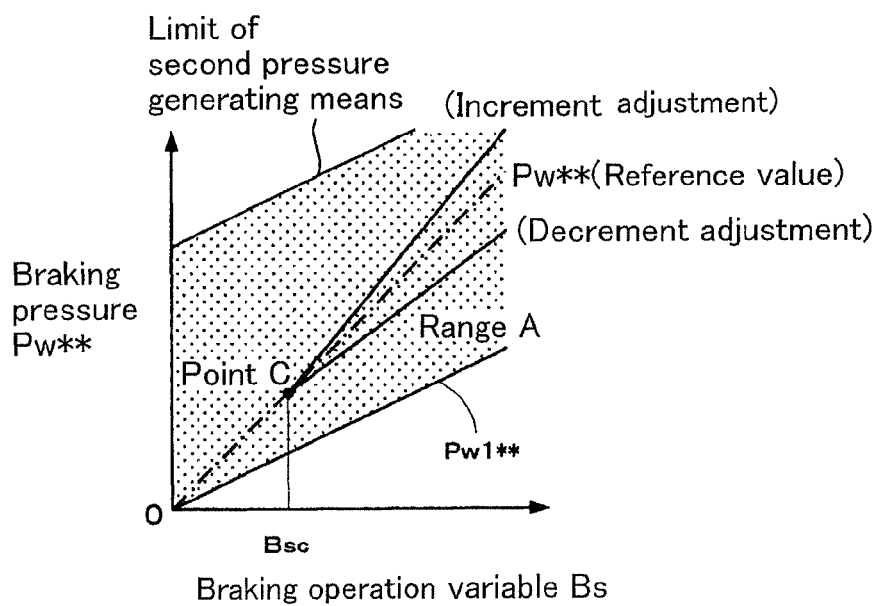
FIG. 18 is a diagram for explaining effects and benefits of the brake control apparatus for the vehicle associated with the embodiments.

Effects and benefits of the brake control apparatus associated with the first and the second embodiments will be described below. FIG. 18 illustrates a relationship of the wheel cylinder pressure Pw of each wheel with respect to the braking operation variable Bs. Specifically, the master cylinder MC (first pressure generating means) generates the braking pressure represented by a characteristic Pw1 in response to the braking operation conducted by the driver. An auxiliary pressure Pw2 is added to the braking pressure Pw1. The auxiliary pressure Pw2 is generated by the electric motor and the pump (second pressure generating means) and is regulated by the linear solenoid valve LV# (pressure regulating means). As a result, a pressure characteristic of the wheel cylinder is represented by a characteristic Pw which satisfies the following equation: Pw=Pw1+Pw2**.

The auxiliary pressure is adjusted on the basis of at least one of the vehicle state quantity, the driving state quantity and the wheel state quantity. The braking pressure is controlled within an area A in FIG. 18. The area A is an area surrounded by the pressure characteristic Pw1** and a critical pressure characteristic (limit of the second pressure generating means).

In FIG. 18, adjustment to the reference value of the auxiliary pressure is executed at a point C, in other words, the adjustment to the reference value of the auxiliary pressure is executed when the braking operation variable Bs reaches a value Bsc. The auxiliary pressure applied to one of the brake-circuits is increased, and at the same time, the auxiliary pressure applied to the other brake-circuit is decreased. By this adjustment, the directional stability of the vehicle is enhanced, and further, the relationship between the brake operation and the vehicle deceleration is maintained substantially constant.

The adjustment of the auxiliary pressure is preferably executed simultaneously at the both brake-circuits. However, the adjustment of the auxiliary pressure is not necessarily executed simultaneously at the both brake-circuits. For example, the adjustment of the auxiliary pressure may be executed at one of the brake-circuits, then the adjustment of the auxiliary pressure may be executed at the other brake-circuit when a difference between the increasing amount and decreasing amount from the reference value exceeds a predetermined pressure or a predetermined value of braking force difference converted from the braking pressure.

The auxiliary pressure is also generated during the normal brake operation. In this embodiment, the normal brake operation indicates a case where the vehicle specifications is the standard specifications, the vehicle speed is equal to or lower than a predetermined value, the vehicle travels in the straight manner, slipperiness generated at the wheels is slight, and grip allowance is sufficient. Hence, when the driver conducts brake operation other than the normal brake operation (i.e., a case where the vehicle specifications deviates from the standard specifications, the vehicle speed becomes higher than the predetermined value, the vehicle turns, the slipperiness of the wheels become large or the grip allowance is not sufficient), the area A within which the braking pressure is controlled may be enlarged compared to a device that uses higher braking pressure than braking pressure generated when the normal brake operation is conducted, without interrupting fluid communication to the wheel cylinders by ABS control valves which correspond to the pressure increasing/decreasing means in FIGS. 1 and 12.

The operating characteristic of the brake pedal BP in response to the driver's operation thereof (i.e., a relationship between the brake pedal stroke and the operational force) depends on rigidity of brake calipers, the brake pads, the brake-circuits and the like. In this embodiment, braking force regulation between the dual-brake circuits is executed within a regulation area of the auxiliary pressure. Hence, the fluid communication between the master cylinder and each of the wheel cylinders is not interrupted by the corresponding ABS control valve at the lowest possibility. As a result, the braking force control is executed without changing the operating characteristic of the brake pedal BP.

In setting of the auxiliary pressure, any desired braking operation variable may be set as the starting point for applying auxiliary pressure. However, it may be preferable that the infinitesimal braking operation variable including zero (0) (zero or infinitesimal value approximate to zero) is set as the starting point for applying the auxiliary pressure. This is to continuously and smoothly applying the auxiliary pressure to the braking pressure generated when the normal brake operation is conducted.

Further, when the vacuum booster VB having the jump-in characteristics is provided at the brake control apparatus, a point at which the jump-in of the vacuum booster VB occurs may be set as the starting point for applying the auxiliary pressure. This is to smoothly connect application of the assistance force of the vacuum booster VB and application of the auxiliary pressure.

Figure 19:
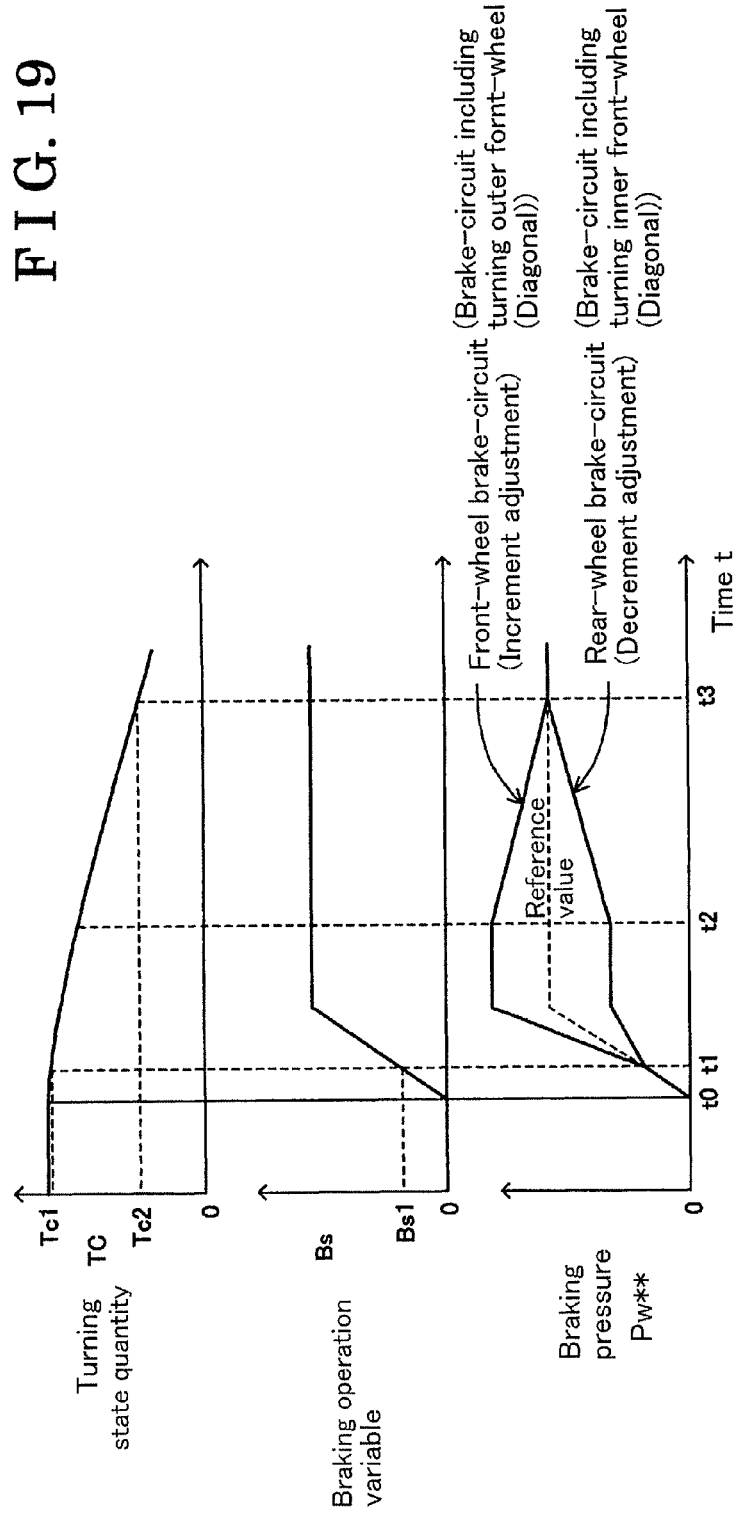
FIG. 19 is a time chart showing an example of a case where auxiliary pressures of two brake-circuits are adjusted on the basis of the turning state quantity.

FIG. 19 is a time chart showing an operational example where the auxiliary pressure in each brake-circuit is regulated on the basis of the turning state quantity Tc in a case where either the first or the second embodiment is employed. Regulation of the auxiliary pressure when the first embodiment is employed will be described below, however the same regulation of the auxiliary pressure is executed for the case where the second embodiment is employed.

When the vehicle turns with the turning state quantity Tc at Tc1, the brake operation is started at time t0. The value Tc1 is assumed to be greater than the value Tcb (see FIG. 10). When the braking operation variable Bs reaches the value Bs1 (infinitesimal value) at time t1, the regulation of the auxiliary pressure is started.

As a result, the auxiliary pressure applied to the front-wheel brake-circuit is adjusted so as to be increased (increment adjustment), and the auxiliary pressure applied to the rear-wheel brake-circuit is adjusted so as to be decreased. Gradual increase of adjustment amount over a short period from the auxiliary pressure adjustment starting time (time t1) is due to restriction on changing rate of the adjustment amount per time.

The adjustment of the auxiliary pressure is executed on the basis of the turning state quantity Tc. Therefore, the adjustment amount of the auxiliary pressure is decreased in accordance with decrease of the turning state quantity Tc following the decrease of the vehicle speed (time t2 to t3). Then, the turning state quantity Tc reaches the value Tcb at the time t2 and reaches a value Tc2 corresponding to Tca (see FIG. 10) at the time t3. When the turning state quantity Tc becomes equal to or lower than the value Tc2, the adjustment of the auxiliary pressure is ended.

The present invention is not limited on the above-mentioned embodiments, however, variations and changes may be made by others, and equivalents employed, without departing from the spirit of the present invention. For example, in the above-mentioned embodiments, the braking pressure generated by the master cylinder MC (the first pressure generating means) is characterized by being substantially proportional to the braking operation variable Bs. However, as illustrated in FIG. 20, when the characteristic Pw1** of the braking pressure is assumed to have a characteristic in which inclination (increasing gradient) of the braking pressure is increased in accordance with the increase of the braking operation variable Bs, the area B within which the control of the braking pressure by the auxiliary pressure may be enlarged.

Figure 20:
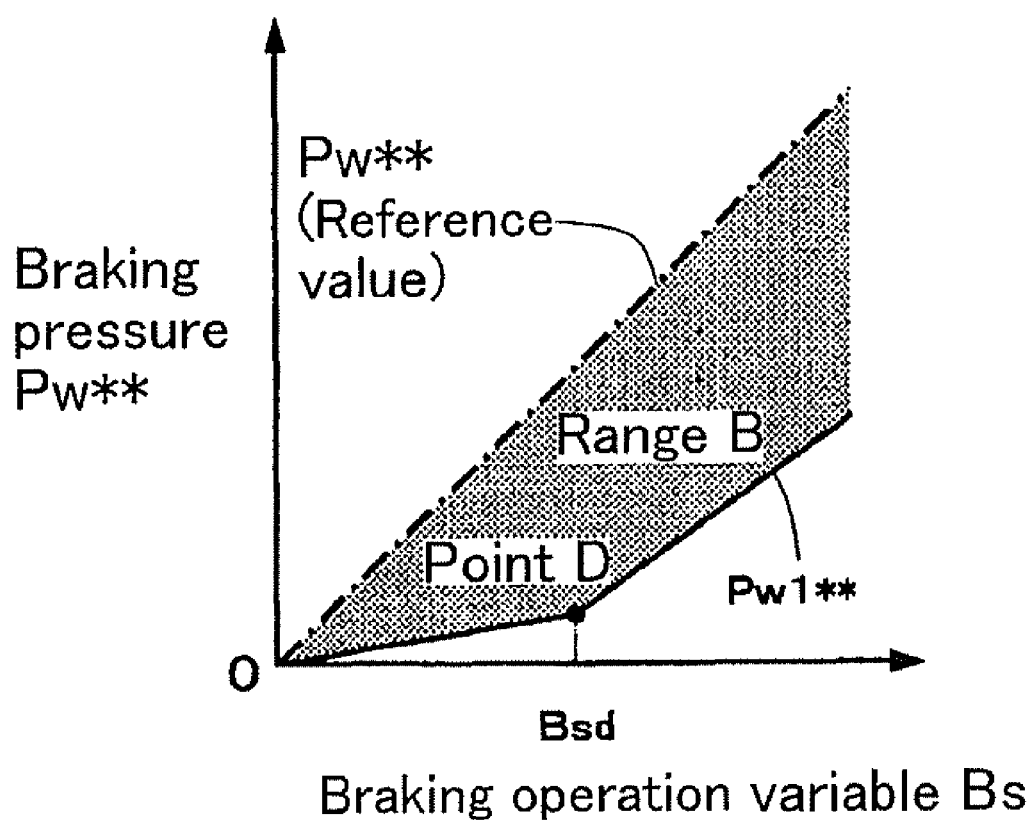
FIG. 20 is a diagram for explaining effects and benefits of the brake control apparatus for the vehicle associated with modified embodiments.

In FIG. 20, the braking pressure characteristic Pw1 has a characteristic represented by two straight lines whose gradient (i.e., increasing gradient of the brake fluid pressure Pw1 with respect to the braking operation variable Bs) is increased. Further, the braking pressure characteristic Pw1 has a characteristic in which the gradient is further increased at a point D, i.e. when the braking operation variable Bs reaches a value Bsd. The braking pressure characteristic Pw1 may be modified to have a characteristic represented by greater than three straight lines whose gradient is increased in accordance with the increase of the braking operation variable Bs, or by a curved line.

The braking pressure characteristic, in which the inclination of the braking pressure is increased in accordance with the increase of the braking operation variable Bs, is realizable on the basis of a mechanical structure of the master cylinder, as disclosed in JP2000203409A. Alternatively, the above-mentioned braking pressure characteristic is realizable on the basis of a link mechanism supporting the brake pedal as disclosed in JP2002347590A, or on the basis of a structure of the vacuum booster as disclosed in JP1998250565A.

The auxiliary pressure Pw2 is added to the braking pressure Pw1. The auxiliary pressure Pw2 is generated by the electric motor and the pump (second pressure generating means) and is regulated by the linear solenoid valve LV# (pressure regulating means). As a result, the pressure characteristic of the wheel cylinder is represented by the characteristic Pw which satisfies the following equation: Pw=Pw1+Pw2. As the inclination of the braking pressure characteristic Pw1 is increased in response to the increase of the braking operation variable Bs, the control area of the auxiliary pressure Pw2** is increased as illustrated by the area B. Specifically, this is effective in a case where the auxiliary pressure is adjusted so as to be lower than a reference value.

Even when the auxiliary pressure is not sufficiently gained due to problems of electric source and the like, the braking pressure necessary for deceleration is securely generated by the driver depressing the brake pedal BP because the master cylinder pressure Pw1 has the characteristic where the gradient of the braking pressure Pw1 is steeply increased at the point D, as shown in FIG. 20.

In the above-mentioned embodiments, the adjustment value of the auxiliary pressure is used as the modification factor, and then, the auxiliary pressure is adjusted on the basis of a value gained by multiplying the adjustment value of the auxiliary pressure by the reference value. However, instead of the modification factor, the adjustment value (adjustment pressure) is calculated in a pressure-dimension, and then, the auxiliary pressure may be regulated by increasing or decreasing the adjustment value with respect to the reference value.

Third Embodiment

Entire Configuration of Device

Figure 21:
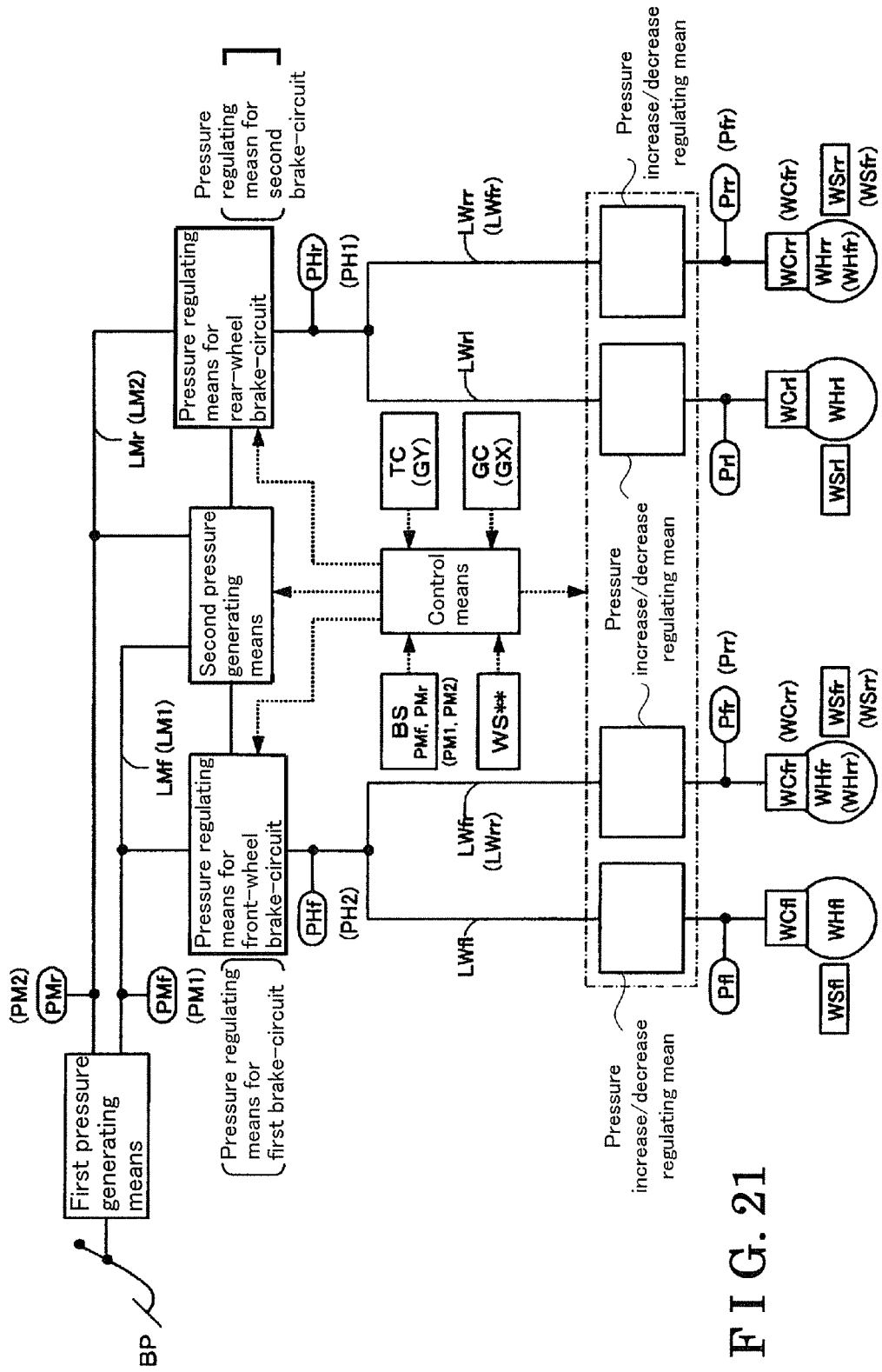
FIG. 21 is a diagram illustrating an entire configuration of the brake control apparatus associated with a third embodiment.
Figure 22:
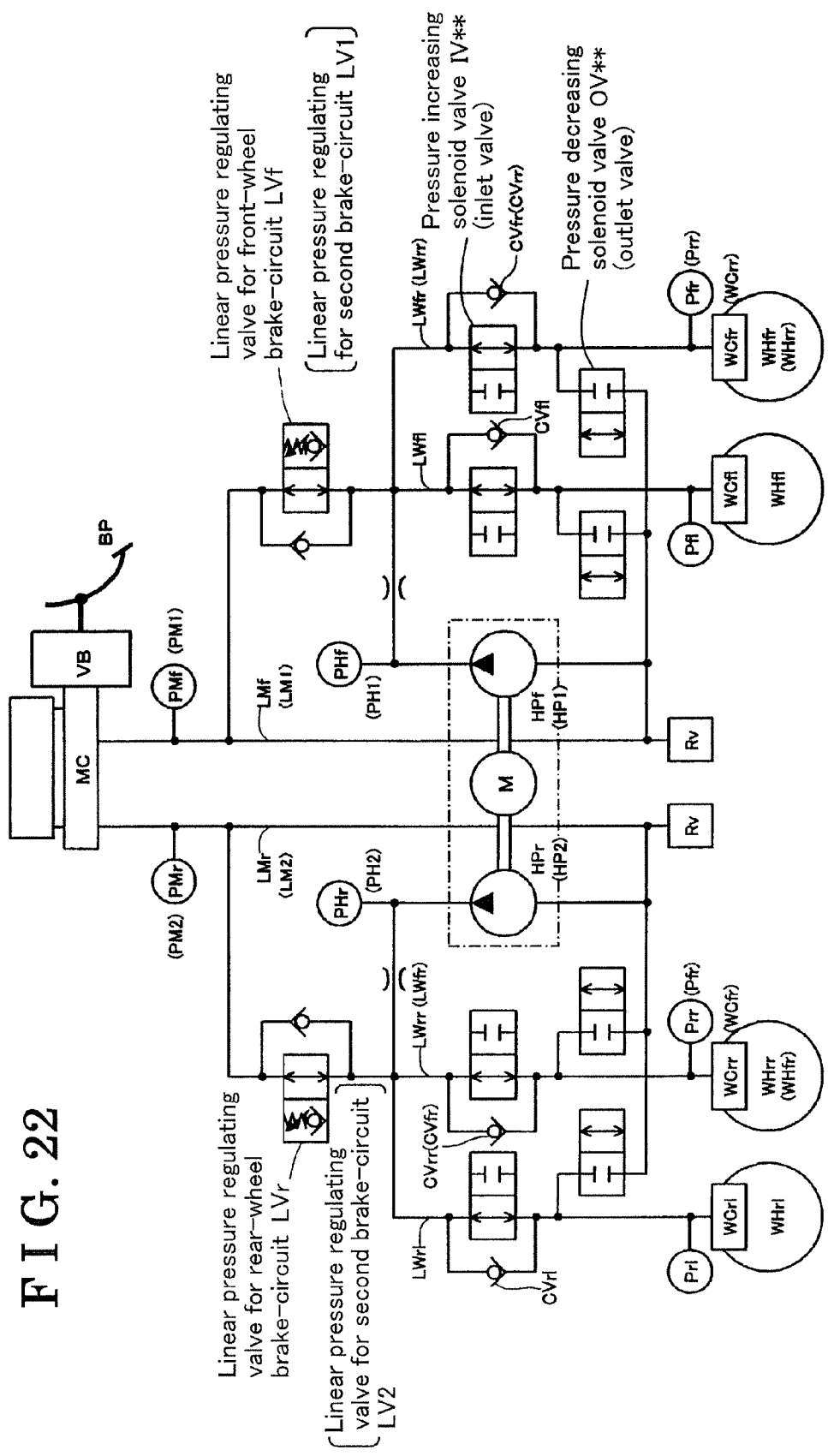
FIG. 22 is a diagram illustrating details of brake fluid circuits in the entire configuration of the brake control apparatus illustrated in FIG. 21.

An entire configuration of the brake control apparatus associated with a third embodiment will be described below in accordance with FIGS. 21 and 22. In FIGS. 21 and 22, a case where the front-rear split brake system is employed is mainly described. Additionally, a case where the diagonal split brake system, which is referred to also as an X-type dual-brake circuit, is described within round brackets. The same definitions apply to other embodiments. The configuration of the brake control apparatus having the front-rear split brake system is illustrated in FIGS. 1 and 2. The configuration of the brake control apparatus having the diagonal split brake system is illustrated in FIGS. 12 and 13.

The first pressure generating means, which corresponds to the first hydraulic pressure generating apparatus, is the master cylinder MC. The master cylinder MC includes the two hydraulic pressure generating chambers (not shown). The master cylinder MC generates the braking pressure (hydraulic pressure) in response to the driver's operation of the brake pedal BP (i.e., brake operation). In other words, the master cylinder generates the braking pressure by using force (power) generated by the driver as the power source. Further, in order to reduce the brake pedal operating force, the master cylinder may be provided with the vacuum booster VB, which is also referred to as the negative pressure booster or the brake booster.

The second pressure generating means, which corresponds to the second hydraulic pressure generating apparatus, is the hydraulic pump HP# (hereinafter referred to simply as the pump HP#) driven by the electric motor M. The pump HP# generates the braking pressure by a power source (e.g., the electric power source) other than the power generated by the driver. The pump HP# sucks some of the fluid discharged from the master cylinder MC and discharges the sucked fluid to each of the wheel cylinder WC**.

The symbol # indicates each brake-circuit in the dual brake circuit (hydraulic circuit). When the front-rear split bake system is employed, alphabet "f" indicates the front-wheel brake-circuit and alphabet "r" indicates the rear-wheel brake-circuit. On the other hand, when the diagonal split brake system is employed, number 1 indicates the first brake-circuit, and number 2 indicates the second brake-circuit. The same definitions are applied to other embodiments regarding the symbol #. Additionally, the symbols  indicate each wheel, specifically, "fl" indicates the front-left wheel, "fr" indicates the front-right wheel, "rl" indicates the rear-left wheel and the "rr" indicates the rear-right wheel. The same definitions are applied to other embodiments regarding the symbols .

The pump HP# sucks the fluid from the conduit portion LM# and discharges the sucked fluid to the conduit portion LW**. Therefore, movement of the fluid is generated, which generates the auxiliary braking pressure in addition to the braking pressure generated by the master cylinder MC.

The detecting means BS (a braking operation variable detecting means) detects the braking operation variable Bs corresponding to the operation of the brake-operation member (e.g., the brake pedal BP) conducted by the driver. Specifically, the detecting means BS detects the braking pressures (i.e., master cylinder pressure Pm#) in the two brake-circuits (front-wheel hydraulic circuit and rear-wheel hydraulic circuit) connected to the master cylinder MC or to the respective two hydraulic pressure generating chambers of the master cylinder MC. Hence, the master cylinder pressure Pm# may be used as the braking operation variable Bs. Further, the detecting means BS may be configured to detect at least one of the displacement amount (stroke) of the brake pedal BP, operating force applied to the brake pedal BP in order to use the detected value (the brake pedal stroke, the brake pedal operating force and the like) as the braking operation variable Bs.

The pressure regulating means is, for example, the linear pressure regulating valve LV# which is also referred to as a linear solenoid valve or a linear control valve. The pressure regulating means regulates pressure generated by the second pressure generating means (i.e., the electric motor M and the pump HP#) based on an after-mentioned target auxiliary pressure value SP#t. Then, the braking pressure generated by the second pressure generating means (the electric motor M and the pump) is added to the braking pressure generated by the first pressure generating means (the master cylinder MC), and the total braking pressure (the braking pressure generated by the first pressure generating means and the braking pressure generated by the second pressure generating means) is applied to the wheel cylinder WC**. The rotational speed of the electric motor M is controlled so as to generate the necessary and appropriate pressure for the brake operation. Then, the linear solenoid valve LV# completes the regulation of the pressure.

A pressure increase regulating control means for regulating increase of the braking pressure, regulates increase of the gradient of braking pressure Pw towards the braking pressure Ph# in a case where the braking pressure Ph# within the conduit portion LW to which the pump PH discharges the fluid is higher than the braking pressure Pw# within the corresponding wheel cylinder. For example, an inlet valve IV**, which is referred to also as a pressure increasing solenoid valve, for the ABS control may be used as the pressure increase regulating control means.

Further, the pressure decrease regulating means for regulating the decrease of the braking pressure, regulates decrease of the inclination of the braking pressure Pw within the corresponding wheel cylinder. For example, an outlet valve OV, which is referred to also as a pressure decreasing solenoid valve, for the ABS may be utilized as the pressure decrease regulating means.

<<Configuration of Brake Control>>

Figure 23:
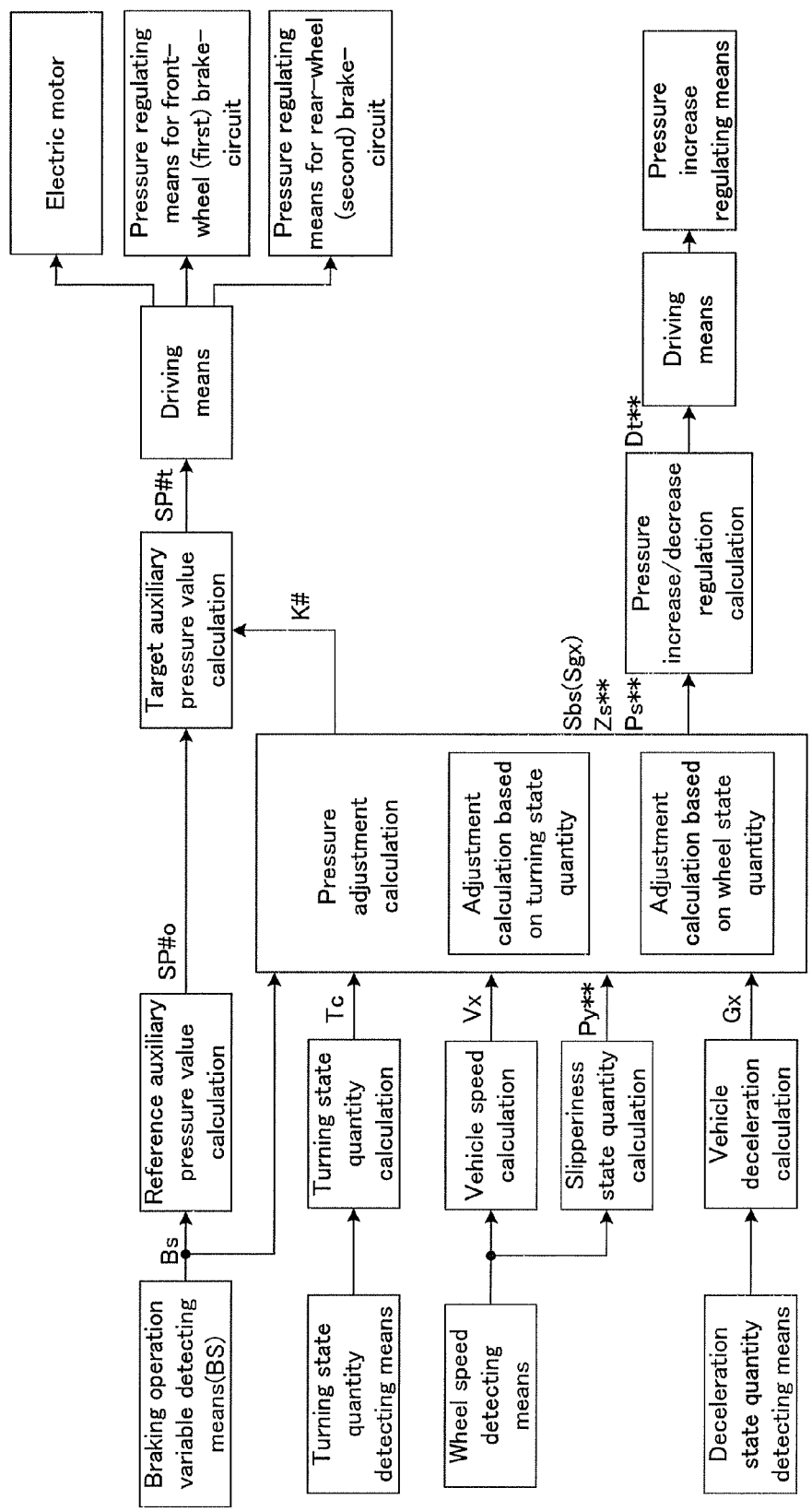
FIG. 23 is a functional block diagram illustrating the brake control executed by the brake control apparatus for the vehicle associated with the third embodiment.

A configuration of the brake control executed by the brake control apparatus associated with the third embodiment will be described below in accordance with FIG. 23.

<Calculation of Reference Auxiliary Pressure Value SP#o>

A reference value SP#o of the pressure supplementing (assisting) the braking pressure generated by the first pressure generating means (the master cylinder MC) (i.e., the reference value SP#o of the pressure added to the braking pressure) is calculated on the basis of the braking operation variable Bs of the brake pedal operated by the driver. The operational variable applied to the brake member is hereinafter referred to as the braking operation variable Bs. The braking operation variable Bs is calculated on the basis of detection results of the detecting means BS for detecting the braking operation variable. More specifically, the braking operation variable Bs is calculated on the basis of the detection results of at least one of the brake pedal stroke sensor, the brake pedal depression sensor and the master cylinder pressure sensor PM#. A level of the braking pressure generated by the master cylinder MC is the same as a level of the pressure within the conduit portions LM#.

The purpose of the brake operation conducted by the driver is to decelerate the vehicle (vehicle body). The brake control apparatus pressure the brake pads to the corresponding brake rotors by the braking pressure. Then, the brake control apparatus generates the braking pressure to each wheel by frictional force that is generated by pressing each brake pad to the corresponding brake rotor. Hence, the pressure (pressure of the fluid within the wheel cylinders) is targeted for the brake control. Therefore, it may be preferable to use the master cylinder pressure Pm# as the braking operation variable Bs, because the master cylinder pressure PM# has the same physical quantity as the pressure of the wheel cylinders. Additionally, the vehicle deceleration is calculated on the basis of the detection result of a deceleration property detecting means GC.

Determination of the reference value of the auxiliary pressure, which corresponds to the reference amount of auxiliary hydraulic pressure and is referred to simply as the reference value SP#o, varies depending on types of the brake system. Hence, determination of the reference value SP#o when the front-rear split brake system is employed will be explained first.

A distribution of the braking force between the front and rear wheels (front-rear braking force distribution) is calculated on the basis of the braking operation variable Bs in reference to the specifications which serve as the standard of the vehicle. The standard specifications of the vehicle are represented by the values of vehicle weight Ms, the center of gravity point, the wheelbase L and the like. The aforementioned values change depending on conditions of passenger carriage, loading and the like. However, in the embodiments, the values are set in assuming a specific condition, such as a set number of passengers and a set mass of loading.

The reference auxiliary pressure value SP#o (i.e., SPfo and SPro) is calculated on the basis of the ideal braking force distribution or on the basis of characteristics of braking force distribution similar to the ideal braking force distribution. The ideal braking force distribution is achieved when the braking force applied to the front and rear wheels is distributed so as to be proportional to load applied to each of the front and rear wheels by taking into account the load shift occurring during the brake operation.

FIG. 24 is a table (map) specifying the relationship between the braking operation variable Bs and front-wheel and rear-wheel reference auxiliary pressure values SPfo and SPro. As shown in FIG. 24, the reference auxiliary pressure value SP#o proportionally (linearly) increases from value zero (0) in response to the increase of the braking operation variable Bs from value zero (0). The front-wheel reference auxiliary pressure value SPfo may be set to be the same level as the rear-wheel reference auxiliary pressure value SPro, or the front-wheel reference auxiliary pressure value SPfo may be set to differ from the rear-wheel reference auxiliary pressure value SPro.

As shown in FIG. 25, the front-wheel reference auxiliary pressure value SPfo may be set to increase from the value zero (0) so as to downwardly curve (the downwardly convex characteristic) in accordance with the increase of the braking operation variable Bs from the value zero (0) (see a full line in FIG. 25). Alternatively, the front-wheel reference auxiliary pressure value SPfo may be set so as to increase from the value zero (0) along a dashed line having a characteristic approximate to the downwardly convex characteristic. As shown in FIG. 25, the dashed line is formed with plural straight lines whose slopes increase in accordance with the increase of the braking operation variable Bs from the value zero (0).

As shown in FIG. 25, the rear-wheel reference auxiliary pressure value SPro may be set to increase from the value zero (0) so as to upwardly convex curve (the upwardly convex characteristic) in accordance with the increase of the braking operation variable Bs from the value zero (0) (see a full line in FIG. 25). Alternatively, the rear-wheel reference auxiliary pressure value SPro may be set to increase from the value zero (0) along a dashed line having a characteristic approximate to the upwardly convex characteristic. As shown in FIG. 25, the dashed line is formed with plural straight lines whose slopes decrease in accordance with the increase of the braking operation variable Bs from the value 0. By combining the front-wheel and the rear-wheel reference auxiliary pressure values SPfo and SPro, the braking force distribution between the front wheels and the rear wheels becomes close to the ideal braking force distribution.

The auxiliary pressure may be set on the basis of estimation of the vertical load applied to each wheel. In this case, the target vehicle deceleration (target vehicle deceleration rate) is determined on the basis of the braking operation variable Bs. Then, the total braking force for achieving the target vehicle deceleration is calculated. The total braking force is distributed to each wheel based on the vertical load applied thereto. The vertical load applied to each wheel is estimated on the basis of the detection results of the longitudinal acceleration sensor GX, or on the basis of the vehicle body deceleration Gx gained by differentiating vehicle body speed Vx, and the standard specifications of the vehicle. Even in this case, the reference auxiliary pressure value SP#o is calculated on the basis of the braking operation variable Bs.

Figure 26:
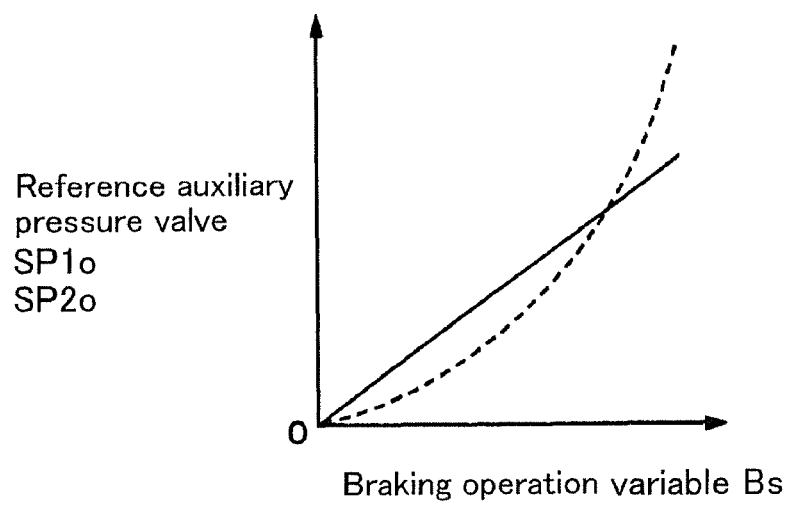
FIG. 26 is a graph illustrating a relationship between the braking operation variable and the reference auxiliary pressure value in a case where a diagonal split brake system is employed.

On the other hand, when the diagonal split brake system is employed, the reference auxiliary pressure values SP1$o$ and SP2$o$ are calculated to have identical characteristic each other at the first and the second brake-circuits, as shown in FIG. 26. In this case, the reference auxiliary pressure value SP#o may be set to increase from the value zero (0) so as to proportionally (linearly) increase from zero (0) in accordance with the increase of the braking operation variable Bs from the value zero (0) (see a full line in FIG. 26). Alternatively, the reference auxiliary pressure value SP#o may be set to increase from the value zero (0) along a dashed line having the downwardly convex characteristic in response to the increase of the braking operation variable Bs from zero (0).

In setting of the auxiliary pressure, any desired braking operation variable may be set as the starting point for applying auxiliary pressure. However, it may be preferable that the infinitesimal braking operation variable including zero (0) (zero or infinitesimal value approximate to zero) is set as the starting point for applying the auxiliary pressure. The application of the auxiliary pressure changes the operating characteristic of the brake pedal BP. However, by setting the infinitesimal braking operation variable including zero (0) as the starting point for applying the auxiliary pressure, the driver may feel less discomfortable.

Additionally, when the master cylinder MC is provided with the vacuum booster VB as a booster (assist apparatus), the starting point (timing) for applying the auxiliary pressure may preferably be coincided with a point (timing) where the jump-in of the vacuum booster occurs. The jump-in characteristics, which is also referred to as jumping characteristics, indicates a sudden rise of the assist force of the vacuum booster VB from the value zero (0). In a case where two different operating principles (i.e., a boost effect (assist effect) by negative pressure and a boost effect (assist effect) by the auxiliary pressure) are combined, by adjusting the braking operation variable (starting point) of when the boost effect (assist effect) of the vacuum booster generated and starts acting so as to correspond to the braking operation variable (starting point) of when the boost effect (assist effect) of the auxiliary pressure generated and starts acting, the driver may feel lees discomfortable when the driver conducts the brake operation. The means for determining the reference auxiliary pressure value SP#o corresponds to the reference pressure determining means.

<Pressure Adjustment Calculation>

A pressure adjustment calculation will be described below. The load shift in the right-left direction (vehicle width direction) occurs while the vehicle turns, which results in reducing the vertical load applied to the turning inner wheels. Additionally, the load shift in the front-rear direction (longitudinal direction) of the vehicle occurs while the driver conducts the brake operation, which results in reducing the vertical load applied to the rear-wheels. As a result, the vertical load applied to the turning inner rear-wheel is particularly reduced when the driver conducts the brake operation while the vehicle turns. Hence, the vehicle may have difficulties in securely generating the cornering force at the rear-wheels.

Thus, the turning inner wheel (the turning inner wheels) to which the vertical load is less applied is selected and the increase of the braking pressure thereto is restricted. More specifically, the wheel cylinder pressure of the selected wheel (selected wheels) is controlled to be lower than the braking pressure within the brake-circuit including the selected wheel (selected wheels). This control corresponds to a pressure increase regulating control. On the other hand, when the increase of the braking pressure is restricted, the total braking force acting on the vehicle body is reduced. Hence, the auxiliary pressure applied to the brake-conduit LW** each of which includes a wheel other than the selected wheel so as to be greater than the reference value SP#o in order to increase the braking force applied to wheels other than the selected wheel. In the pressure increase regulating control, a single wheel or plural wheels is/are selected. However, in this embodiment, a case where a single wheel is selected will be described below as an example, unless otherwise mentioned.

Figure 27:
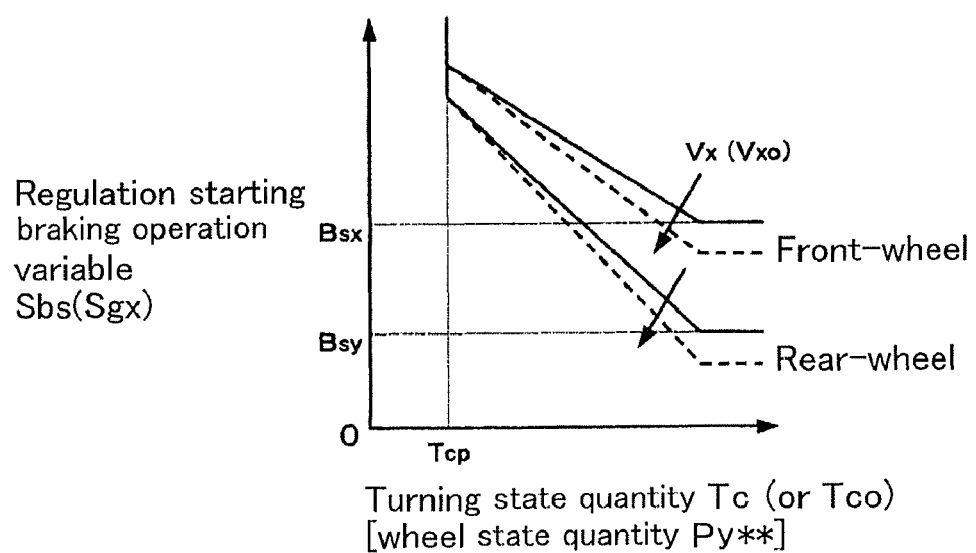
FIG. 27 is a graph showing a table specifying a relationship between the turning state quantity and regulation starting braking operation variable.

With using the turning state quantity Tc, a braking operation variable Sbs at which the pressure increase regulating control is started is determined on the basis of the characteristic shown in FIG. 27. The turning state quantity Tc is calculated on the basis of the detection results of the turning state quantity detecting means TC (e.g., the lateral acceleration sensor GY). More specifically, the turning state quantity Tc is a property indicating the turning motion of the vehicle. The turning state quantity Tc is calculated on the basis of at least one of a steering wheel operational angle, a steering angle of steering wheel (i.e., front wheels), the lateral acceleration and the yaw rate. A means for obtaining the turning state quantity representing the turning motion of the vehicle corresponds to a state quantity obtaining means (e.g., the turning state quantity detecting means TC).

When the turning state quantity Tc is equal to or lower than a predetermined value Tcp, the pressure increase regulating control to the turning inner wheel is not executed. Then, when the turning state quantity Tc exceeds the predetermined value Tcp, the braking operation variable Sbs (regulation starting braking operation variable) at which the pressure increase regulating control is executed to the selected wheel (the turning inner wheel) is set depending on the turning state quantity Tc. More specifically, the larger the turning state quantity Tc becomes, the lower the regulation starting braking operation variable Sbs is set to be.

The regulation starting braking operation variable Sbs may be set differently depending on whether the selected wheel is front-wheel or rear-wheel. When the selected wheel is the rear-wheel, because ensuring of the cornering force becomes more essential, the regulation starting braking operation variable Sbs is set to be lower than a case where the selected wheel is the front-wheel.

When the vehicle body speed is high, because ensuring of the directional stability of the vehicle becomes essential, the regulation starting braking operation variable Sbs is set in accordance with the vehicle speed Vx. More specifically, the higher the vehicle speed becomes, the lower the regulation starting braking operation variable Sbs is set to be. The vehicle body speed is calculated on the basis of the detected value of the wheel speed sensor WS**.

The vehicle deceleration is variable in accordance with the braking operation variable Bs. Hence, vehicle deceleration Sgx (regulation starting deceleration Sgx), at which the pressure increase regulating control is executed, may be calculated on the basis of the vehicle deceleration Gx instead of the braking operation variable Bs. Additionally, the vehicle deceleration Gx may be calculated by using the detected value of the longitudinal acceleration sensor GX or the wheel speed sensor WS**.

Figure 28:
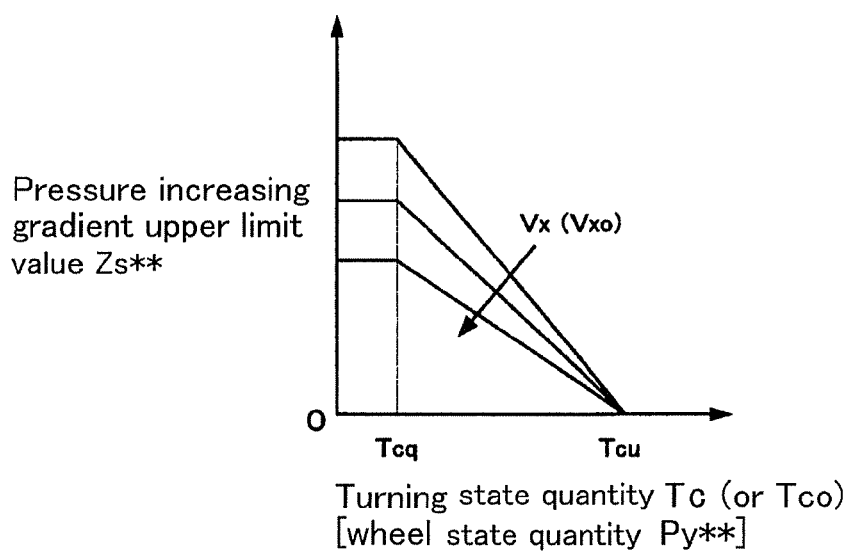
FIG. 28 is a graph showing a table specifying a relationship between the turning state quantity and a pressure increasing gradient upper limit value.

With using the turning state quantity Tc, an upper limit value Zs of pressure increasing gradient (increasing gradient) of the braking pressure Pw is determined on the basis of the characteristic described in FIG. 28. As a result, the larger the turning state quantity Tc becomes, the lower the upper limit value Zs** of the pressure increasing gradient (increasing gradient) is set to be.

When the vehicle speed is high, because ensuring of the directional stability of the vehicle becomes essential, the pressure increasing gradient upper limit value Zs is set in accordance with the vehicle body speed Vx. More specifically, the higher the vehicle speed becomes, the lower the pressure increasing gradient upper limit value Zs is set to be. Further, when the selected wheel is the rear-wheel, because ensuring of the cornering force becomes more essential, the pressure increasing gradient upper limit value Zs** is set to be lower than a case where the selected wheel is the front-wheel.

The pressure increase gradient is regulated on the basis of the pressure increasing gradient upper limit value Zs by controlling time the pressure increase regulating means (e.g., inlet valves IV) being opened/closed (i.e., so-called a pulse pressure-increase control). When ON/OFF solenoid valves are employed as the pressure increase regulating means, pressure fluctuation is accompanied by opening/closing of the solenoid valves. Hence, while the pressure increase regulating control is executed, the solenoid valves (inlet valves) may preferably be maintained to be in a closed position by setting the pressure increasing gradient upper limit value Zs** to zero (0) (i.e., maintenance of the braking pressure) in order to prevent kick-back to the brake pedal BP from occurring.

Figure 29:
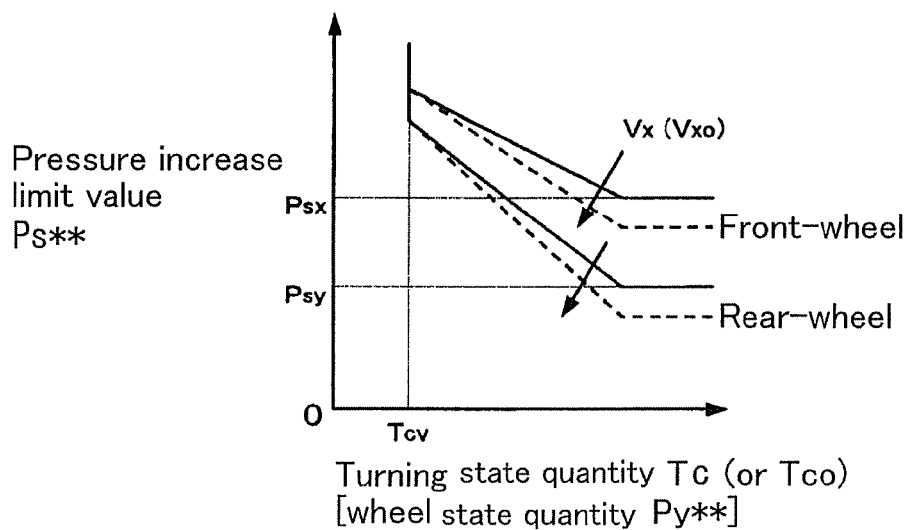
FIG. 29 is a graph showing a table specifying a relationship between the turning state quantity and pressure increase limit pressure.

As shown in FIG. 29, a limit pressure Ps of the braking pressure Pw applied to the selected wheel (turning inner wheel) is set on the basis of the turning state quantity Tc. In this case, the pressure increase regulating control (i.e., regulation of the pressure increasing gradient or maintenance of the pressure) is started when the braking pressure Pw of the selected wheel reaches the limit pressure Ps.

The detection result of the pressure sensor P (braking pressure obtaining means) provided at each wheel (i.e., actual wheel cylinder braking pressure Pwa) may be used as the braking pressure Pw. Further, the braking pressure Pw may be gained by using the detection result of the pressure sensors PH# provided at the each brake-circuit to which the pump discharges the fluid (i.e., actual pressure Ph# of the corresponding brake-circuit). The pressure sensor P and the pressure sensor PH# are omittable. When the pressure sensor P and the pressure sensor PH# are not provided at the brake control apparatus, the braking pressure Pw** is estimated on the basis of wheel speed behavior (wheel speed transition), operating state of the solenoid valves and the like.

A means for detecting or estimating the braking pressure applied to each of the wheel cylinders corresponds to a braking pressure obtaining means.

The regulation starting braking operation variable Sbs or the regulation starting deceleration Sgx shown in FIG. 27 is a threshold value (criterion value) corresponding to a starting point of the pressure increase regulating control. The pressure increase limit pressure Ps shown in FIG. 29 is also a threshold value corresponding to the starting point of the pressure increase regulating control. More specifically, the pressure increase regulating control is executed when the braking operation variable Bs, the vehicle speed Gx or the braking pressure Pw corresponds to a value existed within an area above characteristic lines (full lines or dashed lines) illustrated in FIGS. 27 and 29. On the other hand, the pressure increasing gradient upper limit value Zs** in FIG. 28 is a value for regulating the increasing amount (pressure increasing gradient) after the pressure increase regulating control is started.

Figure 30:
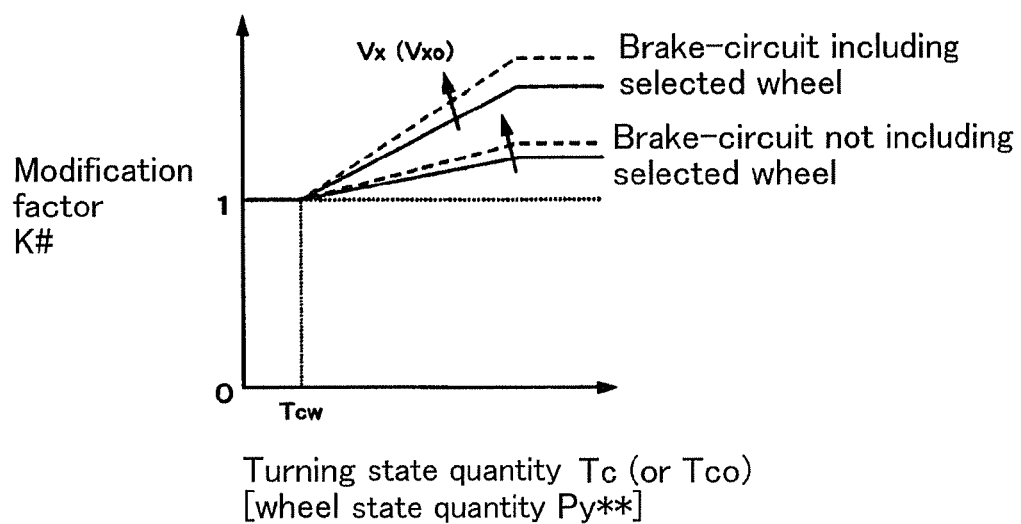
FIG. 30 is a graph showing a table specifying a relationship between the turning state quantity and the modification factor.
Figure 31:
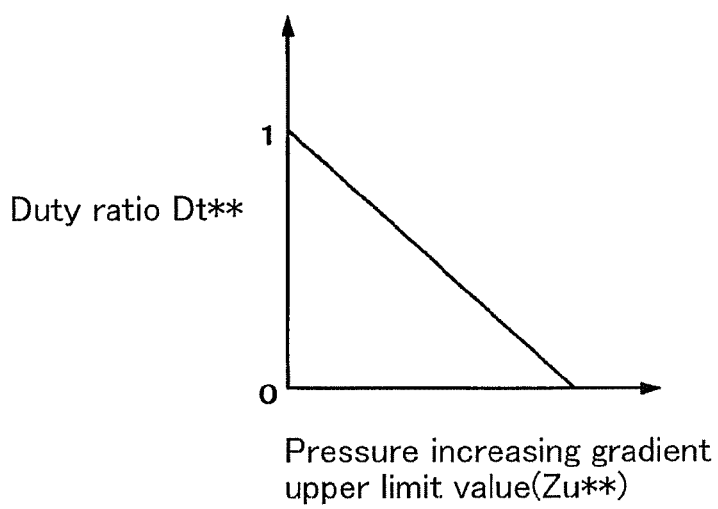
FIG. 31 is a graph showing a table specifying a relationship between the pressure increasing gradient upper limit value and duty ratio by which level of driving current supplied to the inlet valve is determined.

Increment adjustment (i.e., auxiliary pressure increasing control) from the reference value SP#o of the auxiliary pressure in the brake-circuit including the wheels other than the selected wheel is explained below in accordance with FIG. 30.

The auxiliary pressure of the brake-circuit including the selected wheel is increased with respect to the reference value SP#o. When the turning state quantity Tc is equal to or lower than a predetermined value Tcw, a modification factor K# is set to one (1). In other words, the auxiliary pressure increasing control is not executed when the turning state quantity Tc is equal to or lower than the predetermined value Tcw. On the other hand, when the turning state quantity Tc exceeds the predetermined value Tcw, the modification factor K# is set to be greater than one (1) on the basis of the turning state quantity Tc in order to increase the auxiliary pressure from the reference value SP#o. More specifically, the greater the turning state quantity Tc becomes, the lager value (>1) the modification factor K# is set to be. Alternatively, the modification factor K# may be set to be modified stepwisely to a predetermined value that is greater than one (1) when the turning state quantity Tc reaches a value at which the pressure increase regulating control is started.

For example, when the selected wheel is the turning inner front-wheel in the case where the front-rear brake system is employed, the auxiliary pressure applied to the front-wheel brake-circuit is increased. On the other hand, for example, when the selected wheel is the turning inner rear-wheel in the case where the diagonal split brake system is employed, the auxiliary pressure applied to the brake-circuit including the turning outer front-wheel is increased. That is to say, the auxiliary pressure applied to the brake-circuit including the selected wheel is increased with respect to the reference value SP#o. As a result, the relationship between the brake operation and the vehicle deceleration is maintained to be constant, and yaw moment for stabilizing the vehicle by braking pressure differences between the right and left wheels is generated. On the other hand, the auxiliary pressure applied to the brake-circuit not including the selected wheel may be increased with respect to the reference value SP#o.

An increasing amount of the auxiliary pressure applied to the brake-circuit including the selected wheel may be set to be greater than an increasing amount of the auxiliary pressure applied to the brake-circuit not having the selected wheel. Additionally, the modification factor K# may be set on the basis of the vehicle body speed Vx. More specifically, the higher the vehicle speed Vx becomes, the more the directional stability of the vehicle becomes essential. Hence, the higher the vehicle speed Vx becomes, the larger value (>1) the modification factor K# is set to be.

Either the pressure increasing regulation of the braking pressure (pressure increase regulating control) and the increase of the auxiliary pressure (auxiliary pressure increasing control) may be started in advance of the other, however, it is preferable that pressure increase regulating control and the auxiliary pressure increasing control are started simultaneously.

The turning state quantity Tc is a property that changes momentarily in accordance with the brake operational state. The modification factor K# may be set by using the turning state quantity Tco at the brake operation starting point, instead of the turning state quantity Tc. Additionally, the vehicle body speed Vx is the property that changes momentarily by brake operational state. However, the modification factor K# may be set by using the vehicle body speed Vxo at which the braking is started, instead of the vehicle speed Vx.

Changes of the vertical load applied to each wheel due to turning operation of the vehicle and the vehicle deceleration are expressed as slipperiness of wheel. Thus, the pressure increase regulating control is executable on the basis of a value indicating the slipperiness of the turning inner wheel (wheel state quantity), instead of the turning state quantity Tc. For example, wheel slip velocity Sl gained from differences between the vehicle speed and the wheel speed or the wheel slip ratio Sr gained by subtracting vehicle speed from the wheel slip velocity may be used as the value indicating the slipperiness of wheel (hereinafter referred to also as the wheel state quantity Py). Further, degree (e.g., differences, ratio and the like) of differences in the wheel slip velocity Sl and in the wheel slip ratio between the wheels may be used as the wheel state quantity.

The wheel state quantity Py may be calculated on the basis of the road surface μ gradient (e.g., JP2001133390A corresponding to U.S. Pat. No. 6,522,968) or the wheel grip factor (e.g., JP2003312465A corresponding to U.S. Pat. No. 6,895,317). When the wheel state quantity Py of the selected wheel (the turning inner wheel) exceeds a predetermined value, i.e., when the turning inner wheel becomes slippery, the pressure increase regulating control (i.e., starting the pressure increase regulation, restriction of the pressure increasing gradient and maintenance of the pressure) is executed to the selected wheel on the basis of the wheel state quantity Py. In addition, the auxiliary pressure applied to the brake-circuit including wheels other than the selected wheel is increased so as to be greater than the reference value SP#o on the basis of the wheel state quantity Py.

In execution of the pressure increase regulating control, the turning state quantity Tc itself or the wheel state quantity Py itself may be used as a condition for starting the pressure increase regulation. More specifically, when the turning state quantity Tc becomes equal to or greater than a threshold value Tck while the driver conducts the brake operation, the pressure increase regulating control is started and executed. Alternatively, when the wheel state quantity Py becomes equal to or greater than a threshold value Pyk while the driver conducts the brake operation, the pressure increase regulating control is started and executed. Each of the threshold value Tck of the turning state quantity and the threshold value Pyk of the wheel state quantity may be set as a constant value, however, each of the threshold values Tck and Pyk may be set on the basis of the vehicle body speed Vx or the vehicle body speed Vxo at the brake operation starting point. In this case, the higher the vehicle speed Vx becomes, the lower values the threshold values Tck and Pyk are set to be.

As mentioned above, in the pressure increase regulating control, any one of the regulation starting braking operation variable Sbs, a regulation starting vehicle deceleration Sgx (criterion value) and the pressure increase limit pressure Ps is set as the control starting condition on the basis of either one of the turning state quantity Tc (or, the turning state quantity Tco at the brake operation starting point), and the wheel state quantity Py. Alternatively, either one of a regulation starting threshold of the turning state quantity and a regulation starting threshold of the wheel state quantity is set as the control starting condition. The pressure increasing gradient upper limit value Zs is set on the basis of any one of the turning state quantity Tc (or the turning state quantity Tco at the brake operation starting point) and the wheel state quantity Py. Each of the regulation starting braking operation variable Sbs, the regulation starting vehicle deceleration Sgx and the pressure increase limit pressure Ps, the threshold value Tck of the turning state quantity, the threshold value Pyk of the wheel state quantity and the pressure increasing gradient upper limit value Zs is set on the basis of the vehicle body speed Vx.

<Calculation of Target Auxiliary Pressure Value SP#t>

As mentioned above, the auxiliary pressure of the brake-circuit is increased by means of the auxiliary pressure increasing control in order to compensate decrease of the pressure due to the pressure increase regulating control. The target value of the auxiliary pressure, which corresponds to the target amount of auxiliary hydraulic pressure and is referred to simple as the target value SP#t, is calculated on the basis of the reference value SP#o and the modification factor K# (adjustment value). The target value SP#t is set as a value gained by executing the increment adjustment to the reference value SP#o so that the relationship between the brake operation and the vehicle deceleration is maintained constant.

The following equation is satisfied:

$$SP\#t = K\# \cdot Fnc(Bs)$$

where K# is the above-mentioned modification factor to each brake-circuit. The modification factor K# is calculated, as mentioned above, on the basis of the turning state quantity Tc or the wheel state quantity Py** (see FIG. 30). Additionally, Fnc(Bs) is a table or a function indicating the reference auxiliary pressure value SP#o with the braking operation variable Bs being used as an argument, and Fnc(Bs) has characteristics shown in, for example, FIGS. 24 to 26. A means for determining the target auxiliary pressure value PS#t corresponds to the target amount determining means.

<<Driving Means>>

A driving means DRa drives and controls the second pressure generating means (i.e., the electric motor and pump) and the pressure regulating means (i.e., the linear pressure regulating valve LV#) so as to regulate the wheel cylinder pressure Pw** by regulating the auxiliary pressure added to the pressure generated by the first pressure generating means (i.e., the master cylinder MC). More specifically, the driving means DRa controls rotation of the electric motor M and opening/closing of the linear pressure regulating valve LV# (linear solenoid valve LV#) on the basis of the target auxiliary pressure value SP#t that is calculated as above.

The electric motor M is controlled so as to be faster than a predetermined rotational speed by which the target auxiliary pressure value SP#t is generated. A target pressure value Ph#t of each brake-circuit or a target pressure value Pwt of each wheel is calculated on the basis of the detection result of the detecting means BS (e.g., the master cylinder pressure Pm#) and the target auxiliary pressure value SP#t. Then, the current value for driving each of the linear pressure regulating valves LV# is determined on the basis of the corresponding target pressure value Ph#t or the corresponding target pressure value Pwt in order to control each of the linear pressure regulating valve LV#.

When the pressure sensor PH# is provided at each brake-circuit or when the pressure sensor P is provided at each wheel, the feedback control is executed in order to control the target pressure value to correspond to the actual pressure (e.g., Ph#a or Pwa) detected by the pressure sensor PH# or P. The pressure sensors PH# and P are excludable. In this case, the actual pressure is estimated on the basis of the wheel movement (i.e., transition of changes in the wheel speed), the operating states of the valves (linear pressure regulating valves), the operating states of the inlet valves and outlet valves, and the like.

A driving means DRb for the inlet valves and the outlet valves restricts the increase of the braking pressure by driving and controlling the inlet valves on the basis of the characteristics shown in FIGS. 27 to 29 and 31. When the pressure increase regulating control, whose start is determined on the basis of the characteristic shown in FIG. 27 or FIG. 29, is executed, a duty ratio Dt** at which the inlet valve is driven is determined on the basis of the characteristic shown in FIG. 31.

The duty ratio Dt is determined on the basis of the pressure increasing gradient upper limit value Zs that is determined following the characteristic shown in FIG. 28. The duty ratio Dt being set to one (1) indicates a state where the corresponding inlet valve is normally electrified. When the duty ratio Dt is set to one (1), the corresponding inlet valve is retained at the closed position, and the wheel cylinder pressure Pw is maintained at a pressure level reached when the duty ratio Dt is set to one (1). The duty ratio Dt being set to zero (0) indicates a state where the corresponding inlet valve is not electrified. In this case, the corresponding inlet valve is retained at the opened position. The pressure increasing gradient of the wheel cylinder Pw is controlled equal to or lower than the pressure increasing gradient upper limit value Zs by controlling the duty ratio Dt. In other words, the duty ratio Dt is determined on the basis of the pressure increasing gradient upper limit value Zs, and the pressure increase regulating control is achieved by maintenance of the pressure or so-called pulse pressure-increase control.

<<Brake Control Based on Vertical Load>>

Figure 32:
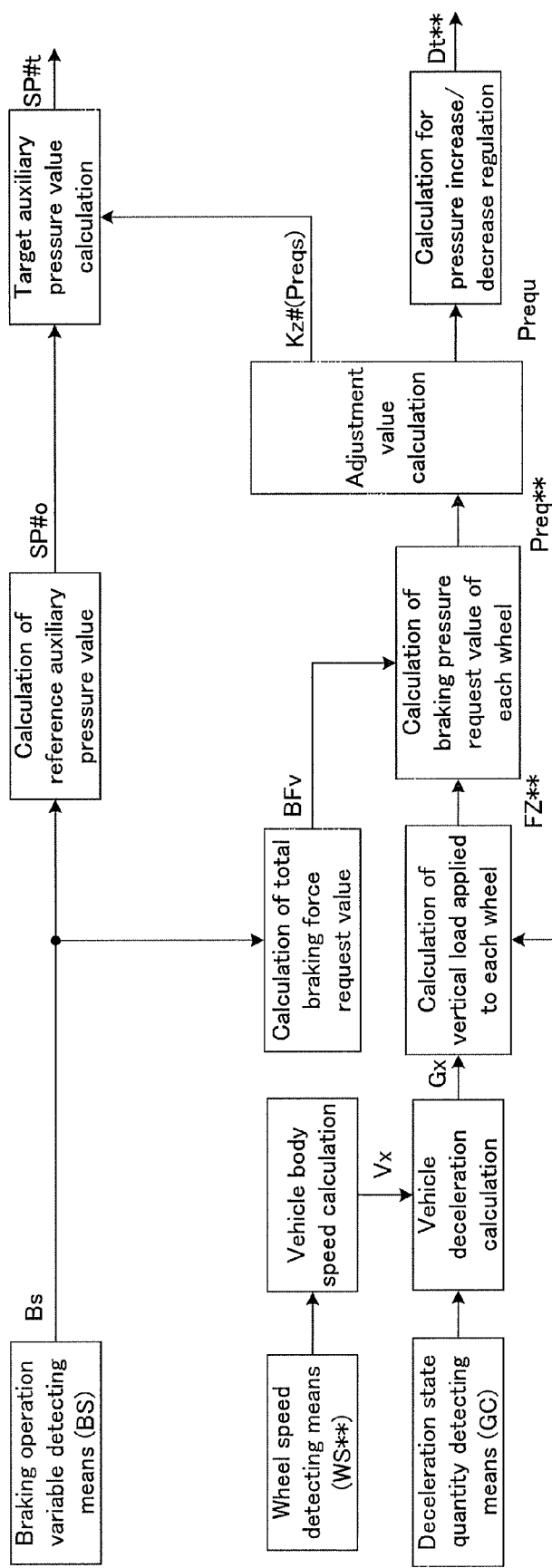
FIG. 32 is a functional bloc diagram describing the brake control executed on the basis of vertical load applied to each wheel.

The pressure increase regulating control and the auxiliary pressure increasing control may be executed on the basis of calculated vertical load applied to each wheel. The brake control based on the vertical load is described below in accordance with FIG. 32.

The vertical load may be calculated on the basis of inertia force acting on the vehicle body. A result of acting of the inertia force on the vehicle body is expressed in the longitudinal acceleration Gx and the lateral acceleration Gy. Hence, the vertical load applied to each wheel is estimated as mentioned below with using the longitudinal acceleration Gx and the lateral acceleration Gy.

Vertical load applied to turning outer front-wheel
FZsf=FZfo+Xfnc(GX)+Yfnc(Gy)

Vertical load applied to turning inner front-wheel
 FZuf=FZfo+Xfnc(Gx)−Yfnc(Gy)

Vertical load applied to turning outer rear-wheel FZsr=FZro−Xfnc(Gx)+Yfnc(Gy)

Vertical load applied to turning inner rear-wheel FZur=FZro−Xfnc(Gx)−Yfnc(Gy)

FZfo and FZro are functions respectively indicating static vertical loads of the front-wheels and rear-wheels. Xfnc(Gx) is a function indicating the load shift in the front-rear direction with Gx being used as an argument. Yfnc(Gy) is a function indicating the load shift in the right-left direction with Gy being used as an argument. Xfnc(Gx) and Yfnc(Gy) may be gained from the vehicle specifications or Xfnc (Gx) and Yfnc (Gy) may be gained experimentally.

Total braking force BFv necessary for decelerating the vehicle is calculated on the basis of the braking operation variable Bs following a relationship BFv=Zfnc(Bs). Zfnc(Bs) is a function with Bs being used as the argument. The total braking force BFv may be set so as to have a characteristic of substantially proportionality with respect to the braking operation variable Bs.

A request value Preq of braking pressure applied to each wheel is calculated on the basis of the total braking force BFv and the vertical load FZ following a relationship Preq=Kb·BFv·(FZ/Ms). Kb represents a conversion factor from the braking force to the braking pressure and is gained on the basis of a wheel radius, a brake effective diameter, pad friction coefficient and the pressure receiving area of wheel cylinder. Ms represents the vehicle weight. As the braking pressure request value Preq** of each wheel is distributed in response to the vertical load applied thereto, braking load (i.e., ratio of the braking force with respect to the vertical load) is evenly applied to each wheel.

A request value Prequ of turning inner front-wheel and a request value Preqs of the turning outer wheel are selected on the basis of the request value Preq** of each wheel.

A starting condition for the pressure increase regulating control and the pressure increasing gradient after the control started are determined on the basis of a deviation ΔPwu which is a deviation between the request value Prequ of the turning inner wheel and the actual pressure Pwa. Then, the duty ratio Dt is determined. The corresponding inlet valve IV of the turning inner wheel is controlled on the basis of the duty ratio Dt. The characteristics (tables) for determining the starting condition of the pressure increase regulating control, the pressure increasing gradient after the control started and the duty ratio Dt may be gained by replacing the turning state quantity Tc by the pressure deviation ΔPwu in FIGS. 27 to 29 and 31**.

Likewise, the modification factor Kz# for executing the auxiliary pressure increasing control is calculated on the basis of a deviation ΔPws which is a deviation between the request value Preqs of the turning outer wheel and the actual pressure Pwa. The characteristic (table) for calculating the modification factor Kz# may be gained by replacing the turning state quantity Tc by the pressure deviation ΔPws in FIG. 30**. Further, a calculated target value of the auxiliary pressure, which satisfied the following equation: the target value of the auxiliary pressure=Preqs−Pm#, by which the request value Preqa of the turning outer wheel is achieved may be set as the target value SP#t.

Effects and benefits gained by executing the above-mentioned pressure increase regulating control and the auxiliary pressure increasing control will be described below on each varied combinations of brake-circuit systems, a wheel (i.e., the selected wheel) to which the pressure increase regulating control is executed and a brake-circuit to which the auxiliary pressure increasing control is executed. Each combination described below achieves the following effects and benefits: 1) the relationship between the brake operation and the vehicle deceleration is maintained substantially constant, and 2) the yaw moment that enhances the directional stability is generated outwardly in the turning direction by braking force generating differences between right and left (i.e., not only the differences between the right and left front-wheels and the right and left rear-wheel, but also the differences between the left wheels and right wheels that face diagonally to each other). Therefore, only additional effects and benefits will be described below.

<<Effects and Benefits for Front-Rear Split Brake System>>

Effects and benefits gained when the front-rear split brake system is employed will be described below.

<Case Where Turning Inner Front-Wheel is Selected>

1. In a case where the auxiliary pressure increasing control targets only the front-wheel brake-circuit (i.e., the brake-circuit including the selected wheel), the rear-wheel cornering force is securely generated because the increment adjustment is not executed to the auxiliary pressure of the rear-wheel brake-circuit. Hence, the directional stability of the vehicle is enhanced.

2. In a case where the auxiliary pressure increasing control targets only the rear-wheel brake-circuit (i.e., the brake-circuit not including the selected wheel), the braking load applied to each wheel is substantially equalized by adjusting the auxiliary pressure of the rear-wheel brake-circuit so as to be slightly increased.

3. In a case where the auxiliary pressure increasing control target both the front-wheel brake-circuit and the rear-wheel brake-circuit (i.e., the brake-circuit including the selected wheel), the braking load applied to each wheel is equalized by adjusting the auxiliary pressure of each of wheels (three wheels) other than the selected wheel so as to be slightly increased. As a result, the cornering force generated at each wheel is equally ensured.

<Case Where Turning Inner Rear-Wheel is Selected>

1. In the case where the auxiliary pressure increasing control targets only the front-wheel brake-circuit (i.e., brake-circuit not including the selected wheel), the rear-wheel cornering force is securely generated because the increment adjustment is not executed to the auxiliary pressure of the rear-wheel brake-circuit. Further, the braking load applied to each wheel is equalized by adjusting the auxiliary pressure of the front-wheel brake-circuit so as to be slightly increased.

2. In the case where the auxiliary pressure increasing control targets both the front-wheel brake-circuit and the rear-wheel brake-circuit (i.e., the brake-circuit including the selected wheel), the braking load applied to each wheel is substantially equalized by adjusting the auxiliary pressure of each of wheels (three wheels) other than the selected wheel to be slightly increased. As a result, the cornering force generated at each wheel is equally ensured.

<Case Where Turning Inner Front and Rear-Wheels are Selected>

1. In the case where the auxiliary pressure increasing control targets only the front-wheel brake-circuit (i.e., brake-circuit including the selected wheel), the rear-wheel cornering force is securely generated because the increment adjustment is not executed to the auxiliary pressure of the rear-wheel brake-circuit. As a result, the directional stability of the vehicle is enhanced.

2. In the case where the auxiliary pressure increasing control targets both the front-wheel brake-circuit and the rear-wheel brake-circuit (i.e., the brake-circuit including the selected wheels), the braking load applied to each wheel is equalized by adjusting the auxiliary pressure of each of the wheels (two wheels) other than the selected wheels so as to be slightly increased. As a result, the cornering force generated at each wheel is equally ensured.

<<Effects and Benefits for the Diagonal Split Brake System>>

Effects and benefits achieved when the diagonal split brake system is employed will be described below.

<Case Where Turning Inner Front-Wheel is Selected>

1. In a case where the auxiliary pressure increasing control targets a brake-circuit not including the selected wheel, the auxiliary pressure of the turning outer front-wheel whose vertical load is increased the most is adjusted so as to be increased.

2. In a case where the auxiliary pressure increasing control targets both the first and the second circuits (the brake-circuit including the selected wheel), the braking load applied to each wheel is equalized by adjusting the auxiliary pressure of each of the wheels (three wheels) other than the selected wheel so as to be slightly increased. As a result, the cornering force generated at each wheel is equally ensured.

<Case Where Turning Inner Rear-Wheel is Selected>

1. In the case where the auxiliary pressure increasing control targets the brake-circuit including the selected wheel, the increase of the braking force of the turning inner rear-wheel whose vertical load is decreased the most is restricted, and the rear-wheel cornering force is securely generated. Further, the auxiliary pressure of the turning outer front-wheel whose vertical load is increased the most may be adjusted so as to be increased.

2. In the case where the auxiliary pressure increasing control targets the brake-circuit not including the selected wheel, the increase of the braking pressure of the turning inner rear-wheel whose vertical load is decreased the most is restricted. As a result, the rear-wheel cornering force is securely generated.

3. In the case where the auxiliary pressure increasing control targets both the first and the second circuits (the brake-circuit including the selected wheel), the increase of the braking pressure of the turning inner rear-wheel whose vertical load is decreased the most is restricted. As a result, the rear-wheel cornering force is securely generated. The braking load applied to each wheel is equalized by adjusting the auxiliary pressure of each of the wheels (three wheels) other than the selected wheel so as to be slightly increased. As a result, the cornering force generated at each wheel is equally ensured.

<Case Where Turning Inner Front and Rear-Wheels are Selected>

1. In the case where the auxiliary pressure increasing control targets the brake-circuit including the turning outer front-wheel, the increase of the braking force of the turning inner rear-wheel whose vertical load is decreased the most is restricted. As a result, the rear-wheel cornering force is securely generated. Further, the auxiliary pressure of the turning outer front-wheel whose vertical load is increased the most, may be adjusted so as to be increased.

2. In the case where the auxiliary pressure increasing control targets both the first and the second circuits (the brake-circuit including the selected wheel), the auxiliary pressure of each of the turning outer wheels (two wheels) whose vertical load are increased is adjusted so as to be increased. Further, the increase of the braking pressure of the each of turning inner wheels (two wheels) whose vertical load is decreased is restricted. As a result, the braking load applied to each wheel is substantially equalized, and the cornering force generated at each wheel is equally ensured.

As mentioned above, the rear-wheel cornering force is securely generated by selecting the turning inner rear-wheel and controlling the pressure increase thereof. Further, the directional stability of the vehicle may be maintained.

Loss of braking force generated in accordance with the pressure increase regulating control is compensated with the braking force of wheels that are not selected. The braking force for compensating the loss is divided between the wheels other than the selected wheel(s) by executing the increment adjustment to the auxiliary pressure of both brake-circuits. As a result, the braking load (i.e., generation of the braking force with respect to the vertical load) applied to each wheel is substantially equalized.

The rear-wheel cornering force is securely generated, by selecting the turning inner rear-wheel as the selected wheel and by executing the increment adjustment to the auxiliary pressure of the front-wheel brake-circuit when the front-rear split brake system is employed, and further, the vehicle is prevented from being moved inward in the turning direction because of the reduction of the cornering force of the front-wheels.

Further, the rear-wheel cornering force is securely generated by selecting the turning inner and front and rear-wheels as the selected wheels and by executing the increment adjustment to the auxiliary pressure of the front-wheel brake-circuit when the front-rear split brake system is employed, and further, the directional stability of the vehicle is enhanced due to the braking force differences between the left and right front-wheels.

The cornering force is securely generated at the turning inner rear-wheel by selecting the turning inner rear-wheel as the selected wheel and by executing the increment adjustment to the auxiliary pressure of the brake-circuit including the turning inner rear-wheel when the diagonal split brake system is employed, and further, the directional stability of the vehicle is enhanced due to the increase of the braking force of the turning outer front-wheel whose vertical load is increased the most.

Further, the cornering force is securely generated at the turning inner rear-wheel by selecting the turning inner rear-wheel as the selected wheel and by executing the increment adjustment to the auxiliary pressure of the both brake-circuits when the diagonal split brake system is employed, and further, the braking load applied to each wheel is substantially equalized.

<<Effects and Benefits When Rear-Wheel is Selected>>

As mentioned above, vertical load applied to each wheel is fluctuated in accordance with turning motion of the vehicle. Simultaneously, the load shift from the rear-wheels to the front-wheels occurs by the brake operation (deceleration). As a result, the rear-wheel cornering force is reduced and the vehicle may tend to sway even when the driver conducts the brake operation while the vehicle travels straight. Those phenomena tend to occur while vehicle is driven with high vehicle body speed. Therefore, at least one of the rear-wheels is selected, and the pressure increase of the selected wheel(s) is restricted.

In the case where the brake-circuits form the front-rear split brake system, pressure increase is regulated by inlet valves IVrl and IVrr. Then, the increment adjustment is executed to the target auxiliary pressure value SPft of the front-wheel brake-circuit with respect to the reference value SPfo. The pressure increase regulating control starting condition and the auxiliary pressure increasing control starting condition (control parameters) are set on the basis of the wheel state quantity Py following the characteristics shown in FIGS. 27 to 30. Additionally, by setting a threshold of the wheel state quantity, the pressure increase regulating control may be started and executed when the wheel state quantity reaches the aforementioned threshold. The inlet valves are controlled on the basis of the duty ratio Dt that is determined by using the table shown in FIG. 31.

In the case where the brake-circuits form the diagonal split brake system, pressure increase is regulated by inlet valves IVrl and IVrr. Then, the increment adjustment is executed to the target auxiliary pressure values SP1t and SP2t of the first and the second brake-circuits with respect to the corresponding reference values SP1o and SP2o. The pressure increase regulating control starting condition and the auxiliary pressure increasing control starting condition (control parameters) are set on the basis of the wheel state quantity Py following the characteristics shown in FIGS. 27 to 30. Additionally, by setting the threshold of the wheel state quantity, the pressure increase regulating control may be started and executed when the wheel state quantity reaches the aforementioned threshold. The inlet valves are controlled on the basis of the duty ratio Dt that is determined by using the table shown in FIG. 31.

Figure 33:
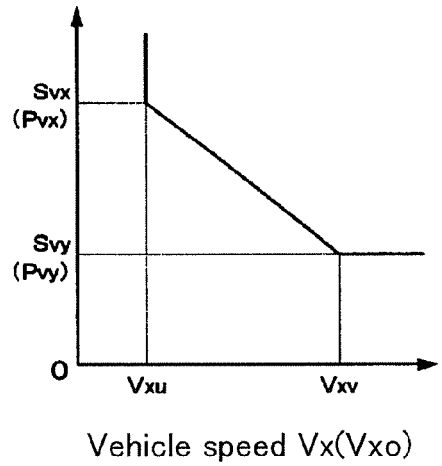
FIG. 33 is a graph showing a table specifying a relationship between vehicle speed and the regulation starting braking operation variable (pressure increase limit pressure)

The higher the vehicle speed Vx becomes, the more the vehicle tends to sway while the driver conducts the brake operation. Therefore, as shown in FIG. 33, the starting condition for executing the pressure increase regulation (i.e., the braking operation variable Bsb at which the pressure increase regulation is started, the vehicle deceleration Sgx at which the pressure increase regulation, the pressure Ps** at which pressure increase regulation is started or the brake starting wheel state quantity Pyj (threshold of the wheel state quantity)) is determined on the basis of the vehicle body speed Vx or the vehicle body speed Vxo at which the brake operation is started. As the vehicle body speed Vx becomes higher, the regulation in the increase of the braking pressure applied to the rear-wheel(s) is executed and started at a lower braking pressure or a lower braking operation variable. As a result, the rear-wheel cornering force is stably generated, and the sway of the vehicle is stably prevented.

<<Effects and Benefits>>

Figure 34:
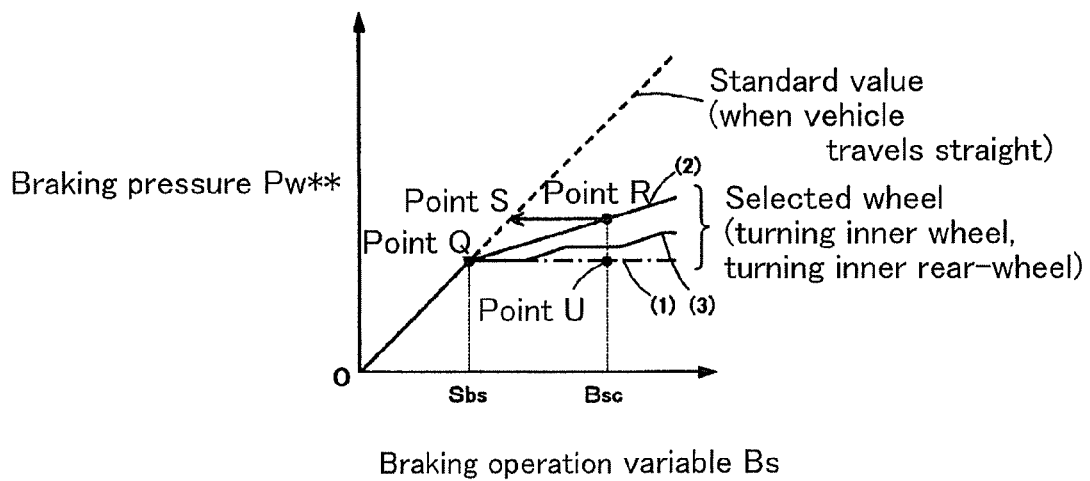
FIG. 34 is a graph showing an example of changes in braking pressure of a selected wheel in a case where the brake control is executed by the brake control apparatus for the vehicle associated with the third embodiment.
Figure 35:
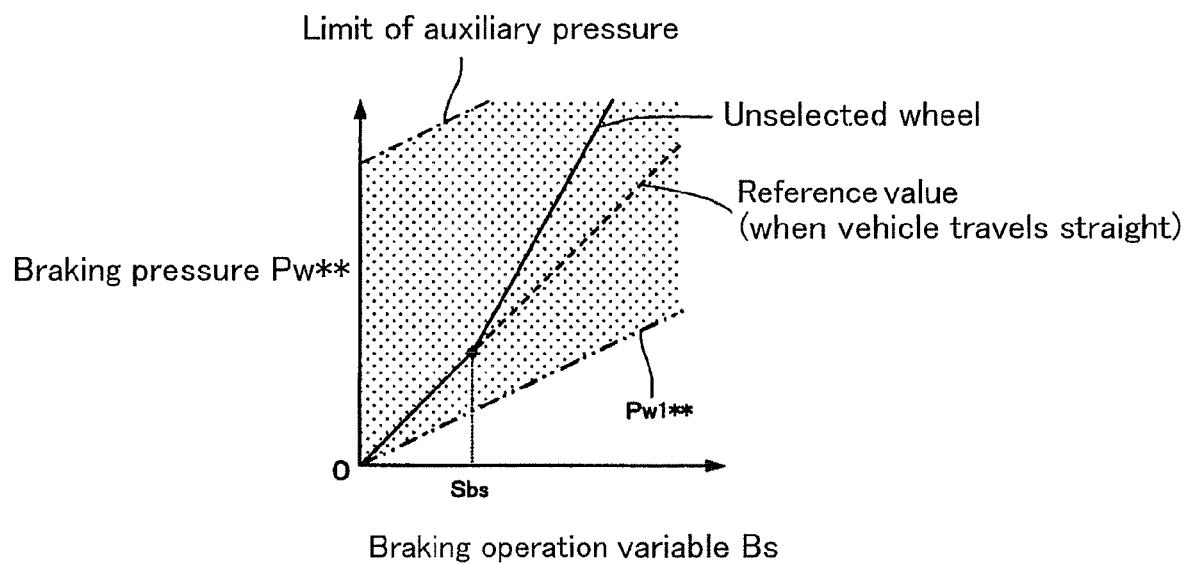
FIG. 35 is a graph showing an example of changes of the braking pressure of a wheel other than the selected wheel in the case where the brake control is executed by the brake control apparatus for the vehicle associated with the third embodiment.

Effects and benefits of the brake control apparatus associated with the embodiment will be described below in accordance with FIGS. 34 and 35. As shown in FIG. 34, firstly, the turning inner wheel(s), particularly the turning inner rear-wheel, is selected, and then the pressure increase of the selected wheel is restricted by the pressure increase regulating means (i.e., the inlet valve) when braking operation variable Bs reaches the pressure increase regulation starting value Sbs (a point Q in FIG. 34) that is determined on the basis of the turning state quantity Tc and the like. In the pressure increase regulating control, a single wheel or plural wheels is/are selected. However, in this embodiment, a case where a single wheel is selected will be described below as an example, unless otherwise mentioned.

While the pressure increase of the selected wheel is being restricted, the braking force Pw of the selected wheel is maintained (see a characteristic line (1)) or the pressure increase gradient of the braking force Pw is restrictedly increased (see a characteristic line (2)). Alternatively, by combining the pressure maintenance and the pressure increase gradient regulation, the maintenance of the pressure and the pressure increase may be alternately executed (see a characteristic line (3)). In a case where the inlet valve IV is controlled based on the duty ratio Dt and the pressure increase gradient is regulated by opening/closing of the inlet valve IV, the kick-back to the brake pedal BP occurs. However, by the braking pressure Pw of the selected wheel being maintained constant for a predetermined period, the kick-back to the brake pedal BP is prevented from occurring.

In a case where the pressure increase regulating control is executed to the selected wheel, the auxiliary pressure is adjusted so as to be increased from the reference value (i.e., the auxiliary pressure when the pressure increase regulation is not executed by the pressure increase regulating means when the driver conducts the brake operation while the vehicle travels straight). More specifically, as shown in FIG. 35, when the braking operation variable Bs reaches the regulation starting braking operation variable Sbs, the auxiliary pressure increasing control is started and executed. As a result, the braking pressure Pw** applied to the corresponding unselected wheel is increased.

The total braking force is reduced with respect to the selected wheel by the pressure increase regulating control. The reduction of the total braking force is compensated by means of the auxiliary pressure increasing control. As a result, the increasing characteristic of the vehicle deceleration with respect to the braking operation variable is maintained substantially constant.

Further, because the turning inner wheel is selected as the target for executing the pressure increase regulating control, the braking force differences occur between the left and right wheels by the pressure increase regulating control and the auxiliary pressure increasing control. As a result, the yaw moment is generated outwardly in the turning direction, which further results in enhancement of the directional stability of the vehicle.

Figure 36:
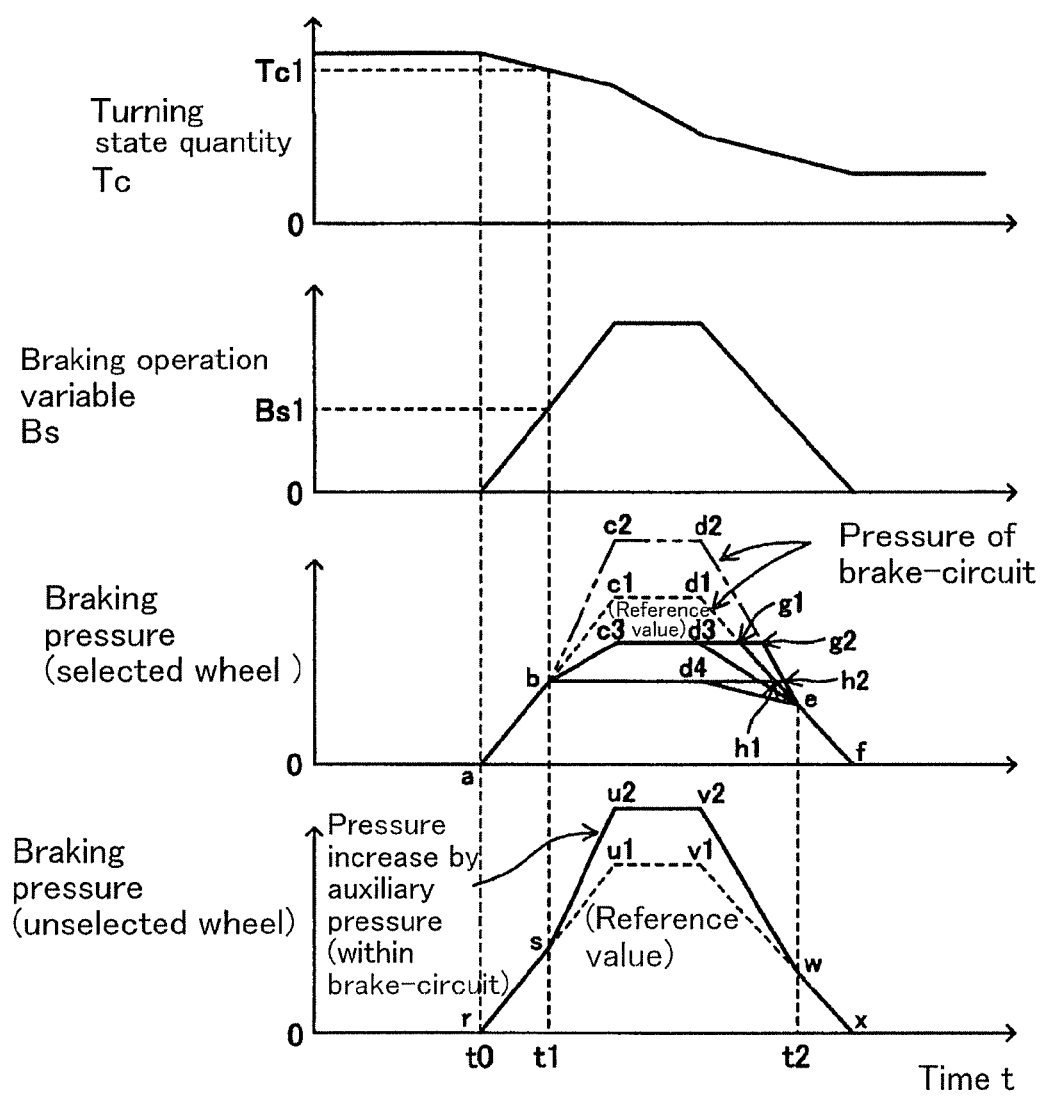
FIG. 36 is a time chart showing an example of patterns of changes in each physical quantity in the case where the brake control is executed by the brake control apparatus of the vehicle associated with the third embodiment.
Figure 37:
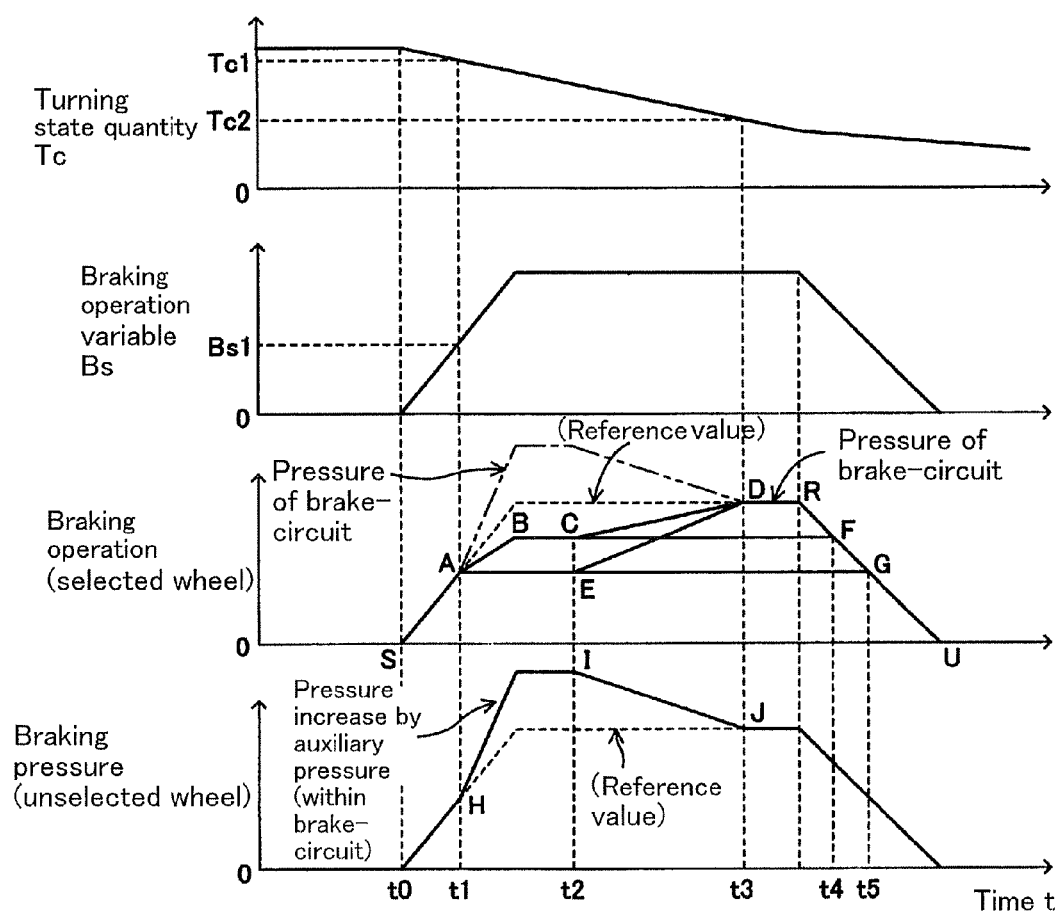
FIG. 37 is a time chart showing an example of other pattern of changes in each physical quantity in the case where the brake control is executed by the brake control apparatus of the vehicle associated with the third embodiment.

FIGS. 36 and 37 are time charts describing various examples of the pressure regulation carried out by the pressure increase regulating control under a condition where the above-mentioned embodiment is employed. FIG. 36 shows an example where the brake operation is started at time t0, and the pressure increase regulating control and the auxiliary pressure increasing control are started when the braking operation variable Bs reaches the regulation starting braking operation variable Sbs corresponding to Bs1 at time t1, and then the driver releases the brake pedal BP while the pressure increase regulating control and the auxiliary pressure increasing control are executed.

The pressure Ph# of the brake-circuit including the selected wheel changes following a characteristic expressed by a string of points a-b-c1-d1-e-f (see FIG. 36) while being maintained at the reference auxiliary pressure value when the brake-circuit including the selected wheel is not the object for executing the auxiliary pressure increasing control. On the other hand, in the case where the brake-circuit including the selected wheel is the object for executing the auxiliary pressure increasing control, the pressure Ph# of the brake-circuit including the selected wheel changes having a characteristic expressed by a string of points a-b-c2-d2-e-f so as to have a greater value than the reference auxiliary pressure value from time t1 to t2. The time t2 corresponds to a time (point) where the turning state quantity Tc being decreased due to the vehicle deceleration reaches the predetermined value Tcw (see FIG. 30).

The pressure Ph# of the brake-circuit including the wheels other than the selected wheel changes having a characteristic expressed by a string of points r-s-u2-v2-w-x so as to have a greater value than the reference auxiliary pressure from the time t1 to the time t2, because the auxiliary pressure increasing control targets the brake-circuit having the wheels other than the selected wheel.

In the pressure increase regulating control, the braking pressure Pw of the selected wheel changes following a characteristic expressed by a string of points a-b-c3-d3-e-f when the increasing gradient of the braking pressure Pw is restricted (i.e., when the braking pressure Pw corresponds to the characteristic line (2) in FIG. 34). On the other hand, in a case where the braking pressure Pw is maintained constant (i.e., corresponding to the characteristic line (1) in FIG. 34), the braking pressure Pw of the selected wheel changes with having a characteristic expressed by a string of points a-b-d4-e-f. In this case, the braking pressure Pw of the selected wheel is reduced in accordance with the releasing operation of the brake pedal BP conducted by the driver (see a string of points d3-e or d4-e in FIG. 36).

Alternatively, the braking pressure Pw of the selected wheel may be maintained constant while the driver conducts the releasing operation of the brake pedal BP. In this case, the braking pressure Pw of the selected wheel changes with having a characteristic expressed by a string of points d3-g1 (g2)-e or d4-h1(h2)-e. As a result, unnecessarily opening/closing of the corresponding valve is restricted, which further results in reducing the noises and the like accompanied by the opening/closing operation of the valve.

As mentioned above, in the case where the braking pressure Pw of the selected wheel maintained constant while the driver conducts the releasing operation of the brake pedal BP, the corresponding inlet valve IV of the selected wheel is retained at the closed position. For example, in a case where the driver releases the brake pedal BP when the braking operation variable Bs reaches the value Bsc in FIG. 34, the braking pressure Pw of the selected wheel is maintained at a pressure value corresponding to a point R because the inlet valve IV is retained at the closed position.

When a state corresponding to a point S in FIG. 34 (a state corresponding to the point g1 (g2) or h1 (h2) in FIG. 36) is established, the pressure Ph# of the brake-circuit including the selected wheel corresponds to the braking pressure Pw of the selected wheel. Thereafter, the braking pressure Pw of the selected wheel is decreased while taking the same value as the pressure Ph# that is further decreased because a check valve CV (see FIG. 22) is opened. The inlet valve IV is shifted from the closed position to the opened position after the decreasing pressure Ph# corresponds to the braking pressure Pw of the selected wheel (i.e., at a state where the pressure Ph# is corresponds to the braking pressure Pw by the check valve CV** being opened).

When the inlet valve IV is shifted from the closed position to the opened position in a condition where the pressure Ph# is greater than the braking pressure Pw in the brake pedal releasing operation conducted by the driver, the kickback to the brake pedal BP occurs. Hence, by shifting the inlet valve IV from the closed position to the opened position after the check valve CV is opened (i.e., in the state where the pressure Ph# corresponds to the braking pressure Pw**), the kick-back to the brake pedal BP is prevented from occurring.

FIG. 37 shows an example where the brake operation is started at time t0, and the pressure increase regulating control and the auxiliary pressure increasing control are started when the braking operation variable Bs reaches the regulation starting braking operation variable Sbs corresponding to Bs1 at time t1, and then the turning state quantity Tc sufficiently decreased due to the vehicle deceleration before the driver releases the brake pedal BP while the pressure increase regulating control and the auxiliary pressure increasing control are executed.

Likewise with FIG. 36, the pressure Ph# of the brake-circuit including the selected wheel changes having a characteristic expressed by a dashed line in FIG. 37 while being maintained at the reference auxiliary pressure value, in the case where the brake-circuit including the selected wheel is not the object for executing the auxiliary pressure increasing control. On the other hand, in the case where the brake-circuit including the selected wheel is the object for executing the auxiliary pressure increasing control, the pressure Ph# of the brake-circuit including the selected wheel changes having a characteristic expressed by a chain double-dashed line so as to have a greater value than the reference auxiliary pressure value from time t1 to t3. The time t3 corresponds to a time (point) where the turning state quantity Tc being decreased due to the vehicle deceleration reaches the predetermined value Tcw (see FIG. 30).

The pressure Ph# of the brake-circuit including the wheels other than the selected wheel changes with having a characteristic expressed by a string of points H-I-J so as to have a greater value than the reference auxiliary pressure value from time t1 to time t3, because the auxiliary pressure increasing control targets the brake-circuit including the wheels other than the selected wheel.

Alternatively, the braking pressure Pw of the selected wheel may be changed with having a characteristic expressed by a string of points S-A-B-C-D-R-U in a case where the pressure increasing gradient is regulated by the pressure increase regulating control. That is to say, the braking force Pw of the selected wheel is returned towards the reference auxiliary pressure value (point D), i.e., the braking force Pw** of the selected wheel is increased towards the reference auxiliary pressure value (point D), from the time 2 at which an amount of increment adjustment of the auxiliary pressure starts decreasing due to the decrease of the turning state quantity Tc.

Likewise, in a case where the pressure Ph# of the brake-circuit including the selected wheel is maintained constant in the pressure increase regulating control, the braking pressure Pw of the selected wheel may be changed with having a characteristic expressed by a string of points S-A-E-D-R-U. That is to say, the braking force Pw of the selected wheel is returned towards the reference auxiliary pressure value (point D), i.e., the braking force Pw** of the selected wheel is increased towards the reference auxiliary pressure value (point D), from the time 2 at which the amount of increment adjustment of the auxiliary pressure starts decreasing in accordance with the decrease of the turning state quantity Tc.

Alternatively, the braking pressure Pw of the selected wheel may be maintained constant after the time t2. In this case, the braking pressure Pw of the selected wheel changes with having a characteristic expressed by a string of points C-F-U or E-G-U. As a result, the unnecessary opening/closing operation of the valves is restricted, which further results in reducing the noises and the like accompanied by the opening/closing operation of the valve. In this case, likewise with the above-mentioned case, the inlet valve IV is shifted from the closed position to the opened position after the decreasing pressure Ph# corresponds to the braking pressure Pw of the selected wheel (i.e., after time t4 or time t5 in a state where the pressure Ph# corresponds to the braking pressure Pw by the check valve CV being opened).

Unlike a so-called brake-by-wire system of a brake control apparatus where the brake operation conducted by the driver and braking torque adjustment are mechanically separated, in the brake control apparatus in which the master cylinder and the wheel cylinders are connected via the fluid (hereinafter referred to also as a hydraulically communicated brake control apparatus), the operating characteristic of the brake pedal BP (the relationship between the brake pedal stroke and the operational force) depend on the rigidity of the brake calipers, the brake pads, the brake-circuits and the like. Hence, braking torque is preferably adjusted while maintaining fluid communication between the master cylinder and the wheel cylinders in the hydraulically communicated brake control apparatus.

In the embodiment of the hydraulically communicated brake control apparatus, the pressure increase regulating control is started and executed by the opening/closing operation of the inlet valves accompanied by establishment and interruption of the fluid communication between the master cylinder and the wheel cylinders. On the other hand, the auxiliary pressure increasing control is executed while maintaining the fluid communication between the master cylinder and the wheel cylinders. As a result, changes in the operating characteristic of the brake pedal BP is minimized.

The present invention is not limited on the above-mentioned embodiment, however, variations and changes may be made by others, and equivalents employed, without departing from the spirit of the present invention. For example, in the above-mentioned embodiment, regulation in increase of the braking pressure (pressure increase regulating control) and increase of the auxiliary pressure (auxiliary pressure increasing control) are simultaneously started. In a case where the increment adjustment is executed to the auxiliary pressure of the brake-circuit including the selected wheel, the braking pressure of the selected wheel may temporarily increased if execution of the pressure increase regulating control (shift of the inlet valve to the closed position) is delayed. Thus, the pressure increase regulating control may be started before the auxiliary pressure increasing control is started.

The oversteering (inward vehicle movement in the turning direction) while the braking operation tends more likely to occur when the driver starts the brake operation under a condition where the turning state quantity is great, e.g., when the lateral acceleration Gy is equal to or greater than 0.6 G. On the other hand, in the case where the vehicle turns after the driver conducts the brake operation, the oversteering less likely to occur. Therefore, the embodiment is modifiable so as to execute both the pressure increase regulating control and the auxiliary pressure increasing control only for the case where the vehicle turns after the driver conducts the brake operation (turn-and-brake operation).

The control means determined whether or not the driver conducts the brake operation while the vehicle turns on the basis of the turning state quantity at the time when the driver starts the brake operation. More specifically, the control means determined whether or not the driver conducts the brake operation while the vehicle turns on the basis of the turning state quantity at the time when the brake-operational Bs variable reaches infinitesimal predetermined value. When the turning state quantity is greater than a predetermined value, both the pressure increase regulating control and the auxiliary pressure increasing control are executed. On the other hand, when the turning state quantity is equal to or lower than the predetermined value, both the pressure increase regulating control and the auxiliary pressure increasing control are not executed.

For example, when the driver conducts the brake operation while the vehicle travels in the straight manner and then the vehicle slaloms, the operating characteristic of the brake pedal BP changes momentarily because the fluid communication between the master cylinder and each of the wheel cylinders is interrupted by the corresponding inlet valve. However, in the case where the turning state quantity at the time the brake operation is started is equal to or lower than the predetermined value, changes in the operating characteristic is prevented by not executing the pressure increase regulating control and the auxiliary pressure increasing control.

Additionally, in the above-mentioned embodiment, the auxiliary pressure is regulated on the basis of a value gained by multiplying the reference value by the adjustment value of the auxiliary pressure which is used as the modification factor. Alternatively, instead of the modification factor, the adjustment value (adjustment pressure) is calculated in the pressure-dimension, and then, the auxiliary pressure may be adjusted in a manner where the adjustment value being increase/decreased with respect to the reference value.

Fourth Embodiment

A fourth embodiment of the brake control apparatus related to the present invention will be described below in accordance with attached drawings.

<<Entire Configuration of Brake Control Apparatus>>

The brake control apparatus associated with the fourth embodiment has the same entire configuration as the brake control apparatus of the third embodiment which is explained in accordance with FIGS. 21 and 22. Hence, the detailed explanation of the entire configuration of the brake control apparatus associated with the fourth embodiment will be omitted.

The brake control apparatus of the fourth embodiment is provided with the first pressure generating means (the first hydraulic pressure generating apparatus), the second pressure generating means (the second hydraulic pressure generating apparatus), the detecting means BS for detecting the braking operation variable of the brake operation member operated by the driver, the pressure regulating means (the pressure regulating means) and the pressure increase regulating means that serves as a means for regulating increase of the braking pressure.

<<Configuration of Braking Operation>>

Figure 38:
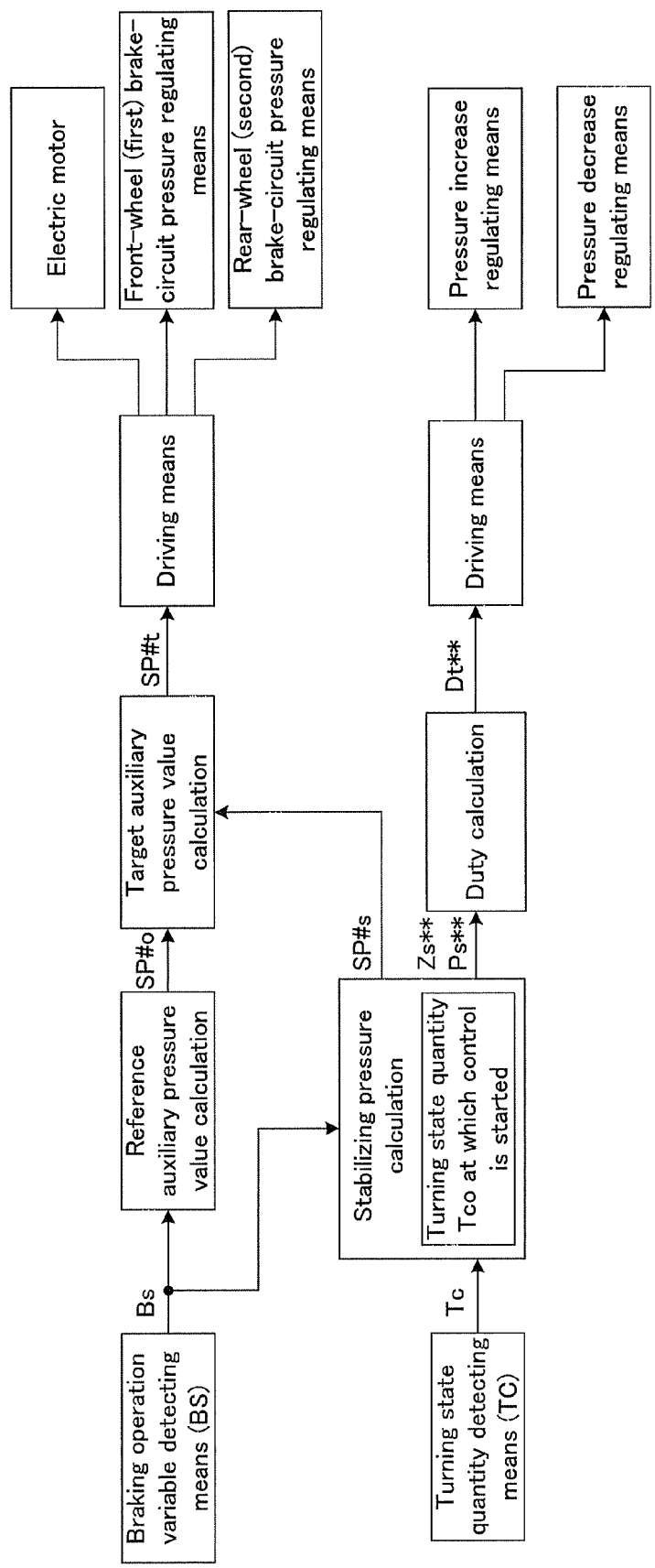
FIG. 38 is a functional bloc diagram illustrating the brake control executed by the brake control apparatus for the vehicle associated with the fourth embodiment.

A configuration of the brake control executed by the brake control apparatus associated with the fourth embodiment will be described below in accordance with FIG. 38.

<Calculation of Reference Auxiliary Pressure Value SP#o>

The reference value SP#o of the pressure supplementing (assisting) the braking pressure generated by the first pressure generating means (the master cylinder MC) (i.e., the reference value SP#o of the pressure added to the braking pressure) is calculated on the basis of the braking operation variable Bs of the brake pedal BP operated by the driver. The means for determining the reference auxiliary pressure value SP#o (amount of the first and the second reference auxiliary hydraulic pressures) corresponds to the reference amount of auxiliary hydraulic pressure determining means. The brake control apparatus associated with the fourth embodiment calculates the reference auxiliary pressure value SP#o used for the braking control in the same manner as the brake control apparatus associated with the third embodiment described in accordance with FIGS. 24 to 26. Therefore, the detailed explanation of the calculation of the reference auxiliary pressure value will be omitted.

<Calculation of Stabilizing Pressure>

A calculation of a stabilizing pressure SP#s will be described below with reference to FIG. 39. Firstly, whether the vehicle is in a turn-and-brake control or in a brake-and-turn operation is determined, and then the stabilizing pressure SP#s is added to the auxiliary pressure SP#o in order to enhance the vehicle stability and the turn-in ability. Then, the final target value SP#t of the auxiliary pressure will be calculated. The final target value SP#t of the auxiliary pressure satisfies the following equation: SP#t=SP#o+SP#s. The turn-and-brake control (a turn-and-brake state) corresponds to a first state, and the brake-and-turn control (a brake-and-turn state) corresponds to a second state.

As mentioned below, the stabilizing pressure SP#s is calculated by multiplying a stabilizing base pressure SA#o by a factor (e.g., a turn-and-brake factor Kt#, a brake-and-turn factor Ks#, or zero (0) (prohibition of the braking operation)). Hence, the target auxiliary pressure value SP#t is calculated by subtracting an amount corresponding to the stabilizing pressure SP#s from the auxiliary pressure SP#o depending on the factor. Additionally, when the brake control is prohibited, in other words when the factor is set to zero (0), the target auxiliary pressure value SP#t corresponds to the auxiliary pressure SP#o.

<Calculation of Stabilizing Base Pressure SA#o>

Figure 40:
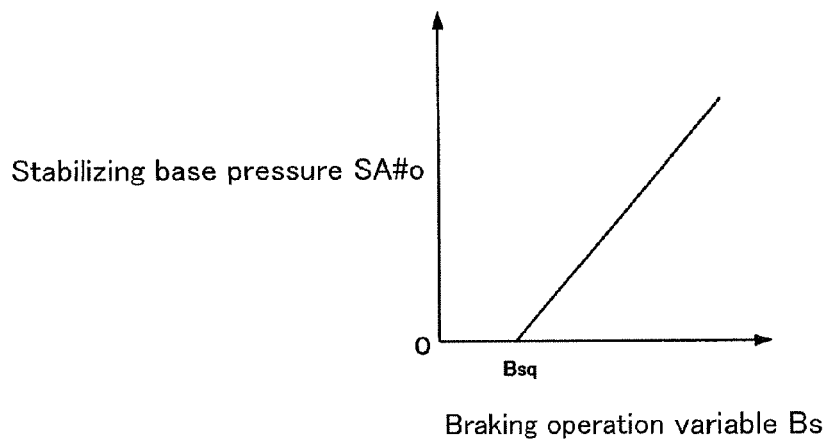
FIG. 40 is a graph showing a table specifying a relationship between the braking operation variable and stabilizing base pressure.

In order to calculate the stabilizing pressure SP#s, the stabilizing base pressure SA#o is calculated on the basis of the braking operation variable Bs, as shown in FIG. 40. A value Bsq indicates a braking operation variable at which the stabilizing base pressure SA#o is added to the auxiliary pressure SP#o. When the vehicle speed is low, deterioration of the vehicle stability or the turn-in ability is less likely to occur. Therefore, the value Bsq may be set at a value corresponding to approximately 0.1 G of the vehicle deceleration. A means for determining the stabilizing base pressure SA#o (an amount of stabilizing base hydraulic pressure) corresponds to an amount of stabilizing base hydraulic pressure determining means.

<Calculation of Turn-and-Brake Factor Kt#>

The turn-and-brake factor Kt# is a control factor for executing a control when the driver conducts the brake operation while the vehicle turns (a turn-and-brake control). More specifically, the stabilizing pressure SP#s for the turn-and-brake operation (a first state) is conducted and calculated by multiplying the factor Kt# by the stabilizing base pressure SA#o. The turn-and-brake factor Kt# is calculated on the basis of the turning state quantity Tc with having a characteristic (first characteristics) shown in FIG. 40.

The turning state quantity Tc is calculated on the basis of the detection result of the turning state quantity detecting means TC. The turning state quantity Tc is a property representing the turning motion of the vehicle. Further, the turning state quantity Tc is calculated on the basis of at least one of the steering wheel operational angle, the steering angle of steering wheel, the lateral acceleration and the yaw rate. A means for detecting the turning state quantity representing the turning motion of the vehicle corresponds to a turning state quantity detecting means.

It may be preferable that the actual lateral acceleration Gya is used as the turning state quantity Tc. Following the first characteristic, the turn-and-brake factor Kt# of the front-wheel brake-circuit when the front-rear split brake system is employed, or the turn-and-brake factor Kt# of the brake-circuit including the turning outer front-wheel when the diagonal split brake system is employed, is set so as to be equal to or greater than zero (0) on the basis of the turning state quantity Tc with reference to a value Gyp as a starting point. As a result, the stabilizing pressure SP#s is set equal to or greater than zero (0).

Further, following the first characteristic, the turn-and-brake factor Kt# of the rear-wheel brake-circuit when the front-rear split brake system is employed, or the brake-circuit including the turning inner front-wheel when the diagonal split brake system is employed, is set so as to be equal to or lower than zero (0) on the basis of the turning state quantity Tc with reference to the value Gyp as the starting point. As a result, the stabilizing pressure SP#s is set to be equal to or lower then zero (0).

The first characteristic may be set so as to change in response to the vehicle body speed Vx or the vehicle speed Vxo at which the brake operation is started. In this case, the higher the vehicle body speed Vx or Vxo becomes, the greater an absolute value |Kt#| of the turn-and-brake factor is set to be.

<Calculation of Brake-and-Turn Factor Ks#>

Figure 42:
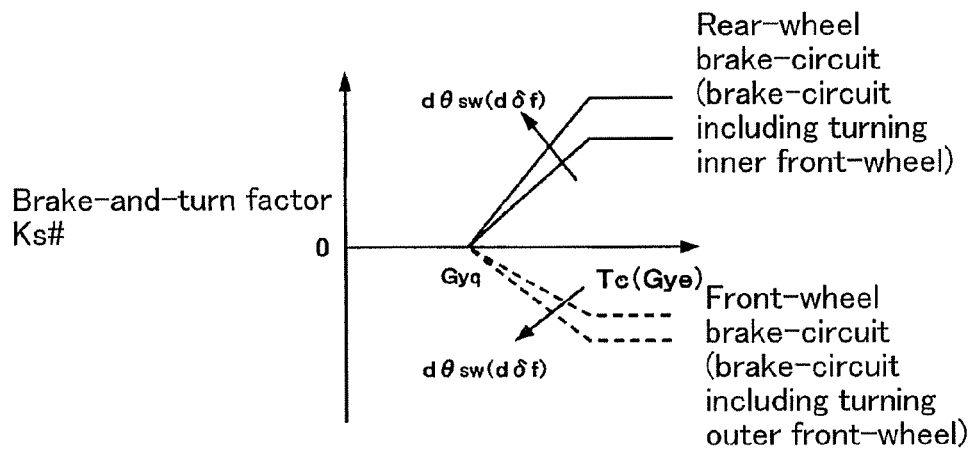
FIG. 42 is a graph showing a table specifying a relationship between the turning state quantity and a brake-and-turn factor.

The brake-and-turn factor Ks# is a control factor for executing the control when the vehicle turns after the driver conducts the brake operation (brake-and-turn control). More specifically, the stabilizing pressure SP#s for the brake-and-turn operation (a second state) is calculated by multiplying the factor Ks# by the stabilizing base pressure SA#o. The brake-and-turn factor Ks# is calculated on the basis of the turning state quantity Tc with having a characteristic (a second characteristic) shown in FIG. 42.

It may be preferable that the steering wheel operational angle θsw or the steering angle δf of the steering angle is used as the turning state quantity Tc. For example, the calculated lateral acceleration Gye that satisfies the following equation: Gye=(Vx2·θsw)/{L·N·(1+Kh·Vx2)} where L is the wheelbase, N is a steering gear ratio and Kh is a stability factor, is calculated on the basis of the steering wheel operational angle θsw. The calculated lateral acceleration may be used as the turning state quantity Tc.

Following the second characteristic, the brake-and-turn factor Ks# of the rear-wheel brake-circuit when the front-rear split brake system is employed, or the brake-and-turn factor Ks# of the brake-circuit including the turning inner front-wheel when the diagonal split brake system is employed, is set so as to be equal to or greater than zero (0) on the basis of the turning state quantity Tc with reference to a value Gyq as a starting point. As a result, the stabilizing pressure SP#s is set equal to or greater than zero (0).

Further, following the second characteristic, the brake-and-turn factor Ks# of the front-wheel brake-circuit when the front-rear split brake system is employed, or the brake-and-turn factor Ks# of the brake-circuit including the turning outer front-wheel when the diagonal split brake system is employed, is set so as to be equal to or lower than zero (0) on the basis of the turning state quantity Tc with reference to the value Gyq as the starting point. As a result, the stabilizing pressure SP#s is set equal to or lower than zero (0).

The second characteristic may be set so as to change in response to a steering wheel operational speed (angular speed) dθsw or a steering wheel speed of steering wheel dδf. In this case, the higher the steering wheel operational speed (angular speed) dθsw or the steering wheel speed of steering wheel dδf becomes, the greater an absolute value |Ks#| of the turn-and-brake factor is set to be. The steering wheel operational speed (angular speed) dθsw is gained by differentiating the operational angle θsw.

<Discrimination Between "Turn-and-Brake" and "Brake-and-Turn">

A selection means (a state determining means) determines whether the vehicle is in the turn-and-brake operation (selection of the turn-and-brake factor Kt#) or the brake-and-turn operation (selection of the brake-and-turn factor Ks#) on the basis of the turning state quantity at which the brake operation is started (i.e., the brake operation starting turning state quantity). The selection means determines that the driver starts the brake operation when the braking operation variable Bs becomes equal to or greater than the predetermined value Bs1. Then, the turning state quantity at which the braking operation variable Bs becomes equal to or greater than the predetermined value Bs1 is memorized as the brake operation starting turning state quantity Tco. When the brake operation starting turning state quantity Tco is equal to or greater than the predetermined value Tc1, the selection means determines that the vehicle is in the turn-and-brake operation (i.e., turn-brake control). On the other hand, when the brake operation starting turning state quantity Tco is lower than the predetermined value Tc1, the selection means determines that the vehicle is in the brake-and-turn operation (brake-and-turn control).

The vehicle stability is determined by a degree of balance of force generated at wheels (tires). Therefore, it may be preferable to use the actual lateral acceleration Gya, which is detected by the lateral acceleration sensor GY and is detected as a result of the wheels generating the force, as the turning state quantity. A value corresponding to the actual lateral acceleration Gya detected when the brake operation is started is memorized as the brake operation starting turning state quantity Tco. By comparing the value Tco and the predetermined value Tc1 ($\approx$0.5 G), the selection means determines whether the vehicle is in the turn-and-brake operation or the brake-and-turn operation. Then, either the turn-and-brake control or the brake-and-turn control is selected.

In this embodiment, either one of the turn-and-brake control of the brake-and-turn control is selected (corresponding to a case where the first predetermined value is equal to the second predetermined value). However, the selection means may discriminate between the turn-and-brake control (the factor Kt#), prohibition of the brake control (factor=0) and the brake-and-turn control (the factor Ks#), and then, the selection means selects one of those three (corresponding to a case where the second predetermined value is lower than the first predetermined value). In this case, the turn-and-brake control may be executed when the control starting turning state quantity Tco is equal to or greater than a predetermined value Tc2 (e.g., 0.5 G) (a first predetermined value), the brake control may be prohibited when the control starting turning state quantity Tco is lower than a predetermined value Tc2 (a second predetermined value) and equal to or greater than a predetermined value Tc3 (e.g., 0.3 G), or the brake-and-turn control may be executed when the control starting turning state quantity Tco is lower than the predetermined value Tc3. Additionally, in a case where only the turn-and-brake operation and the brake-and-turn operation are discriminated by the selection means, a block for the brake control prohibition in FIG. 39 is omitted.

While the brake control is not executed, the master cylinder, the wheel cylinder, the auxiliary pressure and the like may set to have any desired specifications so as to sufficiently ensure either one of a turn-and-brake performance (stability) of the vehicle or a brake-and-turn performance (turn-in ability) of the vehicle. In this case, either one of the turn-and-brake control and the brake-and-turn control is executed. In other words, the above-mentioned discrimination needs to be executed, however, either one of the turn-and-brake control and the brake-and-turn control is combined with prohibition of the braking control.

A final stabilizing pressure SP#s (target value) is calculated by multiplying the stabilizing base pressure SA#o by the factor (either Kt#, Ks# or one (1) (that may be omittable) selected by the selection means. A means for determining the stabilizing pressure SP#s (a first and a second amount of stabilizing hydraulic pressure) corresponds to an amount of stabilizing hydraulic pressure determining means.

Then, the final target auxiliary pressure SP#t, which satisfied the following equation: SP#t=SP#s+SP#o, is determined by adding the stabilizing pressure SP#s to the auxiliary pressure SP#o. The means for determining the target auxiliary pressure value SP#t (the first and the second target amounts of auxiliary hydraulic pressure determining means) corresponds to the target amount of auxiliary hydraulic pressure determining means. The auxiliary pressure is generated by the second pressure generating means (e.g., the electric motor and the pump) and is adjusted by the pressure regulating means (e.g., the linear pressure regulating valves).

<Calculation for Pressure Increase/Decrease Regulation>

The pressure within the brake-circuit to which the pump discharges the fluid is increased/decreased (changed) by the stabilizing pressure SP#s. However, there may be a case where the braking pressure of one of the wheels connected to the aforementioned brake-circuit needs to be changed while the change in the braking pressure of the other wheel connected to the aforementioned brake-circuit needs to be restricted. Specifically in a case where the pressure within the brake-circuit is increased by the corresponding stabilizing pressure SP#s, the braking force differences is effectively generated between the left and right wheels by restricting the increase of the braking pressure of the turning inner wheels, and further, the cornering force is securely generated at the turning inner wheels.

A wheel selection portion selects a wheel(s) that will be inner wheel(s) in the turning direction when the vehicle turns. Then, the wheel selection portion regulates the increase of the braking pressure of the selected wheel(s). A single wheel or plural wheels will be selected. However, in this embodiment, a case where a single wheel is selected will be described below as an example, unless otherwise mentioned.

Figure 43:
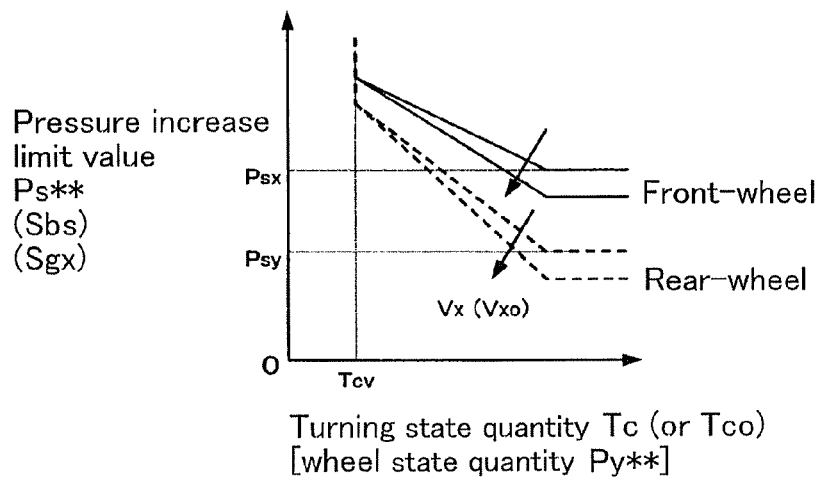
FIG. 43 is a graph showing a table specifying a relationship between the turning state quantity and the pressure increase limit pressure.

More specifically, the braking pressure Ps, at which the pressure increase regulation is started, is determined with using the turning state quantity Tc on the basis of the characteristic shown in FIG. 43. When the turning state quantity Tc is equal to or lower than a predetermined value Tcv, the pressure increase regulation is not executed to the turning inner wheel. On the other hand, when the turning state quantity Tc becomes greater than the predetermined value Tcv, the braking pressure Ps at which the pressure increase regulation is executed to the turning inner wheel is determined in accordance with the turning state quantity Tc.

The pressure increase limit pressure Ps (regulation starting braking pressure) may be set differently depending on either the front-wheel or the rear-wheel being selected as the object for the pressure increase regulation. When the rear-wheel is selected, because ensuring of the cornering force becomes more essential, the pressure increase limit pressure Ps may be set to be lower than the case where the front-wheel is selected. Further, in the case where the vehicle body speed is high, because ensuring of the vehicle stability becomes essential, the pressure increase limit pressure Ps is set depending on the vehicle body speed Vx. More specifically, the higher the vehicle body speed becomes, the lower value the pressure increase limit pressure Ps is set to be.

The braking pressure is a value that changes in response to the braking operation variable Bs or the vehicle body deceleration Gx. Hence, instead of the pressure increase limit pressure Ps**, the pressure increase regulating operational variable Sbs (regulation starting braking operation variable) or the pressure increase regulating deceleration Sgx (the regulation starting deceleration) may be calculated.

Figure 44:
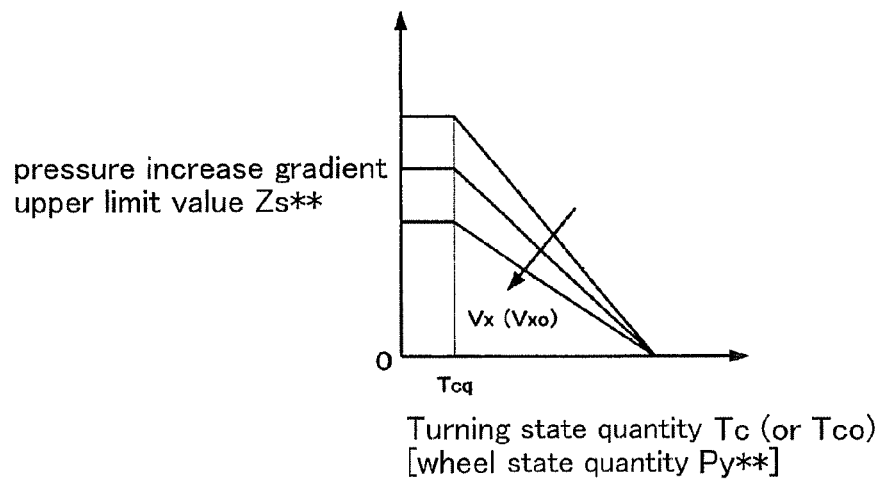
FIG. 44 is a graph showing a table specifying a relationship between the turning state quantity and the pressure increasing gradient upper limit value.

The upper limit value Zs of the pressure increasing gradient (an amount of changes of the pressure increase) may be determined by using the turning state quantity Tc on the basis of a characteristic shown in FIG. 44. The pressure increasing gradient upper limit value Zs is set to have a decreasing characteristic where the pressure increasing gradient is decreased in accordance with the increase of the turning state quantity Tc.

When the vehicle body speed is high, because ensuring of the vehicle stability becomes essential, the pressure increasing gradient upper limit value Zs may be set in response to the vehicle body speed Vx. For example, the higher the vehicle body speed becomes, the lower the pressure increasing gradient upper limit value Zs may be set to be. Additionally, when the rear-wheel is selected, because ensuring of the cornering force becomes essential, the pressure increase gradient upper limit value Zs** may be set lower than the case where the front-wheel is selected.

The pressure increasing gradient upper limit value Zs is used for controlling opened/closed time of the pressure increase regulating means (e.g., the inlet valve IV) (so-called pulse pressure-increase control). The pressure increasing gradient upper limit value Zs** may be set to zero (0), i.e., maintenance of the braking pressure. When the ON/Off solenoid valves are employed as the pressure increase regulating means, the pressure fluctuation occurs in accordance with the opening/closing operation of the solenoid valves. Thus, when the pressure increase regulation is executed, the braking pressure is maintained constant by retaining the solenoid valves (inlet valves) at the closed position so that the kick-back to the brake pedal BP is prevented from occurring.

The pressure increase limit pressure Ps (the pressure increase regulating operational-variable Sbs or the pressure increase regulating deceleration Sgx) is a threshold at which the pressure increase regulation is started. Hence, the pressure increase regulation is executed in an area above the characteristic represented with a full line or a dashed line in FIG. 43. On the other hand, the amount of pressure increase after the pressure increase regulation is started is determined on the basis of the pressure increasing gradient upper limit value Zs.

Figure 45:
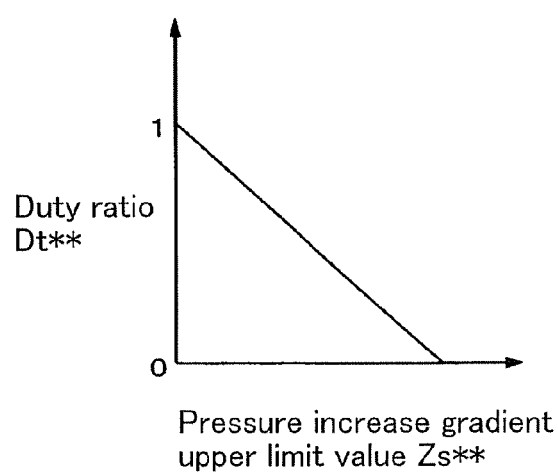
FIG. 45 is a graph showing a table specifying a relationship between the pressure increasing gradient upper limit value and the duty ratio by which level of the driving current supplied to the inlet valve is determined.

The pressure increase regulation is conducted by the pressure increase regulating means (e.g., the inlet valve IV). When the ON/Off valve is employed as the inlet valve IV, the duty ratio Dt for driving the inlet valve IV is determined on the basis of a characteristic shown in FIG. 45 and on the basis of the pressure increasing gradient upper limit value Zs. The duty ratio Dt being set to one (1) indicates the state where the corresponding inlet valve IV is normally electrified. In this case, the inlet valve IV is in the closed state. The duty ratio Dt being set to zero (0) indicates the state where the corresponding inlet valve IV is not electrified. In this case, the inlet valve IV is in opened state. The pressure increase gradient is regulated on the basis of the duty ratio Dt. In other words, the duty ratio Dt is determined on the basis of the pressure increasing gradient upper limit value Zs, and then, pressure increase is regulated by maintenance of the pressure or by the so-called pulse pressure-increase control.

Changes of the vertical load applied to each wheel due to turning operation of the vehicle and the vehicle deceleration are expressed as the slipperiness of wheel. Thus, the pressure increase regulation may be executed on the basis of a value representing the slipperiness of the turning inner wheel, instead of the turning state quantity Tc. The value expressing the slipperiness of wheel (hereinafter referred to also as the wheel state quantity Py) is, for example, the wheel slip velocity S1 that is gained by differences between the vehicle body speed and the wheel speed. Alternatively, the wheel slip ratio Sr gained by subtracting the vehicle body speed from the wheel slip velocity may be used as the value expressing the slipperiness of wheel. Additionally, degree of differences (e.g., differences or ratio) of the wheel slip velocity S1 between the wheels or the wheel slip ratio between the wheels may be used as the wheel state quantity.

The wheel state quantity Py may be calculated on the basis of the road surface μ gradient (e.g., JP2001133390A corresponding to U.S. Pat. No. 6,522,968) or the wheel grip factor (e.g., JP2003312465A corresponding to U.S. Pat. No. 6,895,317). When the wheel state quantity Py of the selected wheel (turning inner wheel) becomes greater than a predetermined value, i.e., when the turning inner wheel becomes slippery, the pressure increase regulation of the selected wheel (i.e., starting the pressure increase regulation and regulating of the pressure increase gradient, or the maintenance of the pressure) may be executed on the basis of the wheel state quantity Py**.

<<Driving Means>>

The driving means DRa of the pressure regulating means (see FIG. 38) drives and controls each of the second pressure generating means (i.e., the electric motor and the pump) and the pressure regulating means (i.e., the linear pressure regulating valve) provided at each brake-circuit so as to control the wheel cylinder pressure of each wheel by adding the auxiliary pressure to the pressure generated by the first pressure generating means (i.e., the master cylinder). More specifically, the driving means DRa controls the rotation of the electric motor M and opening/closing of the linear pressure regulating valves (the linear solenoid valve LV#) provided at each brake-circuit on the basis of the target auxiliary pressure value SP#t calculated in the target auxiliary pressure value calculation.

The electric motor M is controlled so as that the pump rotational speed becomes faster than a predetermined rotational speed by which the target auxiliary pressure value SP#t is generated. The target pressure value Ph#t of each brake-circuit or the target pressure value Pwt of each wheel is calculated on the basis of the detection result of the detecting means BS (e.g., a master cylinder pressure Pmc) and the target auxiliary pressure value SP#t. Then, the current value for driving the linear pressure regulating valve LV# is determined on the basis of the corresponding target pressure value Ph#t or the corresponding target pressure value Pwt in order to control the linear pressure regulating valve LV#. When the pressure sensor PH# is provided at each brake-circuit or when the pressure sensor P is provided at each wheel, the feedback control is executed in order to control the target pressure value to correspond to the actual pressure (e.g., Ph#a or Pwa) detected by the pressure sensor. The pressure sensors PH# and P** are excludable. In this case, the pressure is estimated on the basis of the behavior of the wheel speed (i.e., transition of changes in the wheel speed), the operating states of the valves (at least one of linear pressure regulating valves, the inlet valves and the outlet valves) and the like.

Figure 46:
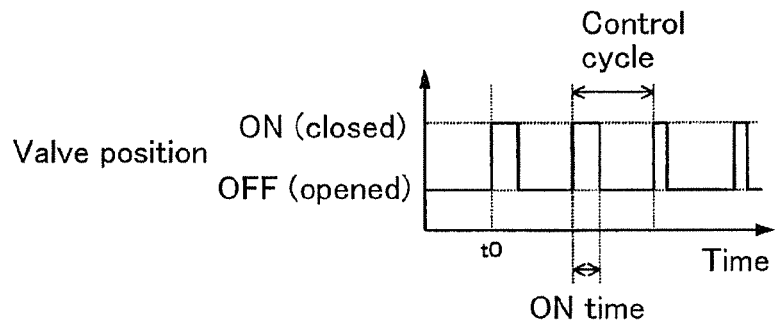
FIG. 46 is an explanatory diagram describing a driving pattern of the inlet valve that is controlled on the basis of the duty ratio.

The driving means DRb control the inlet valve IV (normally opened valve) on the basis of the duty ratio Dt. More specifically, current applying time (ON time) per one control cycle is determined on the basis of the duty ratio Dt, as shown in FIG. 46. The duty ratio Dt being set to zero (0) corresponds to a state where the inlet valve IV is normally not electrified (OFF state), and the inlet valve IV is retained at the opened position. The duty ratio Dt being set to one (1) corresponds to a state where the inlet valve IV is normally electrified (ON state), and the inlet valve IV is retained at the closed position. The current applying time (ON time) per one control cycle is controlled on the basis of the duty ratio Dt, and further, the increase of the braking pressure is restricted. The aforementioned control is generally called as the pulse pressure-increase control.

Additionally, the driving means DRb controls the outlet valve OV (normally closed valve) in order to restrict the decrease of the braking pressure. When the brake control is ended, or when the driver releases the brake pedal BP, the braking pressure maintained by the inlet valve IV needs to be corresponded to the pressure of the corresponding brake-circuit. In this case, decreasing the braking pressure by shifting the outlet valve OV to the opened position may result in generating the kick-back to the brake pedal BP. Hence, the outlet valve OV is retained at the closed position. The braking pressure within each wheel cylinder is corresponded to the pressure within the corresponding conduit portion LW via the check valve CV provided at the corresponding inlet valve IV**.

<<Effects and Benefits>>

Figure 47:
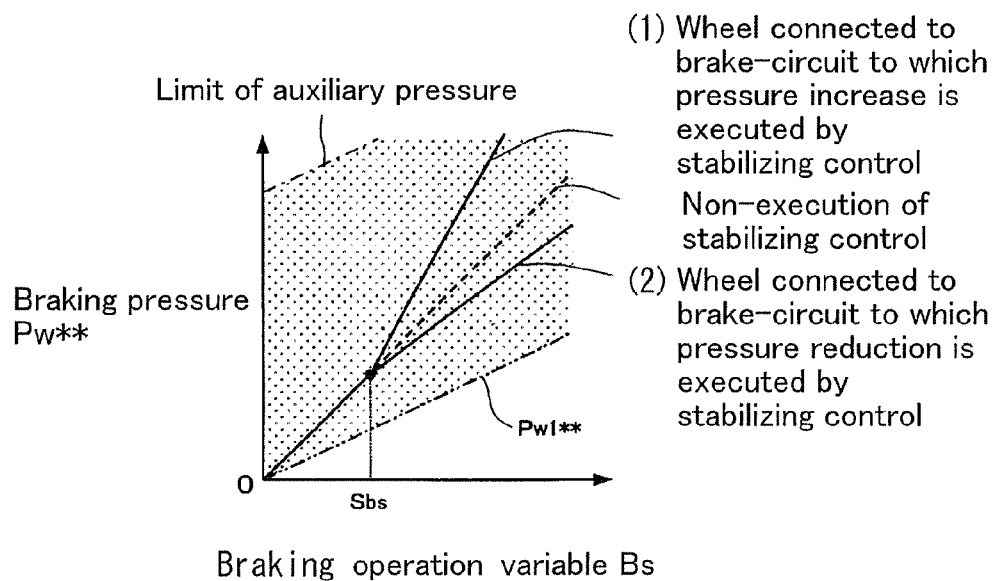
FIG. 47 is an explanatory diagram showing an area within which the braking pressure is adjusted by stabilizing pressure.

Effects and benefits of the brake control apparatus associated with the embodiment will be described below. FIG. 47 shows changes of the braking pressure when the brake control is executed. The characteristic of the braking pressure Pw of each wheel cylinder when a stabilizing control is not executed is represented with a dashed line in FIG. 47. The braking pressure of the wheel(s) connected to the brake-circuit to which the pressure increase is executed by the stabilizing control has an increasing characteristic (characteristic (1)) with respect to the characteristic represented by the dashed line. On the contrary, the braking pressure of the wheel(s) connected to the brake-circuit to which pressure decrease is executed by the stabilizing control has a decreasing characteristic (characteristic (2**)) with respect to the characteristic represented by the dashed line.

Figure 48:
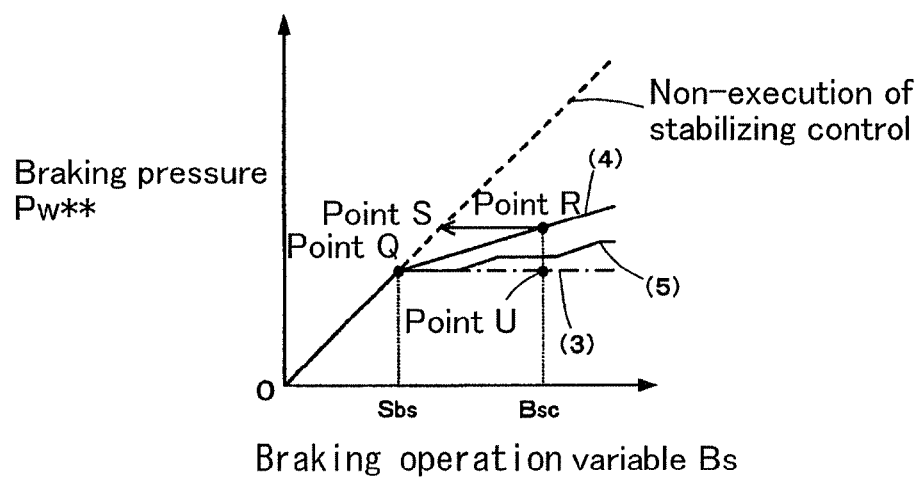
FIG. 48 is a graph showing an example of changes in the braking pressure of the selected wheel in the case where the pressure increase regulation is executed.

FIG. 48 shows changes of the braking pressure when the pressure increase regulation and the pressure decrease regulation are executed. Either the turning inner wheel or the turning outer wheel is selected, and the pressure increase of the selected wheel is restricted by the pressure increase regulating means (i.e., the inlet valves) when the braking operation variable reaches the value Sbs (a point Q) at which the pressure increase regulation, which is determined on the basis of the turning state quantity Tc and the like, is started. While the pressure increase of the selected wheel is restricted, the braking pressure Pw of the selected wheel is maintained constant (see a characteristic (3)) or the pressure increase gradient is restrictedly increased (see a characteristic (4)). Alternatively, by combining the pressure maintenance and the regulation of the pressure increase gradient, the maintenance of the braking pressure Pw of the selected wheel and the pressure increase thereof may be alternately executed as represented by a characteristic (5). In the case where the inlet valves are controlled on the bases of the duty ratio in order to open/close the inlet valves whereby the pressure increase gradient is regulated, the kick-back to the brake pedal BP occurs. However, by maintaining the braking pressure Pw constant as represented by the characteristics (3) and (5**), the kick-back to the brake pedal is prevented from occurring.

When the driver releases the brake pedal BP, the inlet valve and the outlet valve of the wheel (the selected wheel) to which the pressure increase regulation is executed may be retained at the closed position. Release of the brake pedal BP is detected from the braking operation variable. If the inlet valve of the selected wheel is shifted from the closed position to the opened position, or if the outlet valve of the selected wheel is shifted from the closed position to the opened position while the driver releases the brake pedal BP, the kick-back to the brake pedal BP occurs. Thus, when the driver releases the brake pedal BP, the braking pressure of the selected wheel is controlled so as to correspond to the pressure within the corresponding conduit portion LW via the check valve CV provided at the corresponding inlet valve.

For example, in a case where the driver releases the brake pedal BP when the braking operation variable Bs reaches the value Bsc, the braking pressure is maintained at a pressure level corresponding to a point R in FIG. 48 because the inlet valve and the outlet valve of the selected wheel are retained at the closed position. Then, after the pressure within the brake-circuit to which the selected wheel is connected becomes a state corresponding to a point S and the braking pressure corresponds to the pressure within the brake-circuit via the check valve CV, the inlet valve of the selected wheel is shifted to the opened position. Likewise, in a case where the pressure is maintained constant by the pressure increase regulation, the inlet valve of the selected wheel is retained at the closed position after the pressure increase regulation is started, and then, the inlet valve of the selected wheel is shifted to the opened position (normal position) after the braking pressure of the selected wheel corresponds to the pressure within the corresponding conduit portion LW at the point Q via the corresponding check valve CV**.

On the basis of the turning state quantity Tco (e.g., the lateral acceleration Gyo) gained when the brake operation is started, the selection means discriminates whether the driver conducts the brake operation while the vehicle turns (turn-and-brake operation) or the driver conducts the brake operation before the vehicle turns (brake-and-turn operation). Then, each of the second pressure generating means (the electric motor and the pump) and the pressure regulating means (the linear pressure regulating valves) is controlled on the basis of each of corresponding control characteristics. As a result, the following effects and benefits are gained.

<Effects and Benefits for Front-Rear Split Brake System>

(a) In the case where the turn-and-brake control is executed, the stabilizing pressure of the front-wheel brake-circuit is increased. The cornering force of each of the front-right and front-left wheels are reduced, and the yawing moment generated outwardly in the turning direction is reduced. As a result, the vehicle stability is enhanced. In addition, the stabilizing pressure of the rear-wheel brake-circuit is reduced. The cornering force of each of the rear-right and rear-left wheels are increased, and the yawing moment generated outwardly in the turning direction is increased. As a result, the vehicle stability is enhanced.

(b) In the case where brake-and-turn control is executed (e.g., turning operation of the vehicle after the driver conducts the brake operation while the vehicle travels in the straight manner), the stabilizing pressure of the front-wheel brake-circuit is reduced. The cornering force of each of the front-right and front-left wheels is increased, and the yawing moment generated outwardly in the turning direction is increased. As a result, the turn-in ability of the vehicle is enhanced. In addition, the stabilizing pressure of the rear-wheel brake-circuit is increased. The cornering force of each of the rear-right and the rear-left wheels is reduced, and occurrence of the yawing moment outwardly in the turning direction is restricted. As a result, the turn-in ability of the vehicle is enhanced.

<Effects and Benefits for Diagonal Split Brake System>

(c) In the case where the turn-and-brake control is executed, the stabilizing pressure of the brake-circuit including the turning outer front-wheel is increased. The yawing moment is generated outwardly in the turning direction by the braking force differences between the front-right and the front-left wheels. Further, the cornering force of the turning outer front-wheel is reduced. As a result, the vehicle stability is enhanced. Restricting the pressure increase of the turning inner rear-wheel (i.e., maintenance of the pressure or the pulse pressure-increase control) while the cornering force of the turning outer front-wheel being reduced further contributes to the enhancement of the vehicle stability. In addition, the stabilizing pressure of the brake-circuit including the turning inner front-wheel is reduced. The cornering force of each of the rear-right and the rear-left wheels are increased, and the yawing moment generated outwardly in the turning direction is increased. As a result, the vehicle stability is enhanced.

(d) In the case where the brake-and-turn control is executed (e.g., turning operation of the vehicle after the driver conducts the brake operation while the vehicle travels in the straight manner), the stabilizing pressure of the brake-circuit including the turning outer front-wheel is reduced. The yawing moment is generated outwardly in the turning direction by the braking force differences between the front-right and the front-rear wheels. Further, the cornering force of the turning outer front-wheel is increased. As a result, the turn-in ability of the vehicle is enhanced. In addition, the stabilizing pressure of the brake-circuit including the turning inner front-wheel is increased. The cornering force of the turning outer rear-wheel is reduced, and the occurrence of the yawing moment outwardly in the turning direction is restricted. As a result, the turn-in ability of the vehicle is enhanced.

Figure 49:
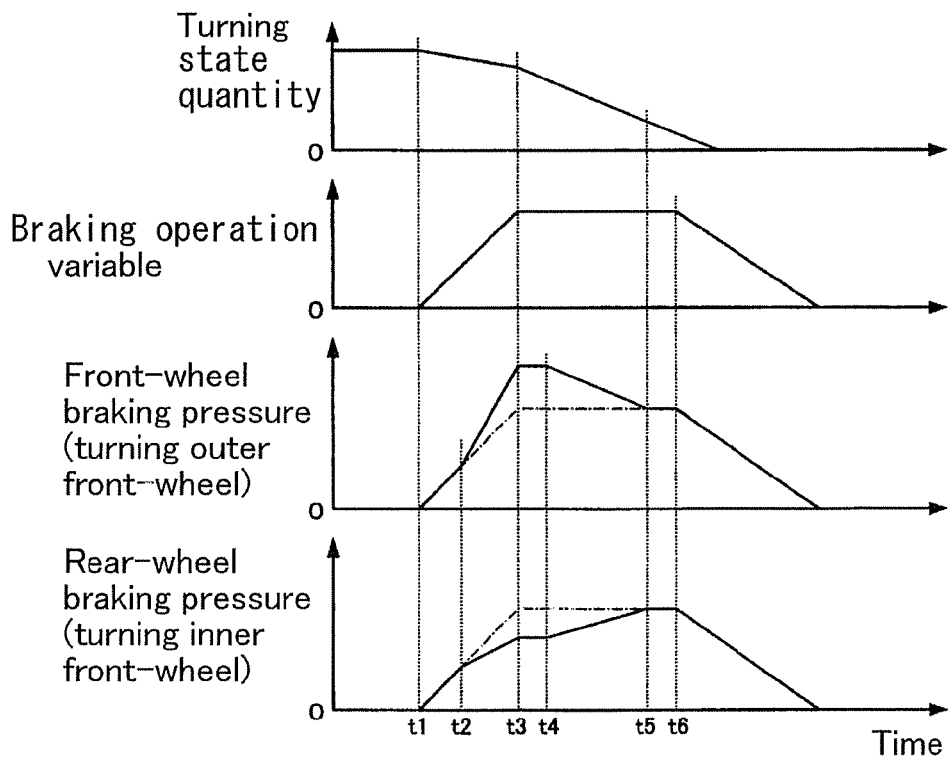
FIG. 49 is a time chart showing an example of patterns of changes in each physical quantity in the case where a turn-and-brake control is executed.

An operation of the turn-and-brake control is described below with reference to FIG. 49. FIG. 49 is a time chart showing changes of the turning state quantity, the braking operation variable and the braking pressure in the case where the driver conducts the brake operation while the vehicle turns. A chain line in FIG. 49 represents changes of the braking force in the case where the turn-and-brake is not executed.

While the vehicle turns, the brake operation is started at time t1, the brake operation is maintained constant from time t3, and the brake pedal BP is released at time t6. The turning state quantity when the braking operation is started is equal to or greater than a predetermined value, and the selection means selects the turn-and-brake control. At time t2, a turn-and-brake control starting condition is fulfilled, and the stabilizing pressure is generated. Thus, the braking pressure of the brake-circuit including the front-wheels when the front-rear split brake system is employed, or the braking pressure of the brake-circuit including the turning outer front-wheel when the diagonal split brake system is employed, is increased. In addition, the braking pressure of the brake-circuit including the rear-wheels when the front-rear split brake system is employed, or the braking pressure of the brake-circuit including the turning inner front-wheel when the diagonal split brake system, is reduced. In this case, the vehicle stability is enhanced because of the above-mentioned reasons.

Figure 50:
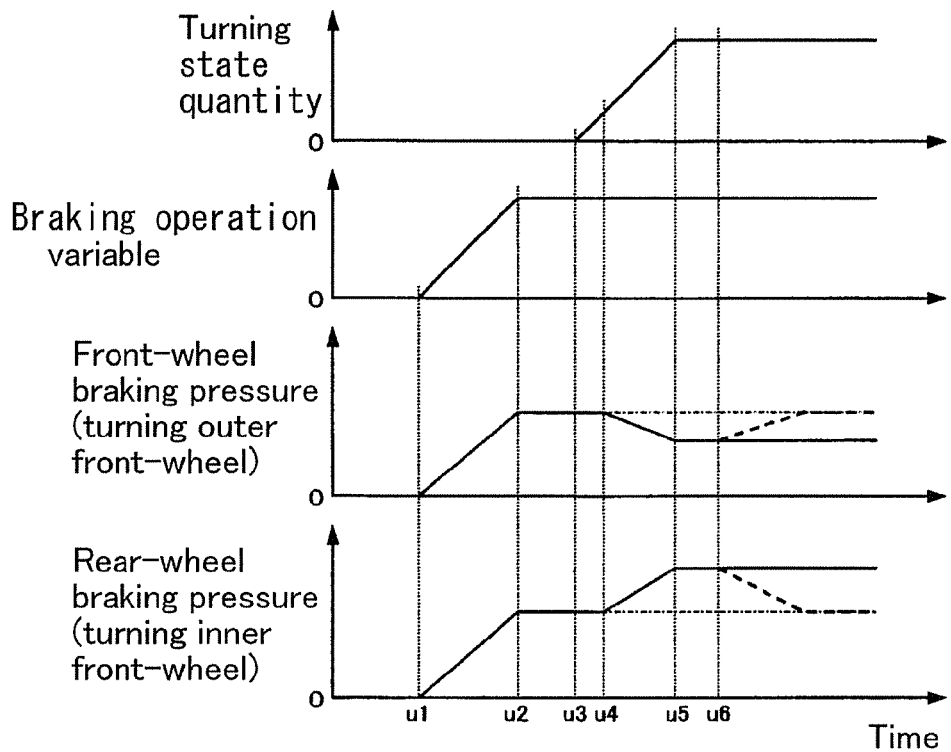
FIG. 50 is a time chart showing an example of patterns of changes in each physical quantity in the case where a brake-and-turn control is executed.
Figure 51:
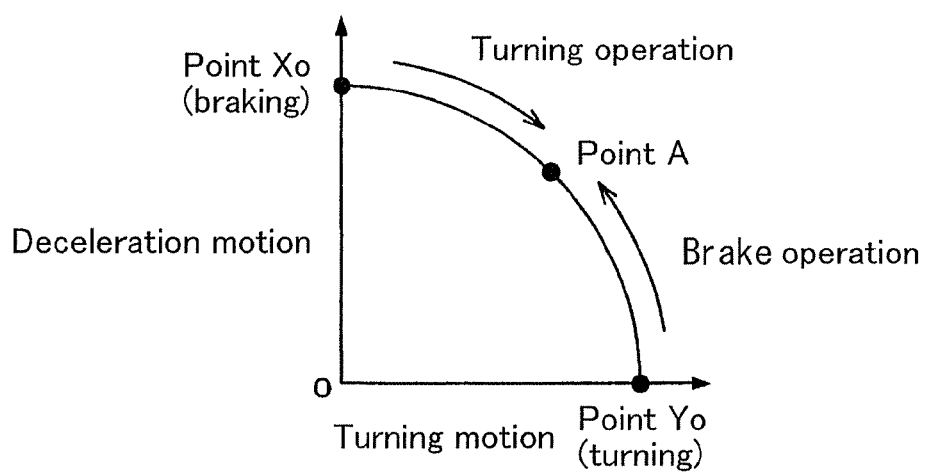
FIG. 51 is an explanatory diagram describing differences of vehicle behavior between a case where the driver conducts the brake operation while the vehicle turns and a case where vehicle turns after the driver conducts the brake operation.

An operation of the brake-and-turn control will be described below with reference to FIG. 50. FIG. 50 is a time chart showing changes of the turning state quantity, the braking operation variable and the braking pressure in the case where the vehicle turns (steering operation) while the driver conducts the brake operation. A chain line in FIG. 50 represents changes of the braking force in the case where the brake-turn control is not executed.

The brake operation is started at time u1, and the vehicle starts to decelerate. At time u3, the turning operation is started. The turning state quantity when the braking operation is started is lower than a predetermined value, and the selection means selects the brake-and-turn control. At time u4, a brake-and-turn control starting condition is fulfilled, and the stabilizing pressure is generated. Thus, the braking pressure of the brake-circuit including the rear-wheels when the front-rear split brake system is employed, or the braking pressure of the brake-circuit including the turning inner front-wheel when the diagonal split brake system is employed, is increased. In addition, the braking pressure of the brake-circuit including the front-wheels when the front-rear split brake system is employed, or the braking pressure of the brake-circuit including the turning outer front-wheel when the diagonal split brake system, is reduced. In this case, the turn-in ability of the vehicle is enhanced because of the above-mentioned reasons.

As represented by a dashed line in FIG. 50, the brake-and-turn control may be ended on the basis of a temporal changing amount of turning state quantity dTc (e.g., a value related to the steering wheel operational angular speed dθsw). When the driver operates the steering wheel, i.e., when the steering wheel operational angular speed is generated, the turn-in ability of the vehicle is necessitated. Thus, when an operational position of the steering wheel is maintained constant, the execution of the brake-and-turn control may be ended.

For example, in FIG. 50, the brake-and-turn control is ended at time u6 at which a predetermined time has passed since a time u5 at which the temporal changing amount of turning state quantity dTc becomes zero (0). As a result, the braking pressure is reverted to a pressure value maintained while the brake-and-turn control is not executed. In this case, the braking pressure is gradually reverted towards the pressure level maintained while the brake-and-turn control is not executed, without abruptly changing the braking pressure.

Other Embodiments

In the above-mentioned embodiment, the stabilizing pressure of one of the brake-circuits is increased while the stabilizing pressure of the other one of the brake-circuits is decreased. However, either one of them are omittable. As the vehicle behavior is determined on the basis of the balance of force generated by the tires, there may be a case where the vehicle behavior is controlled by decreasing the stabilizing pressure of either one of the brake-circuits.

Further, in the above-mentioned embodiment, regulation of the stabilizing pressure is achieved by multiplying the stabilizing base pressure by the modification factor. However, regulation of the stabilizing pressure may be achieved by adding an adjustment value having a pressure-dimension to the stabilizing base pressure.

In the above-embodiment, the stabilizing pressure SP#s is calculated by multiplying the stabilizing base pressure SA#o by the factor (Kt#, Ks# or zero (0) (prohibition of the brake control)), and then the target auxiliary pressure value SP#t is calculated by adding the stabilizing pressure SP#s to the auxiliary pressure SP#o in order to execute the turn-and-brake control and the brake-and-turn control. However, the target auxiliary pressure SP#t may be calculated by directly multiplying the auxiliary pressure SP#o by the factor.

Figure 41:
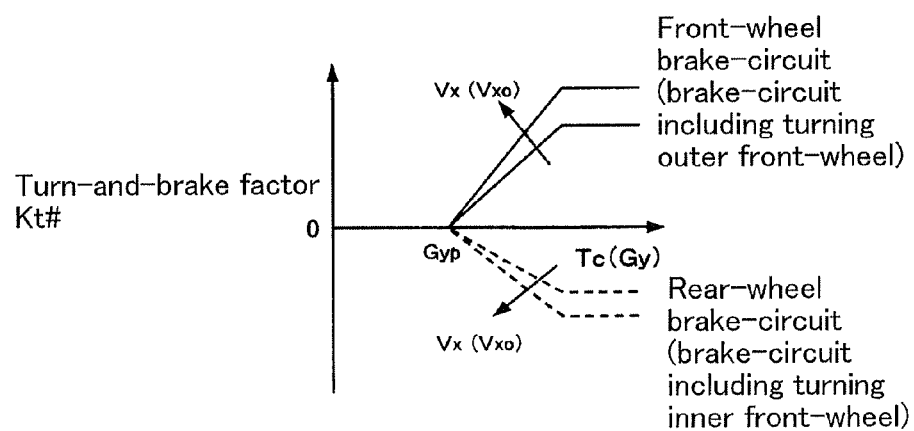
FIG. 41 is a graph showing a table specifying a relationship between the turning state quantity and a turn-and-brake factor.

In the case where the target auxiliary pressure value SP#t is calculated by directly multiplying the auxiliary pressure SP#o by the factor, the stabilizing pressure SP#s and the stabilizing base pressure SA#o are omitted. A factor Ku# of the turn-and-brake control is set to have a characteristic gained by replacing zero (0) in the Y-coordinate by one (1) in the characteristic (the first characteristic) shown in FIG. 41. A factor Kv# of the brake-and-turn control is set to have a characteristic gained by replacing zero (0) in the Y-coordinate by one (1) in the characteristic (the second characteristic) shown in FIG. 42. The final target auxiliary pressure value SP#t is calculated by multiplying the auxiliary pressure SP#o by the factor (Ku#, Kv# or one (1) (prohibition of the brake control)).

Accordingly, when the brake operation is conducted, the braking pressure of the front-wheel brake-circuit (the sum of the master cylinder pressure and the front-wheel auxiliary pressure) is regulated so as to be equal to or greater than the front-wheel reference auxiliary pressure value SPfo (the sum of the master cylinder pressure and the front-wheel reference auxiliary pressure SPfo) on the basis of at least one of the state quantities gained by the load state quantity detecting means LC, the turning state quantity detecting means TC and the wheel speed detecting means WS**, and the braking pressure of the rear-wheel brake-circuit (the sum of the master cylinder pressure and the rear-wheel auxiliary pressure) is regulated so as to be equal to or lower than the rear-wheel reference auxiliary pressure SPro (the sum of the master cylinder and the rear-wheel auxiliary pressure SPro).

Therefore, for example, the larger the load condition of the vehicle becomes, or the more the vehicle becomes deflectable due to the driving condition and the like, the larger the front-wheel distribution ratio Jh is set to be and the smaller the rear-wheel distribution ratio (1-Jh) is set to be. As a result, the braking force acting on the entire vehicle is maintained substantially constant. On the other hand, the braking force (longitudinal force) of each of the rear-wheels (WHrr, WHrl) becomes smaller and a limit value of the cornering force (lateral force) of each of the rear-wheels becomes larger. As a result, the rear-wheel cornering force is sufficiently generated for restricting deflection of the vehicle.

According to the brake control apparatus for the vehicle associated with the first embodiment, the directional stability of the vehicle is ensured by maintaining the increasing characteristic of the vehicle deceleration with respect to the braking operation variable Bs substantially constant and simultaneously regulating the distribution ratio of the two brake-circuits (Jh, 1-Jh).

According to the second embodiment, the brake control apparatus for the vehicle includes the four wheel braking apparatus having the same configuration as the brake control apparatus for the vehicle associated with the first embodiment, the master cylinder MC, the first brake-circuit LM1 connecting the one of the two hydraulic pressure generating chambers of the master cylinder MC with the two wheel cylinders WC corresponding to the front-left wheel and the rear-right wheel, and the second brake-circuit LM2 connecting the other hydraulic pressure generating chamber with the two wheel cylinders WC corresponding to the front-right wheel and the rear-left wheel. That is to say, the brake control apparatus for the vehicle associated with the second embodiment includes the so-called diagonal split brake system, which is also referred to as the X-type dual circuit.

Accordingly, in the case where the driver conducts the brake operation while the vehicle is in the turning state, the braking pressure of the one of the brake-circuits LM# including the turning outer front-wheel (the sum of the master cylinder pressure and the one of the auxiliary pressures) is regulated so as to reach a value equal to or greater than the one of the reference pressures SP#o (the sum of the master cylinder pressure and the one of the reference auxiliary pressures SP#o), and the braking pressure of the other one of the brake-circuits LM# including the turning inner front-wheel (the sum of the master cylinder pressure and the other one of the auxiliary pressures) so as to reach a value equal to or lower than the other one of the reference pressures SP#o (the sum of the master cylinder and the other one of the reference auxiliary pressure SP#o).

Therefore, for example, the more the vehicle is apt to deflected due to the driving condition of the vehicle and the like, the larger each of the braking pressure distribution ratio of the turning outer front-wheel and the braking pressure distribution ratio of the turning inner rear-wheel is set to be, and the lower each of the braking pressure distribution ratio of the turning inner front-wheel and the turning outer rear-wheel is set to be.

Further, when the driver conducts the braking operation while the vehicle is in the turning state, the vertical load applied to the turning inner rear-wheel is decreased the most due to the load shift of the vehicle, and the turning inner rear-wheel tends more likely to slip. Thus, the increase of the braking pressure (i.e., the braking force) of the turning inner rear-wheel is restricted by means of the ABS control and the like. As a result, because a large braking force acts only on the turning outer front-wheel, the yawing moment is generated at the vehicle outwardly in the turning direction, which further results in preventing the vehicle from being deflected.

According to the brake control apparatus for the vehicle associated with the second embodiment, in the case where the diagonal split brake system is employed, the directional stability of the vehicle is ensured by maintaining the increasing characteristic of the vehicle deceleration Gx with respect to the braking operation variable Bs substantially constant, and by regulating the braking pressure distribution between the two brake-circuits LM#.

For example, the value indicating the static load condition of the vehicle is used as the state quantity representing the load condition. For example, the values indicating the vehicle body speed Vx, the turning state of the vehicle and the like are used as the state quantity representing the driving condition of the vehicle. For example, the wheel slip velocity S1** and the like is used as the state quantity representing the slipperiness of wheel.

In the brake control apparatus for the vehicle associated with the first and the second embodiment, the target amount determining means is preferably configured to determine the front-wheel target auxiliary pressure values SPft and the rear-wheel auxiliary pressure value SPrt, or the first target auxiliary pressure value SP1$t$ and the second target auxiliary pressure SP2$t$, to be both greater than zero over the area where the braking operation variable Bs is greater than the zero or the infinitesimal value approximate to zero.

Accordingly, a state where the auxiliary pressure Bs (>0) being added to the master cylinder pressure Pm# is maintained in the entire area for the brake operation conducted by the driver. Therefore, the brake control apparatus for the vehicle of the embodiments may cause less discomfort felt by the driver because of the auxiliary pressure being applied during the brake operation.

Further, in the brake control apparatus for the vehicle associated with the first embodiment, i.e. in the case where the front-rear split brake system is employed, the reference amount determining means is preferably configured to determine the front-wheel reference auxiliary pressure SPfo to be increased in response to the increase of the braking operation variable Bs, and the increasing gradient of the front-wheel reference auxiliary pressure to be increased in response to the increase of the braking operation variable Bs, and the reference amount determining means determines the rear-wheel reference auxiliary pressure SPro to be increased in response to the increase of the braking operation variable Bs and the increasing gradient of the rear-wheel reference auxiliary pressure to be decreased in response to the increase of the braking operation variable Bs.

Accordingly, a reference braking hydraulic pressure distribution of the front-wheel brake-circuit and the rear-wheel brake-circuit may be set to have a characteristic close to the ideal braking force distribution, i.e. the distribution by which the front-wheels and the rear-wheels are simultaneously locked.

Accordingly, in the case where the brake operation is conducted while the vehicle is in the turning state, on the basis of the turning state quantity Tc obtained by the turning state quantity obtaining means (e.g., TC), the pressure increase regulation is executed so that the increase of the braking pressure of the selected wheel (at least one of the turning inner front-wheel and the turning inner rear-wheel, or both) is restricted. Therefore, decrease of the limit value of the cornering force (lateral force) of the selected wheel is prevented. As a result, the sufficient cornering force is generated at the selected wheel (the turning inner wheel(s)). Further, the directional stability of the vehicle is more likely to be ensured.

In addition, in the case where the brake operation is conducted while the vehicle is in the turning state, on the basis of the turning state quantity Tc obtained by the obtaining means, the braking pressure of the first brake-circuit LM1 (the sum of the master cylinder pressure and the auxiliary pressure in the first brake-circuit) is regulated to the value equal to or greater than the first reference value (the sum of the master cylinder pressure and the first reference auxiliary pressure SP1$o$), and the braking pressure of the second brake-circuit LM2 (the sum of the master cylinder pressure and the auxiliary pressure in the second brake-circuit) is regulated to the value equal to or greater than the second reference value (the second reference (the sum of the master cylinder pressure and the second reference auxiliary pressure SP2$o$). That is to say, at least one of the braking pressure of the first brake-circuit and the braking pressure of the second brake-circuit, or both, is/are adjusted so as to be increased with respect to the corresponding reference value SP#$o$. A control where the braking pressure of each of the brake-circuits LM# being adjusted so as to be increased from the reference value SP#$o$ is referred also as the auxiliary pressure increasing control.

Accordingly, the braking force of the wheel other than the selected wheel(s) may be increased by executing the auxiliary pressure increasing control to at least one of the braking pressure of the first brake-circuit and the braking pressure of the second brake-circuit, or to both. The loss of the braking force due to the execution of the pressure increase regulating control to the selected wheel(s) may be compensated by the increase of the braking force of the wheels other than the selected wheel(s). As a result, the increasing characteristic of the vehicle deceleration with respect to the braking operation variable Bs is maintained substantially constant.

In addition, by execution of the pressure increase regulating control and the auxiliary pressure increasing control, not only the braking force differences between the right and left wheels and between the right and left front-wheels and the right and left rear-wheels, but also braking force differences between the left wheels and the right wheels that face diagonally to each other, are generated. As a result, the yawing moment is generated outwardly in the turning direction, which further results in enhancing the directional stability of the vehicle.

According to the brake control apparatus for the vehicle associated with the third embodiment, in the case where the front-rear split brake system is employed, or in the case where the diagonal split brake system is employed, the directional stability of the vehicle is ensured by restricting the increase of the braking pressure of the turning inner wheel(s) while maintaining the increasing characteristic of the vehicle deceleration with respect to the braking operation variable Bs substantially constant, when the vehicle is in the turning state.

According to the brake control apparatus associated with the third embodiment, the threshold value of the braking operation variable Bs is used as a threshold value for determining whether to start the pressure increase regulating control. In this case, when the braking operation variable exceeds the threshold value that is determined on the basis of the turning state quantity Tc, the pressure increase regulating control is started and executed. The directional stability of the vehicle in the case where the brake operation is conducted while the vehicle is in the turning state is determined on the basis of the turning state and the deceleration state vehicle.

In the brake control apparatus for the vehicle associated with the third embodiment, the threshold value of the vehicle body deceleration Gx or the threshold value of the braking pressure corresponding to the selected wheel may be used as the threshold value for determining whether to start executing the pressure increase regulating control. In this case, when the vehicle body deceleration Gx exceeds the threshold value, or when the braking pressure corresponding to the selected wheel exceeds the threshold value, the pressure increase regulating control is started and executed. This is based on a definition that the vehicle body deceleration Gx or the braking pressure is a value corresponding to the braking operation variable Bs.

Further, the threshold value of the turning state quantity Tc may be used as the threshold value for determining whether to start executing the pressure increase regulating control. In this case, when the turning state quantity Tc exceeds the threshold value, the pressure increase regulating control is started and executed.

In the brake control apparatus associated with the third embodiment, the threshold value may be determined on the basis of the vehicle speed Vx. In this case, the higher the vehicle body speed Vx becomes, the lower the threshold value may be set to be. Accordingly, the higher the vehicle body speed Vx is, i.e., the more the directional stability of the vehicle becomes essential, the sooner the pressure increase regulating control may be started.

In the brake control apparatus for the vehicle associated with the third embodiment, when the turning state quantity at the start of the brake operation (Tco) conducted by the driver obtained as the turning state quantity Tc is equal to or lower than the predetermined value, the pressure increase regulating control means is preferably configured not to execute the pressure increase regulating control, and the target amount determining means is preferably configured to maintain the first target auxiliary pressure SP1$t$ and the second target auxiliary pressure SP2$t$ to correspond to the first reference auxiliary pressure SP1$o$ and the second reference auxiliary pressure SP2$o$ respectively. In other words, when the turning state quantity at the start of the brake operation is small, i.e. when the vehicle travels in the straight manner, execution of the pressure increase regulating control and the auxiliary pressure increasing control are prohibited.

When the brake operation is started under the condition where the turning state quantity Tc is large, the vehicle is more likely to be oversteered, i.e., the vehicle is more likely to be moved inward in the turning direction. In this cause, the execution of the pressure increase regulating control and the auxiliary pressure increasing control may prevent an occurrence of the oversteering tendency. On the other hand, in the case where the vehicle turns after the brake operation is started while the vehicle travels in the straight manner, the oversteering tendency of the vehicle is less likely to occur. In this case, the pressure increase regulating control and the auxiliary hydraulic pressure increasing control may not need to be executed.

Accordingly, in the case where the vehicle turns after the brake operation is started while the vehicle travels in the straight manner, the pressure increase regulating control and the auxiliary pressure increasing control are prevented from being unnecessarily executed.

According to the brake control apparatus for the vehicle associated with the fourth embodiment, when the turn-andbrake operation is conducted, the turning state quantity at the start of the brake operation (i.e., the brake operation starting turning state quantity) Tco is large. On the other hand, in the case where the brake-and-turn operation is conducted, the brake operation starting turning state quantity Tco is small. Therefore, the selection means discriminates between the turn-and-brake operation (which corresponds to the first state) and the brake-and-turn operation (which corresponds to the second state).

In the case where the front-rear split brake system is employed will be explained below. According to the above-mentioned configuration, when the selection means determines that the vehicle is in the turn-and-brake operation (the first state), on the basis of the detected turning state quantity Tc, the braking pressure of the front-wheel brake-circuit is regulated to the value equal to or greater than the front-wheel reference value (the sum of the master cylinder pressure and the front-wheel reference auxiliary pressure SPfo), and the braking pressure of the rear-wheel brake-circuit is regulated to the value equal to or lower than the rear-wheel reference value (the sum of the master cylinder pressure and the rear-wheel reference auxiliary pressure SPro). In other words, the pressure of the front-wheel brake-circuit (i.e., braking pressure of the front-right and front-left wheels) is adjusted so as to be increased with respect to the corresponding reference value SPfo, and the pressure of the rear-wheel brake-circuit (i.e., braking pressure of the rear-right and rear-left wheels) is adjusted so as to be decreased with respect to the corresponding reference value SPro. This control is hereinafter referred to as the turn-and-brake control.

Therefore, the cornering force of the front-right and front-left wheels are reduced and the yawing moment generated inwardly in the turning direction is reduced, in addition, the cornering force of the rear-right and rear-left wheels are increased and the yawing moment generated outwardly in the turning direction is increased. As a result, the increasing characteristic of the vehicle deceleration with respect to the braking operation variable is maintained substantially constant, and the directional stability of the vehicle in the turn-and-brake operation is enhanced.

Accordingly, in the case where the selection means determines that the vehicle is in the brake-and-turn operation (the second state), on the basis of the detected turning state quantity Tc, the braking pressure of the front-wheel brake-circuit is regulated to the value equal to or lower than the front-wheel reference value (the sum of the master cylinder pressure and the front-wheel reference auxiliary pressure SPfo), and the braking pressure of the rear-wheel brake-circuit is regulated to the value equal to or greater than the rear-wheel reference value (the sum of the master cylinder pressure and the rear-wheel reference auxiliary pressure SPro). In other words, the pressure of the front-wheel brake-circuit (i.e., braking pressure of the front-right and front-left wheels) is adjusted so as to be decreased with respect to the corresponding reference value SPfo, and the pressure of the rear-wheel brake-circuit (i.e., braking pressure of the rear-right and rear-left wheels) is adjusted so as to be increased with respect to the corresponding reference value SPro. This control is hereinafter referred to as the brake-and-turn control.

Therefore, the cornering force of the front-right and front-left wheels are increased and the yawing moment generated inwardly in the turning direction is increased, in addition, the cornering force of the rear-right and rear-left wheels are reduced and the yawing moment generated outwardly in the turning direction is reduced. As a result, the increasing characteristic of the vehicle deceleration with respect to the braking operation variable Bs is maintained substantially constant, and the turn-in ability of the vehicle in the brake-and-turn operation is enhanced.

In the case where the diagonal split brake system is employed will be explained below. According to the above-mentioned configuration, when the selection means determines that the vehicle is in the turn-and-brake operation (the first state), on the basis of the detected turning state quantity Tc, the pressure of the brake-circuit (one of the brake-circuits LM#) corresponding to the turning outer front-wheel and the turning inner rear-wheel (i.e., the braking pressure of two wheels WH corresponding to one of the brake-circuits LM#) is adjusted so as to be increased with respect to the corresponding reference value SP#o, and the pressure of the brake-circuit (the other one of the brake-circuits LM#) corresponding to the turning inner front-wheel and the turning outer rear-wheel (i.e., the braking pressure of two wheels WH corresponding to other one of the brake-circuits LM#) is adjusted so as to be decreased with respect to the corresponding reference value SP#o (the turn-and-brake control).

Thus, the braking force differences between the front-right and the front-left wheels are generated, and the yawing moment is generated outward in the turning direction. In addition, the cornering force of the turning outer front-wheel is reduced, and the yawing moment generated inward in the turning direction is reduced. As a result, the increasing characteristic of the vehicle deceleration with respect to the baking operation variable Bs is maintained substantially constant, and the vehicle stability in the turn-and-brake operation is enhanced.

On the other hand, according to the above-mentioned configuration, in the case where the selection means determines that the vehicle is in the brake-and-turn operation (the second state), on the basis of the detected turning state quantity Tc, the pressure of the one of the brake-circuits LM# (i.e., the braking pressure of the two wheels WH corresponding to the one of the brake-circuits LM#) is adjusted so as to be decreased with respect to the corresponding reference value SP#o, and the pressure of the other one of the brake-circuits LM# (i.e., the braking pressure of the two wheels WH corresponding to the other one of the brake-circuits LM#) is adjusted so as to be increased with respect to the corresponding reference value SP#o.

Thus, the braking force differences between the front-right and the front-left wheels are generated, and the yawing moment is generated inward in the turning direction. In addition, the cornering force of the turning outer front-wheel is increased, and the yawing moment generated inward in the turning direction is increased. As a result, the increasing characteristic of the vehicle deceleration with respect to the baking operation variable is maintained substantially constant, and the turn-in ability of the vehicle in the turn-and-brake operation is enhanced.

According to the brake control apparatus associated with the fourth embodiment, in the case where the front-rear split brake system is employed, or in the case where diagonal split brake system is employed, the increasing characteristic of the vehicle deceleration with respect to the braking operation variable Bs is maintained substantially constant, and the vehicle stability is enhanced when the turn-and-brake operation is conducted, and the turn-in ability of the vehicle is enhanced when the brake-and-turn operation is conducted.

Accordingly, in the brake control apparatus for the vehicle associated with the fourth embodiment, the turn-and-brake control is executed when the brake operation starting turning state quantity Tco is equal to or greater than the first predetermined value Tc2, the turn-and-brake control is not executed when the brake operation starting turning state quantity Tco is equal to or greater than the second predetermined value Tc3 that is smaller than the first predetermined value Tc2 and then the brake operation starting turning state quantity Tco is lower than the first predetermined value Tc2, and the brake-and-turn control is executed when the brake operation starting turning state quantity Tco is lower then the second predetermined value Tc3.

Additionally, the first predetermined value Tc2 and the second predetermined value Tc3 may be set to equal to each other. In this case, the turn-and-brake control is executed when the brake operation starting turning state quantity Tco is equal to or greater then the first predetermined value Tc2, and the brake-and-turn control is executed when the brake operation starting turning state quantity Tco is lower than the second predetermined value Tc3 which is equal to the first predetermined value Tc2.

According to the brake control apparatus associated with the other embodiments, the turn-and-brake control may be executed when the brake operation starting turning state quantity Tco is equal to or greater than the first predetermined value Tc2, and the braking control may not be executed when the brake operation starting turning state quantity Tco is lower than the first predetermined value Tc2. This configuration may be of benefit when the turning characteristic of the vehicle is tuned so as to sufficiently ensure the turn-in ability of the vehicle in the brake-and-turn operation without executing the brake-and-turn control.

According to the brake control apparatus associated with the fourth and the other embodiments, the target amount of auxiliary hydraulic pressure determining means includes the amount of stabilizing hydraulic base pressure determining means for determining, on the basis of the detected braking operation variable Tc, the stabilizing hydraulic base pressure SA#o of each of the first and the second hydraulic circuits to be zero when the detected braking operation variable Bs is equal to or lower than a predetermined variable that is larger than zero, and determining the stabilizing hydraulic base pressure SA#o of each of the first and the second hydraulic circuits to be greater than zero when the detected braking operation variable Bs is larger than the predetermined variable, and the amount of stabilizing hydraulic pressure determining means for determining, on the basis of the detected state, each of the first stabilizing hydraulic pressure SP#s in the one of the first and the second circuits and the second stabilizing hydraulic pressure SP#s in the other one of the first and the second circuits to be the value gained by multiplying the determined stabilizing hydraulic base pressure SA#o by the corresponding factor (Kt# or Ks#) gained on the basis of the detected turning state quantity Tc, wherein the target amount of auxiliary hydraulic pressure determining means determines the first target auxiliary pressure SP#t to be the value gained by adding the first stabilizing pressure SP1s to the one of the first reference auxiliary pressure SP1o and the second reference the auxiliary pressure SP2o, and determines the second target auxiliary pressure SP#t to be the value gained by adding the second stabilizing pressure SP2s to the other one of the first reference auxiliary pressure SP1o and the second reference auxiliary pressure SP2o.

Accordingly, when the braking operation variable Bs is lower then a predetermined operation variable (>0), each of the first stabilizing pressure and the second stabilizing hydraulic pressure (SP1s, SP2s) is set to zero (0). That is to say, the first target auxiliary pressure SP1t and the second target auxiliary pressure SP2t are set to be equal to the corresponding one of the reference auxiliary pressures SP#o and the other one of the reference auxiliary pressures SP#o. In other words, when the braking operation variable Bs is equal to or lower than the predetermined operation variable, both of the turn-and-brake control and the brake-and-turn control are not executed. In the case where the braking operation variable Bs is small, i.e., when the vehicle deceleration is small, deterioration of the vehicle stability or the turn-in ability is less likely to occur. Hence, according to the above-mentioned configuration, in the case where necessity of executing both the turn-and-brake control and the brake-and-turn control are is low, the turn-and-brake control or the brake-and-turn control is prevented from unnecessarily executed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A brake control apparatus for a vehicle, comprising:
four wheel braking apparatuses for applying a braking torque to front-right, front-left, rear-right, and rear-left wheels respectively in response to a braking hydraulic pressure supplied to each of wheel cylinders at respective wheels;
a first hydraulic pressure generating apparatus including two hydraulic pressure generating chambers each generating a hydraulic pressure in response to a braking operation by a driver of a vehicle;
a front-wheel hydraulic circuit hydraulically connecting one of the hydraulic pressure generating chambers to the two of the wheel braking apparatuses corresponding to the front-right wheel and the front-left wheel respectively;
a rear-wheel hydraulic circuit hydraulically connecting the other one of the hydraulic pressure generating chambers to the other two of the wheel braking apparatuses corresponding to the rear-right wheel and the rear-left wheel respectively;
a second hydraulic pressure generating apparatus being power driven and generating an auxiliary pressure that is added to the hydraulic pressure in each of the front-wheel hydraulic circuit and rear-wheel hydraulic circuit generated by the first hydraulic pressure generating apparatus;
a detecting means for detecting a braking operation variable in response to the braking operation;
a reference amount determining means for determining a reference amount of auxiliary hydraulic pressure of each of the front-wheels in the front-wheel hydraulic circuit and a reference amount of auxiliary hydraulic pressure of each of the rear-wheels in the rear-wheel hydraulic circuit on the basis of the detected braking operation variable;
an obtaining means for obtaining at least one of a state quantity indicating a load condition of the vehicle, a state quantity indicating a driving condition of the vehicle and a state quantity indicating slipperiness of wheel;
a target amount determining means for determining, on the basis of the determined amounts of front-wheel and the rear-wheel reference amount of auxiliary hydraulic pressures and the obtained state quantity, a target amount of auxiliary hydraulic pressure of each of the front-wheels in the front-wheel hydraulic circuit to be equal to or greater than the reference amount of auxiliary hydraulic pressure of each of the front-wheel and a target amount of auxiliary hydraulic pressure of each of the rear-wheels in the rear-wheel hydraulic circuit to be equal to or lower than the reference amount of auxiliary hydraulic pressure of each of the rear-wheels; and a pressure regulating means for regulating the auxiliary hydraulic pressure in each of the front-wheel hydraulic circuit and the rear-wheel hydraulic circuit so as to correspond to respective target amount of auxiliary hydraulic pressures of the front-wheel and the rear-wheel.

2. A brake control apparatus for a vehicle, comprising:

four wheel braking apparatuses for applying a braking torque to front-right, front-left, rear-right, and rear-left wheels respectively in response to a braking hydraulic pressure supplied to each of wheel cylinders at respective wheels;

a first hydraulic pressure generating apparatus including two hydraulic pressure generating chambers each generating a hydraulic pressure in response to a braking operation by a driver of a vehicle;

a first hydraulic circuit hydraulically connecting one of the hydraulic pressure generating chambers to the two of the wheel braking apparatuses corresponding to the front-left wheel and the rear-right wheel respectively;

a second hydraulic circuit hydraulically connecting the other one of the hydraulic pressure generating chambers to the other two of the wheel braking apparatuses corresponding to the front-right wheel and the rear-left wheel respectively;

a second hydraulic pressure generating apparatus being power driven and generating an auxiliary pressure that is added to the hydraulic pressure in each of the first hydraulic circuit and second hydraulic circuit generated by the first hydraulic pressure generating apparatus;

a detecting means for detecting a braking operation variable in response to the braking operation;

a reference amount determining means for determining a first reference amount of auxiliary hydraulic pressure in the first hydraulic circuit and a second reference amount of auxiliary hydraulic pressure in the second hydraulic circuit on the basis of the detected braking operation variable;

an obtaining means for obtaining at least one of a state quantity indicating a load condition of the vehicle, a state quantity indicating a driving condition of the vehicle and a state quantity indicating slipperiness of wheel;

a target amount determining means for determining, on the basis of the determined amounts of first and the second reference amount of auxiliary hydraulic pressures and the obtained state quantity, when the vehicle is in a turning state, a first target amount of auxiliary hydraulic pressure in one of the first and the second hydraulic circuits corresponding to a turning outer front-wheel and a turning inner rear-wheel to be equal to or greater than one of the first and the second reference amount of auxiliary hydraulic pressures corresponding to the one of the first and the second hydraulic circuits corresponding to the turning outer front-wheel and the turning inner rear-wheel, and a second target amount of auxiliary hydraulic pressure in the other one of the first and the second hydraulic circuits to be equal to or lower than the other one of the first and the second reference amount of auxiliary hydraulic pressures; and a pressure regulating means for regulating the auxiliary hydraulic pressure in each of the first hydraulic circuit and the second hydraulic circuit so as to correspond to respective first target amount of auxiliary hydraulic pressure and the second target amount of auxiliary hydraulic pressure.

3. The brake control apparatus for the vehicle according to claim 1, wherein the obtaining means obtains a value indicating a static load condition of the vehicle as a state quantity representing the load condition.

4. The brake control apparatus for the vehicle according to claim 1, wherein the obtaining means obtains at least one of a value indicating a vehicle body speed of the vehicle and a value indicating a turning state of the vehicle as a state quantity representing the driving condition.

5. The brake control apparatus for the vehicle according to claim 1, wherein the obtaining means obtains slip velocity of each of the wheels as a state quantity representing the slipperiness of wheel.

6. The brake control apparatus for the vehicle according to claim 1, wherein the target amount determining means determines the front-wheel target amount of auxiliary hydraulic pressure and the rear-wheel target amount of auxiliary hydraulic pressure to be greater than zero over an area where the braking operation variable is greater than zero or an infinitesimal value approximate to zero.

7. The brake control apparatus for the vehicle according to claim 2, wherein the target amount determining means determines the first target amount of auxiliary hydraulic pressure and the second target amount of auxiliary hydraulic pressure to be greater than zero over an area where the braking operation variable is greater than zero or an infinitesimal value approximate to zero.

8. The brake control apparatus for the vehicle according to claim 1, wherein the reference amount determining means determines the front-wheel reference amount of auxiliary hydraulic pressure to be increased in response to an increase of the braking operation variable and an increasing gradient of the front-wheel reference amount of auxiliary hydraulic pressure to be increased in response to the increase of the braking operation variable, and the reference amount determining means determines the rear-wheel reference amount of auxiliary hydraulic pressure to be increased in response to the increase of the braking operation variable and an increasing gradient of the rear-wheel reference amount of auxiliary hydraulic pressure to be decreased in response to the increase of the braking operation variable.

9. A brake control apparatus for a vehicle, comprising:

four wheel braking apparatuses for applying a braking torque to front-right, front-left, rear-right, and rear-left wheels respectively in response to a braking hydraulic pressure supplied to each of wheel cylinders at respective wheels;

a first hydraulic pressure generating apparatus including two hydraulic pressure generating chambers each generating a hydraulic pressure in response to a braking operation by a driver of a vehicle;

a first hydraulic circuit hydraulically connecting one of the hydraulic pressure generating chambers to the two of the wheel braking apparatuses corresponding to the front-right wheel and the front-left wheel respectively, or to the two of the wheel braking apparatuses corresponding to the front-left wheel and the rear-right wheel respectively;

a second hydraulic circuit hydraulically connecting the other one of the hydraulic pressure generating chambers to the other two of the wheel braking apparatuses corresponding to the rear-right wheel and the rear-left wheel respectively, or to the two of the wheel braking apparatuses corresponding to the front-right wheel and the rear-left wheel respectively;

a second hydraulic pressure generating apparatus being power driven and generating an auxiliary pressure that is added to the hydraulic pressure in each of the first hydraulic circuit and second hydraulic circuit generated by the first hydraulic pressure generating apparatus;

a braking operation variable detecting means for detecting a braking operation variable in response to the braking operation;

a state quantity obtaining means for obtaining a turning state quantity representing a turning motion of the vehicle;

a pressure increase regulating control means selecting at least one of a turning inner front wheel and a turning inner rear-wheel as a selected wheel on the basis of the obtained turning state quantity, and executing an pressure increase regulating control by which the braking hydraulic pressure applied to the wheel braking apparatus corresponding to the selected wheel is maintained lower than a pressure level within the corresponding hydraulic pressure circuit;

a reference amount determining means for determining a first reference amount of auxiliary hydraulic pressure in the first hydraulic circuit and a second reference amount of auxiliary hydraulic pressure in the second hydraulic circuit on the basis of the detected braking operation variable;

a target amount determining means for determining, on the basis of the determined amounts of first and the second reference amount of auxiliary hydraulic pressures and the gained turning state quantity, a first target amount of auxiliary hydraulic pressure in the first hydraulic circuit to be equal to or greater than the first reference amount of auxiliary hydraulic pressure, and/or a second target amount of auxiliary hydraulic pressure in the second hydraulic circuit to be equal to or greater than the second reference amount of auxiliary hydraulic pressure; and a pressure regulating means for regulating the auxiliary hydraulic pressure in each of the first hydraulic circuit and the second hydraulic circuit to correspond to respective first target amount of auxiliary hydraulic pressure and the second target amount of auxiliary hydraulic pressure.

10. The brake control apparatus for the vehicle according to claim 9, wherein the pressure increase regulating control means determines a criterion value of the braking operation variable used for determining whether to start executing the pressure increase regulating control on the basis of the obtained turning state quantity, and the pressure increase regulating control means starts executing the pressure increase regulating control when the detected braking operation variable exceeds the criterion value.

11. The brake control apparatus for the vehicle according to claim 9, further comprising a vehicle deceleration detecting means for detecting a vehicle body deceleration of the vehicle, wherein, the pressure increase regulating control means determines a criterion value of the vehicle body deceleration being used for determining whether to start executing the pressure increase regulating control on the basis of the obtained turning state quantity, and the pressure increase regulating control means starts executing the pressure increase regulating control when the detected vehicle body deceleration exceeds the criterion value.

12. The brake control apparatus for the vehicle according to claim 9, further comprising a braking pressure obtaining means for detecting or estimating the braking pressure applied to each of the wheel cylinders provided at corresponding wheels, wherein the pressure increase regulating control means determines a criterion value of the braking pressure corresponding to the selected wheel on the basis of the obtained turning state quantity, the criterion value is used for determining whether to start executing the pressure increase regulating control, and the pressure increase regulating control means starts executing the pressure increase regulating control when the detected braking pressure corresponding to the selected wheel exceeds the criterion value.

13. The brake control apparatus for the vehicle according to claim 9, wherein the pressure increase regulating control means determines a criterion value of the turning state quantity, and starts executing the pressure increase regulating control when the obtained turning state quantity used for determining whether to execute the pressure increase regulating control exceeds the criterion value.

14. The brake control apparatus for the vehicle according to claim 9, wherein the pressure increase regulating control means determines a criterion value on the basis of a vehicle body speed.

15. The brake control apparatus for the vehicle according to claim 9, wherein, when a turning state quantity obtained when the driver starts a brake operation as the turning state quantity is equal to or lower than a predetermined value, the pressure increase regulating control means is configured not to execute the pressure increase regulating control, and the target amount determining means is configured to control the first target amount of auxiliary hydraulic pressure and the second target amount auxiliary hydraulic pressure to be equal to the corresponding first reference amount of auxiliary hydraulic pressure and the second reference amount of auxiliary hydraulic pressure.

16. A brake control apparatus for a vehicle, comprising:
four wheel braking apparatuses for applying a braking torque to front-right, front-left, rear-right, and rear-left wheels respectively in response to a braking hydraulic pressure supplied to each of wheel cylinders at respective wheels;
a first hydraulic pressure generating apparatus including two hydraulic pressure generating chambers each generating a hydraulic pressure in response to a braking operation by a driver of a vehicle;
a first hydraulic circuit hydraulically connecting one of the hydraulic pressure generating chambers to the two of the wheel braking apparatuses corresponding to the front-right wheel and the front-left wheel respectively, or to the two of the wheel braking apparatuses corresponding to the front-left wheel and the rear-right wheel respectively;
a second hydraulic circuit hydraulically connecting the other one of the hydraulic pressure generating chambers to the other two of the wheel braking apparatuses corresponding to the rear-right wheel and the rear-left wheel respectively, or to the two of the wheel braking apparatuses corresponding to the front-right wheel and the rear-left wheel respectively;
a second hydraulic pressure generating apparatus being power driven and generating an auxiliary hydraulic pressure that is added to the hydraulic pressure in each of the first hydraulic circuit and second hydraulic circuit generated by the first hydraulic pressure generating apparatus;
a braking operation variable detecting means for detecting a braking operation variable in response to the braking operation;
a turning state quantity detecting means for detecting a turning state quantity representing a turning motion of the vehicle;
a reference amount of auxiliary hydraulic pressure determining means for determining a first reference amount of auxiliary hydraulic pressure in the first hydraulic circuit and a second reference amount of auxiliary hydraulic pressure in the second hydraulic circuit on the basis of the detected braking operation variable;
a state determining means for detecting a first state when a turning state quantity detected at a start of the braking operation conducted by the driver as the turning state quantity is equal to or greater than a first predetermined value, and a second state when the turning state quantity detected at the start of the braking operation conducted by the driver is lower than a second predetermined value which is equal to or lower than the first predetermined value;
a target amount of auxiliary hydraulic pressure determining means for determining, on the basis of the detected turning state quantity, when the first state is detected, a first target amount of auxiliary hydraulic pressure in one of the first and the second brake-circuits connected to the two of the wheel braking apparatuses corresponding to the front-right and front-left wheels respectively or to the two of the wheel braking apparatuses corresponding to a turning outer front-wheel and a turning inner rear-wheel respectively to be equal to or greater than one of the determined first reference amount of auxiliary hydraulic pressure and the second reference amount of auxiliary hydraulic pressure corresponding to the said one of the first and the second brake-circuits and determining a second target amount of auxiliary hydraulic pressure in the other one of the first and the second brake-circuits to be equal to or lower than the other one of the determined first reference amount of auxiliary hydraulic pressure and the second reference amount of auxiliary hydraulic pressure, and the target amount of auxiliary hydraulic pressure determining means determining, on the basis of the detected turning state quantity, when the second state is detected, the first target amount of auxiliary hydraulic pressure to be equal to or lower than the said one of the determined first reference amount of auxiliary hydraulic pressure and the second reference amount of auxiliary hydraulic pressure and determining the second target amount of auxiliary hydraulic pressure to be equal to or greater than the said other one of the determined first reference amount of auxiliary hydraulic pressure and the second reference amount of auxiliary hydraulic pressure; and
a pressure regulating means for regulating the auxiliary pressure in each of the said one of the first and the second hydraulic circuits and the said other one of the first and the second hydraulic circuits so as to correspond to respective determined first target amount of auxiliary hydraulic pressure and the second target amount of auxiliary hydraulic pressure.

17. The brake control apparatus for the vehicle according to claim 16, wherein the target amount of auxiliary hydraulic pressure determining means includes:

an amount of stabilizing hydraulic base pressure determining means for determining, on the basis of the detected braking operation variable, an amount of stabilizing hydraulic base pressure of each of the first and the second hydraulic circuits to be zero when the detected braking operation variable is equal to or lower than a predetermined variable that is larger than zero, and determining the amount of stabilizing hydraulic base pressure of each of the first and the second hydraulic circuits to be greater than zero when the detected braking operation variable is larger than the predetermined variable; and an amount of stabilizing hydraulic pressure determining means for determining, when the first state is detected, a first amount of stabilizing hydraulic pressure in the said one of the first and the second hydraulic circuits to be a value gained by multiplying the determined amount of stabilizing hydraulic base pressure by a factor equal to or greater than zero gained on the basis of the detected turning state quantity and determining a second amount of stabilizing hydraulic pressure in the said other one of the first and the second hydraulic circuits to be a value gained by multiplying the determined amount of stabilizing hydraulic base pressure by a factor equal to or lower than zero gained on the basis of the detected turning state quantity, and the amount of stabilizing hydraulic pressure determining means determining, when the second state is detected, the first amount of stabilizing hydraulic pressure to be a value gained by multiplying the determined amount of stabilizing hydraulic base pressure by a factor equal to or lower than zero gained on the basis of the turning state quantity and determining the second amount of stabilizing hydraulic pressure to be a value gained by multiplying the determined amount of stabilizing hydraulic base pressure by a factor equal to or greater than zero gained on the basis of the detected turning state quantity;

wherein the target amount of auxiliary hydraulic pressure determining means determines the first target amount of auxiliary hydraulic pressure to be a value gained by adding the first amount of stabilizing hydraulic pressure to the said one of the first reference amount of auxiliary hydraulic pressure and the second reference amount of auxiliary hydraulic pressure, and determines the second target amount of auxiliary hydraulic pressure to be a value gained by adding the second amount of stabilizing hydraulic pressure to the said other one of the first reference amount of auxiliary hydraulic pressure and the second reference amount of auxiliary hydraulic pressure.

18. A brake control apparatus for a vehicle, comprising:
four wheel braking apparatus for applying a braking torque to front-right, front-left, rear-right, and rear-left wheels respectively in response to a braking hydraulic pressure supplied to each of wheel cylinders at respective wheels;
a first hydraulic pressure generating apparatus including two hydraulic pressure generating chambers each generating a hydraulic pressure in response to a braking operation by a driver of a vehicle;
a first hydraulic circuit hydraulically connecting one of the hydraulic pressure generating chambers to the two of the wheel braking apparatuses corresponding to the front-right wheel and the front-left wheel respectively, or to the two of the wheel braking apparatuses corresponding to the front-left wheel and the rear-right wheel respectively;

a second hydraulic circuit hydraulically connecting the other one of the hydraulic pressure generating chambers to the other two of the wheel braking apparatuses corresponding to the rear-right wheel and the rear-left wheel respectively, or to the two of the wheel braking apparatuses corresponding to the front-right wheel and the rear-left wheel respectively;

a second hydraulic pressure generating apparatus being power driven and generating an auxiliary hydraulic pressure that is added to the hydraulic pressure in each of the first hydraulic circuit and second hydraulic circuit generated by the first hydraulic pressure generating apparatus;

a braking operation variable detecting means for detecting a braking operation variable in response to the braking operation;

a turning state quantity detecting means for detecting a turning state quantity representing a turning motion of the vehicle;

a reference amount of auxiliary hydraulic pressure determining means for determining a first reference amount of auxiliary hydraulic pressure in the first hydraulic circuit and a second reference amount of auxiliary hydraulic pressure in the second hydraulic circuit on the basis of the detected braking operation variable;

a state determining means for detecting a first state when a turning state quantity detected at a start of the braking operation conducted by the driver as the turning state quantity is equal to or greater than a first predetermined value, and a second state when the turning state quantity detected at the start of the braking operation conducted by the driver is lower than the first predetermined value;

a target amount of auxiliary hydraulic pressure determining means for determining, on the basis of the detected turning state quantity, when the first state is detected, a first target amount of auxiliary hydraulic pressure in one of the first and the second brake-circuits connected to the two of the wheel braking apparatuses corresponding to the front-right and front-left wheels respectively or to the two of the wheel braking apparatuses corresponding to a turning outer front-wheel and a turning inner rear-wheel respectively to be equal to or greater than one of the determined first reference amount of auxiliary hydraulic pressure and the second reference amount of auxiliary hydraulic pressure corresponding to the said one of the first and the second brake-circuits and determining a second target amount of auxiliary hydraulic pressure in the other one of the first and the second brake-circuits to be equal to or lower than the other one of the determined first reference amount of auxiliary hydraulic pressure and the second reference amount of auxiliary hydraulic pressure, and the target amount of auxiliary hydraulic pressure determining means determining, when the second state is detected, each of the first target amount of auxiliary hydraulic pressure and the second target amount of auxiliary hydraulic pressure to be a value equal to corresponding the said one of the first and the second reference amount of auxiliary hydraulic pressures and the said other one of the first and the second reference amount of auxiliary hydraulic pressures; and a pressure regulating means for regulating the auxiliary hydraulic pressure in each of the said one of the first and the second hydraulic circuits and the said other one of the first and the second hydraulic circuits so as to correspond to respective determined first target amount of auxiliary hydraulic pressure and the second target amount of auxiliary hydraulic pressure.

19. The brake control apparatus for the vehicle according to claim 18, wherein the target amount of auxiliary hydraulic pressure determining means comprises:

an amount of stabilizing hydraulic base pressure determining means determining, on the basis of the detected braking operation variable, an amount of stabilizing hydraulic base pressure of each of the first and the second hydraulic circuits to be zero when the detected braking operation variable is equal to or lower than a predetermined variable that is larger than zero, and determining the amount of stabilizing hydraulic base pressure of each of the first and the second hydraulic circuits to be greater than zero when the detected braking operation variable is larger than the predetermined variable; and an amount of stabilizing hydraulic pressure determining means for determining, when the first state is detected, a first amount of stabilizing hydraulic pressure in the said one of the first and the second hydraulic circuits to be a value gained by multiplying the determined amount of stabilizing hydraulic base pressure by a factor equal to or greater than zero gained on the basis of the detected turning state quantity and determining a second amount of stabilizing hydraulic pressure in the said other one of the first and the second hydraulic circuits to be a value gained by multiplying the determined amount of stabilizing hydraulic base pressure by a factor equal to or lower than zero gained on the basis of the detected turning state quantity, and the amount of stabilizing hydraulic pressure determining means determining, when the second state is detected, each of the first amount of stabilizing hydraulic pressure and the second amount of stabilizing hydraulic pressure to be zero; and wherein the target amount of auxiliary hydraulic pressure determining means determines the first target amount of auxiliary hydraulic pressure to be a value gained by adding the first amount of stabilizing hydraulic pressure to the said one of the first reference amount of auxiliary hydraulic pressure and the second reference amount of auxiliary hydraulic pressure, and determines the second target amount of auxiliary hydraulic pressure to be a value gained by adding the second amount of stabilizing hydraulic pressure to the said other one of the first reference amount of auxiliary hydraulic pressure and the second reference amount of auxiliary hydraulic pressure.

* * * * *